US012083071B2

(12) United States Patent
Eugster et al.

(10) Patent No.: US 12,083,071 B2
(45) Date of Patent: Sep. 10, 2024

(54) PHARMACEUTICAL CONTAINERS AND METHODS FOR PRODUCING, REGISTRATION, IDENTIFICATION AND AUTHENTICATION OF SUCH CONTAINERS

(71) Applicant: SCHOTT PHARMA SCHWEIZ AG, St. Gallen (CH)

(72) Inventors: Dominik Eugster, Oberuzwil (CH); Daniel Willmes, Langrickenbach (CH)

(73) Assignee: SCHOTT PHARMA SCHWEIZ AG, St. Gallen (CH)

( * ) Notice: Subject to any disclaimer, the term of this patent is extended or adjusted under 35 U.S.C. 154(b) by 454 days.

(21) Appl. No.: 17/221,526

(22) Filed: Apr. 2, 2021

(65) Prior Publication Data
US 2021/0308010 A1  Oct. 7, 2021

(30) Foreign Application Priority Data

Apr. 6, 2020 (EP) .................................... 20168303

(51) Int. Cl.
| B65D 79/02 | (2006.01) |
|---|---|
| A61J 1/06 | (2006.01) |
| A61J 1/14 | (2023.01) |
| G01N 21/90 | (2006.01) |
| G01N 21/952 | (2006.01) |
| G01N 21/95 | (2006.01) |

(52) U.S. Cl.
CPC .............. *A61J 1/1468* (2015.05); *A61J 1/06* (2013.01); *A61J 1/14* (2013.01); *B65D 79/02* (2013.01); *G01N 21/90* (2013.01); *G01N 21/952* (2013.01); *A61J 2205/00* (2013.01); *A61J 2205/40* (2013.01); *G01N 21/95* (2013.01)

(58) Field of Classification Search
CPC ... A61J 1/06; A61J 1/14; A61J 1/1468; G01N 21/90; G01N 21/952; G01N 21/95; G01N 21/956; B65D 1/09; B65D 1/10
See application file for complete search history.

(56) References Cited

U.S. PATENT DOCUMENTS

| 4,713,536 A * | 12/1987 | Williams .............. B07C 5/3412 |
| | | 250/556 |
| 2012/0103926 A1* | 5/2012 | Ibsies ...................... B65D 1/06 |
| | | 141/113 |

FOREIGN PATENT DOCUMENTS

CN       202069863       12/2011

OTHER PUBLICATIONS

ISO 7991, dated Dec. 15, 1987, 12 pages.
ISO 695, dated May 15, 1991, 8 pages.
Schott, "Schott Vials Perfection in Every Detail", Sep. 20, 2017, 28 pages.
Gerresheimer: "Pharmaceutical Primary Packaging Made of Glass", Jan. 22, 2020, 76 pages.

* cited by examiner

Primary Examiner — Andrew T Kirsch
(74) Attorney, Agent, or Firm — Ruggiero McAllister & McMahon LLC

(57) ABSTRACT

Pharmaceutical containers and methods for producing, registration, identification and authentication of such containers and for determining the operation state of machines for producing pharmaceutical containers are provided.

19 Claims, 31 Drawing Sheets

PHARMACEUTICAL CONTAINERS AND METHODS FOR PRODUCING, REGISTRATION, IDENTIFICATION AND AUTHENTICATION OF SUCH CONTAINERS

CROSS REFERENCE TO RELATED APPLICATIONS

This application claims benefit under 35 USC § 119 of European Application 20168303.4 filed Apr. 6, 2020, the entire contents of which are incorporated herein by reference.

BACKGROUND

1. Field of the Invention

The present invention relates to pharmaceutical containers and methods for producing, registration, identification and authentication of such containers and for determining the operation state of machines for producing pharmaceutical containers.

2. Description of Related Art

In the state of the art containers for pharmaceutical compositions such as vials, syringes, cartridges and the like are well known. For such containers it is often required to have means, which allow identifying each single container among others. This can be important for example for the purpose of an automation of handling the containers during filling, routing, storing, dispatching as well as for ensuring quality and safety standards which often put high demands on the traceability of each container during its lifetime cycle. Often said identification means are designed in form of a marking element, which is then used in order to fulfill the mentioned requirements.

So far, often a label has been glued on each container and a unique identification code such as a barcode has been printed on the label. In other applications, the unique identification code has been transferred directly on the container by means of a printing process using ink. Thus, both approaches require a printed code. By reading the respective unique identification code, the container can be identified once a link between the container and the unique identification code has been established.

However, gluing labels on the surface, or using a printer is often slow and complicated during use, hence, often representing a bottleneck in the production line. The size of these printed codes is usually limited by the printing method and cannot be reduced sufficiently in order to create the required small codes. Particularly for small containers it is hard or even not possible to provide a sufficiently large area to glue a label onto. Often containers exhibit a complex geometry, which makes it difficult to use labels or printers for providing an identification code on them.

Furthermore, it turned out that during further handling or use of the containers there is a risk that the labels of the containers peel off or that codes printed directly on the containers vanish, if the containers are exposed to water or other extreme conditions. In addition, it also turned out that it is a general problem that codes provided by these known techniques are subject to fading over time.

These drawbacks lead to the situation that containers that cannot be identified anymore have to be disposed, either because the labels have been completely lost or because they are no longer readable. This is especially the case in the pharmaceutical field where it is not tolerable that substances of unknown identification are in use. However, particularly in this field disposing containers comprising respective compositions is quite expensive. Apart from that, sorting out containers whose identification is unclear might lead to downtimes of the system or at least requires extra resources. In any event, using such conventional marking elements might lead to increased service costs.

An even more serious scenario is an incorrect identification and subsequent incorrect assignment of a container due to a vanishing unique identification code. In the worst case, this might lead to serious health risks of the patient.

SUMMARY

It is, thus, an object of the present invention to overcome the disadvantages described above with respect to providing marking elements on containers by providing containers which have identification means that are on the one hand easy and cheap to fabricate but on the other hand still reliable, durable and fail safe and which identification means are particularly suitable for a wide range of containers with respect to size and geometry. It is a further object of the present invention to provide a method for producing such containers and methods for registration, identification and authentication of the respective containers and for determining the operation state of machines for producing pharmaceutical containers.

The problem is solved by the invention according to a first aspect in that a plurality of pharmaceutical containers, wherein at least one geometric parameter is or can be defined for the plurality of containers, and each of all defined geometric parameters has a certain value for each container of the plurality of containers; wherein each of all defined geometric parameters has with respect to all containers of the plurality of containers a mean value and a standard deviation; wherein for a group of geometric parameters, which are selected from all defined geometric parameters, each geometric parameter of that group has a standard deviation which is greater than or equal to a lower threshold value specific for the respective geometric parameter; wherein each lower threshold value is at least 1% of the mean value of the respective geometric parameter is proposed.

It is, thus, the surprising finding that features of the containers inherently available in form of geometric parameters can be used as identification means if the variation of the parameters across a plurality of containers is suitable. This leads to the beneficial and astonishing situation that for the purpose of identification of pharmaceutical containers no extra elements such as labels or additional processes such as printing identifiers directly on the containers are necessary. Instead, a group of geometric parameters can be chosen which are then used for the purpose of identification of the individual containers once the values of the respective parameters have been registered for each container.

Since it is ensured that the variation of the geometric parameter values across the containers of the plurality of containers is sufficiently large, also a large number of containers can be distinguished based on a group of geometric parameters and the individual values they have for each container.

This greatly improves efficiency since the process of providing a separate marking element is avoided. Furthermore, also the reliability is improved since the marking element is inherently provided for each container by its own geometry. There is no longer any glued or printed marking element which might be subject to vanishing over time.

It was particularly found by the inventors that already small threshold values lead to variations which are sufficient large for the purpose of identification of individual containers among each other. This is very beneficial because this finding goes hand in hand with the ambition to have containers which are as uniform as possible. It was found that geometric parameters can be measured with great accuracy so that rather low variations are sufficient to distinguish a vast number of individual containers.

Consequently, the present invention takes advantage of geometric parameter variations in that the variations which are present across a plurality of containers is chosen so that it can be employed as an inherent identifier means.

It is acknowledged that a group of geometric parameters includes at least a number of one geometric parameter. However, also two or more geometric parameters can be present in the group.

It is acknowledged that the person skilled in the art understands that the mean value a certain geometric parameter has with respect to all containers of a plurality of containers is an average value. For example, if a geometric parameter has the values 3, 5, 4, 6, 7 and 5 for different containers of the plurality of containers. Then, the mean value is $(3+5+4+6+7+5)/6=5$. Furthermore, in this case the standard deviation that the certain geometric parameter has with respect to all containers of a plurality of containers is $[((3-5)^2+(5-5)^2+(4-5)^2+(6-5)^2+(7-5)^2+(5-5)^2)/(5-1)]^{1/2} = [(4+0+1+1+4+0)/4]^{1/2} = [10/4]^{1/2} = [2.5]^{1/2}$. This is the square root of 2.5, which is approximately 1.58.

In one embodiment it might be alternatively or in addition preferred that the threshold value is at least 3%, at least 5%, at least 10%, at least 50%, at least 100%, at least 300%, at least 500%, at least 1%, at least 3%, at least 5%, at least 10%, at least 15% or at least 20%, respectively, of the mean value of the respective geometric parameter. This threshold value defines a lower limit and may be referred to as the "lower threshold" or "lower threshold value".

In one embodiment it might be alternatively or in addition preferred that for the group of geometric parameters, which are selected from all defined geometric parameters, each geometric parameter of that group has a standard deviation which is smaller than or equal to an upper threshold value specific for the respective geometric parameter;

Wherein preferably each upper threshold value is at most 50%, at most 40%, at most 30%, at most 20%, at most 10%, at most 5%, at most 3%, at most 2% or at most 1%, respectively, of the mean value of the respective geometric parameter.

In one embodiment it might alternatively or in addition be preferred that each container of the plurality of containers has a tube with a first end and a further end, wherein the tube is characterized by a center axis and comprises, in a direction from the top to the bottom, one or more of the parts: a top region that is located at the first end of the tube; a collar region comprising a collar that preferably follows the top region; a neck region comprising a neck that preferably follows the collar region; a shoulder region comprising a shoulder that preferably follows the neck region; a body region comprising a body that preferably follows the shoulder region; a heel region comprising a heel that preferably follows the body region and that preferably extends to the further end of the tube; and preferably a bottom region comprising a bottom that preferably follows the heel region and/or the body region and that closes the tube at the further end.

If each of the pharmaceutical containers has different parts, the definition of geometric parameters is easily possible. Furthermore, different parts can have different, especially one or more different, geometric parameters.

It is acknowledged that the person skilled in the art clearly understands that the center axis of an object such as a pharmaceutical container is fixedly attached to the object. In other words, the center axis has a clear location, extension and orientation in space. Hence, not only at least one direction is and/or can be indicated by the center axis. The center axis can also be used for expressing a relative position; for example, some other object can be located with some certain distance from the object's center axis.

In one embodiment it might alternatively or in addition be preferred that the outer diameter of the top region is dt, the outer diameter of the neck region is dn with dn<dt, the outer diameter of the body region is db with db>dt, and/or the thickness of the material in the body region is lb.

If appropriate dimensions are used for each of the pharmaceutical containers, it is possible to define geometric parameters more reliable and convenient.

In one embodiment it might alternatively or in addition be preferred that each geometric parameter is assigned to at least one class of: geometric parameter of the overall container and geometric parameter of at least one part of the tube of the container.

Geometric parameters can be divided into one or more classes. This allows having on the one hand global geometric parameters which represent properties of the entire container under consideration. However, on the other hand also geometric parameters which represent only special parts of the containers under consideration are possible, which, thus, are more specific. This allows that geometric parameters for the purpose of identification can be chosen dependent on criterions such as accessibility of the respective geometric features corresponding to the geometric parameters in the respective situations.

For example, the neck height concerns only the part "neck" while the height of the container concerns a global property of the container.

In one embodiment it might alternatively or in addition be preferred that the group of selected geometric parameters comprises at least one geometric parameter for the overall container, especially the total height, and/or at least one geometric parameter for each of at least one to six parts, preferably comprising for each of at least one to five parts of the following parts the respective provided geometric parameter: the collar region with the collar outer diameter as geometric parameter, the neck region with the neck outer diameter as geometric parameter, the shoulder region with the shoulder angle as geometric parameter, the heel region with the heel radius as geometric parameter and the bottom region with the bottom print as geometric parameter.

If for each of at least two parts (or even more) at least one geometric parameter is used, it is possible to rely on geometric parameters which refer to design aspects of the container concerning features at different spatial locations. For example, one geometric parameter is chosen such that it relates to some aspect of the collar of the container while another geometric parameter is chosen such that it relates to some aspect of the bottom of the container. Hence, an improved coverage is possible.

In one embodiment it might alternatively or in addition be preferred that the group of selected geometric parameters comprises at least one, preferably two, three, four, five, six or a plurality, of the following geometric parameters:

Bottom perpendicularity; Lower collar angle; Upper collar angle; Collar facet angle; Shoulder angle; Body outer diameter; Collar outer Diameter/thread outer diameter; Neck outer diameter; Bottom print; Eccentricity; Circular run out tolerance; Total height; Body height; Collar height; Neck height; Total collar height; Total collar height plus neck height; Body height with shoulder; Sealing surface perpendicularity; Shoulder radius; Heel radius; Collar and neck radius; Collar facet radius; Lower collar radius; Radius at bottom of neck; Ovality; Wall thickness; Bottom thickness; Bottom inner radius; Neck inner diameter; and Bottom depth.

The geometric parameters are particularly preferred because they are reliable and can be used in an efficient manner. Likewise, they can be captured for the purpose of identification in a reliable and efficient manner (because the respective geometric features are well accessible).

In preferred embodiments one or more of the geometric parameters might have alternatively or in addition a mean value according to the minimal mean value, the maximal mean value, or a mean value of the range between the minimal and maximal mean value or of the preferred range of the mean value, respectively, for a plurality of e.g., 150 containers as listed in the following table.

| Geometric parameter | Minimal mean value | Maximal mean value | Preferred range of the mean value |
| --- | --- | --- | --- |
| Bottom perpendicularity [mm] | 0.5 | 1.5 | 0.7 . . . 1.3 |
| Lower collar angle [°] | 5 | 50 | 8 . . . 12 |
| Upper collar angle [°] | 1 | 5 | 2 . . . 4 |
| Collar facet angle [°] | 30 | 60 | 40 . . . 50 |
| Shoulder angle [°] | 10 | 50 | 20 . . . 40 |
| Body outer diameter [mm] | 5 | 50 | 20 . . . 40 |
| Collar outer Diameter/ thread outer diameter [mm] | 5 | 50 | 10 . . . 25 |
| Neck outer diameter [mm] | 5 | 50 | 9 . . . 20 |
| Bottom print [mm] | 10 | 40 | 20 . . . 30 |
| Eccentricity [mm] | 0.1 | 20 | 1 . . . 10 |
| Circular run out tolerance [mm] | 0.1 | 20 | 1 . . . 10 |
| Total height [mm] | 10 | 100 | 30 . . . 80 |
| Body height [mm] | 10 | 70 | 30 . . . 50 |
| Collar height [mm] | 1 | 5 | 3 . . . 4 |
| Neck height [mm] | 0.5 | 40 | 2 . . . 20 |
| Total collar height (aka "Collar height with c21") [mm] | 0.5 | 40 | 2 . . . 20 |
| Total collar height plus neck height | 2 | 20 | 7 . . . 10 |
| Body height with shoulder [mm] | 10 | 90 | 30 . . . 60 |
| Sealing surface perpendicularity [mm] | 0.1 | 20 | 1 . . . 10 |
| Shoulder radius [mm] | 1.5 | 10.0 | 2.0 . . . 7.0 |
| Heel radius [mm] | 1.0 | 5.0 | 2.0 . . . 4.0 |
| Collar and neck radius [mm] | 0.1 | 1.0 | 0.4 . . . 0.7 |
| Collar facet radius [mm] | 0.1 | 0.7 | 0.4 . . . 0.5 |
| Lower collar radius [mm] | 0.1 | 0.7 | 0.4 . . . 0.6 |
| Radius at bottom of neck [mm] | 0.5 | 2.5 | 1.5 . . . 2.0 |
| Ovality [mm] | 0.1 | 20 | 1.0 . . . 15.0 |
| Wall thickness [mm] | 0.5 | 1.5 | 0.8 . . . 1.2 |
| Bottom thickness [mm] | 0.3 | 1.0 | 0.5 . . . 0.9 |
| Bottom inner radius [mm] | 0.1 | 5 | 0.5 . . . 2.5 |
| Neck inner diameter[mm] | 5 | 20 | 6.0 . . . 15.0 |
| Bottom depth [mm] | 0.1 | 2.0 | 0.7 . . . 1.5 |

In preferred embodiments, one or more of the geometric parameters might have alternatively or in addition the following lower threshold values with respect to the respective mean value:

| Geometric parameter | Preferred lower threshold value | Also preferred lower threshold value | Also preferred lower threshold value |
| --- | --- | --- | --- |
| Bottom perpendicularity [mm] | 2‰ | 5‰ | 7‰ |
| Lower collar angle [°] | 2‰ | 5‰ | 7‰ |
| Upper collar angle [°] | 2‰ | 5‰ | 7‰ |
| Collar facet angle [°] | 2‰ | 5‰ | 7‰ |
| Shoulder angle [°] | 2‰ | 5‰ | 7‰ |
| Body outer diameter [mm] | 2‰ | 5‰ | 7‰ |
| Collar outer Diameter/ thread outer diameter [mm] | 2‰ | 5‰ | 7‰ |
| Neck outer diameter [mm] | 2‰ | 5‰ | 7‰ |
| Bottom print [mm] | 2‰ | 5‰ | 7‰ |
| Eccentricity | 2‰ | 5‰ | 7‰ |
| Circular run out tolerance | 2‰ | 5‰ | 7‰ |
| Total height [mm] | 2‰ | 5‰ | 7‰ |
| Body height [mm] | 2‰ | 5‰ | 7‰ |
| Collar height [mm] | 2‰ | 5‰ | 7‰ |
| Neck height [mm] | 2‰ | 5‰ | 7‰ |
| Total collar height (aka "Collar height with c21") | 2‰ | 5‰ | 7‰ |
| Total collar height plus neck height | 2‰ | 5‰ | 7‰ |
| Body height with shoulder | 2‰ | 5‰ | 7‰ |
| Sealing surface perpendicularity | 2‰ | 5‰ | 7‰ |
| Shoulder radius [mm] | 2‰ | 5‰ | 7‰ |
| Heel radius [mm] | 2‰ | 5‰ | 7‰ |
| Collar and neck radius [mm] | 2‰ | 5‰ | 7‰ |
| Collar facet radius [mm] | 2‰ | 5‰ | 7‰ |
| Lower collar radius [mm] | 2‰ | 5‰ | 7‰ |
| Radius at bottom of neck [mm] | 2‰ | 5‰ | 7‰ |
| Ovality | 2‰ | 5‰ | 7‰ |
| Wall thickness [mm] | 2‰ | 5‰ | 7‰ |
| Bottom thickness [mm] | 2‰ | 5‰ | 7‰ |
| Bottom inner radius [mm] | 2‰ | 5‰ | 7‰ |
| Neck inner diameter[mm] | 2‰ | 5‰ | 7‰ |
| Bottom depth [mm] | 2‰ | 5‰ | 7‰ |

In one embodiment it can be alternatively or in addition be preferred that the group of selected geometric parameters comprises at least one, preferably two, three, four, five or six of the following geometric parameters: Radius at bottom of neck, bottom print, shoulder angle, neck height, body height with shoulder and total collar height.

In one embodiment it can be alternatively or in addition be preferred that the group of selected geometric parameters comprises at least one, preferably two, three, four, five or six of the following geometric parameters: Shoulder angle, collar outer diameter/thread outer diameter, heel radius, neck outer diameter, total height and bottom print.

These parameters in particular have been proved highly reliable in the context of the present invention. Especially, it has been observed by the inventors that these parameters can be measured particularly fast and precise at the same time. This is beneficial because this allows on the one hand applying measurements in the production environment where pharmaceutical containers pass the measurement device quite fast. On the other hand the more precise the value of a geometric parameter can be measured, the smaller the minimal required standard deviation can be chosen and/or the smaller the number of geometric parameters incorporated can be chosen for the purpose of individualizing each pharmaceutical container. Notwithstanding that, the inventive concept can be carried out also with other geometric parameters, for example the other geometric parameters described in this application.

In one embodiment it might alternatively or in addition be preferred that each container of the plurality of containers comprises at least partly glass, especially silicate glass such as alumosilicate glass and/or borosilicate glass, and/or at least one polymer material such as cycloolefin-copolymer (COC) and/or cyclic olefin polymer (COP).

In one embodiment it might alternatively or in addition be preferred that the plurality of containers comprises a number of between 5 and 10000 containers, more preferably between 10 and 1000 containers, even more preferably between 10 and 500 containers, even more preferably between 20 and 300 containers, most preferably between 50 and 200 containers, especially 50, 100 or 150 containers.

Choosing the plurality of containers appropriately, allows using the inventive concept in a more efficient and reliable manner.

In one embodiment it might alternatively or in addition be preferred that each container of the plurality of containers is designed at least in part in form of a vial and/or in form of a cartridge.

A vial or cartridge is particularly preferred because it can be used for many kinds of applications and it is usually produced in very large numbers at fast production rates.

In one embodiment it might alternatively or in addition be preferred that the group of geometric parameter comprises a first geometric parameter that is the total height, a second geometric parameter that is the shoulder angle and a third geometric parameter that is the heel radius; wherein preferably the first geometric parameter has with respect to all containers of the plurality of containers a mean value of between 10 and 100 mm and/or a standard deviation of at least 2% of the mean value, the second geometric parameter has with respect to all containers of the plurality of containers a mean value of between 10 and 50 degrees and/or a standard deviation of at least 3% of the mean value, and/or the third geometric parameter has with respect to all containers of the plurality of containers a mean value of between 1 and 5 mm and/or a standard deviation of at least 1% of the mean value.

By choosing at least these three geometric parameters, a particularly reliable identification process can be accomplished. Especially these parameters are accessible in an easy manner. The choice of the corresponding standard deviations allows discriminating between a large number of containers.

However, the inventors have found that also other groups of geometric parameters might be beneficial as well. (Here preferably the number of containers is 150.)

Thus, in one embodiment it might alternatively or in addition be preferred that the group of geometric parameters comprises a first geometric parameter that is the shoulder angle, a second geometric parameter that is the bottom print and a third geometric parameter that is the radius at bottom of neck; wherein preferably the first geometric parameter has with respect to all containers of the plurality of containers a mean value of between 10 and 50 degrees and/or a standard deviation of at least 2% of the mean value, the second geometric parameter has with respect to all containers of the plurality of containers a mean value of between 10 and 40 mm and/or a standard deviation of at least 2% of the mean value, and/or the third geometric parameter has with respect to all containers of the plurality of containers a mean value of between 0.5 and 2.5 mm and/or a standard deviation of at least 2% of the mean value.

Thus, in one embodiment it might alternatively or in addition be preferred that the group of geometric parameters comprises a first geometric parameter that is the shoulder angle, a second geometric parameter that is the radius at bottom of neck and a third geometric parameter that is the neck height; wherein preferably the first geometric parameter has with respect to all containers of the plurality of containers a mean value of between 10 and 50 degrees and/or a standard deviation of at least 2% of the mean value, the second geometric parameter has with respect to all containers of the plurality of containers a mean value of between 0.5 and 2.5 mm and/or a standard deviation of at least 2% of the mean value, and/or the third geometric parameter has with respect to all containers of the plurality of containers a mean value of between 0.5 and 40 mm and/or a standard deviation of at least 2% of the mean value.

Thus, in one embodiment it might alternatively or in addition be preferred that the group of geometric parameters comprises a first geometric parameter that is the shoulder angle, a second geometric parameter that is the bottom print and a third geometric parameter that is the neck height; wherein preferably the first geometric parameter has with respect to all containers of the plurality of containers a mean value of between 10 and 50 degrees and/or a standard deviation of at least 2% of the mean value, the second geometric parameter has with respect to all containers of the plurality of containers a mean value of between 10 and 40 mm and/or a standard deviation of at least 2% of the mean value, and/or the third geometric parameter has with respect to all containers of the plurality of containers a mean value of between 0.5 and 40 mm and/or a standard deviation of at least 2% of the mean value.

Thus, in one embodiment it might alternatively or in addition be preferred that the group of geometric parameters comprises a first geometric parameter that is the collar outer diameter, a second geometric parameter that is the total height and a third geometric parameter that is the heel radius; wherein preferably the first geometric parameter has with respect to all containers of the plurality of containers a mean value of between 5 and 50 mm and/or a standard deviation of at least 2% of the mean value, the second geometric parameter has with respect to all containers of the plurality of containers a mean value of between 10 and 100 mm and/or a standard deviation of at least 2% of the mean value, and/or the third geometric parameter has with respect to all containers of the plurality of containers a mean value of between 1 and 5 mm and/or a standard deviation of at least 2% of the mean value.

Thus, in one embodiment it might alternatively or in addition be preferred that the group of geometric parameters comprises a first geometric parameter that is the collar outer diameter, a second geometric parameter that is the total height and a third geometric parameter that is the bottom print; wherein preferably the first geometric parameter has with respect to all containers of the plurality of containers a mean value of between 5 and 50 mm and/or a standard deviation of at least 2% of the mean value, the second geometric parameter has with respect to all containers of the plurality of containers a mean value of between 10 and 100 mm and/or a standard deviation of at least 2% of the mean value, and/or the third geometric parameter has with respect to all containers of the plurality of containers a mean value of between 10 and 40 mm and/or a standard deviation of at least 2% of the mean value.

Thus, in one embodiment it might alternatively or in addition be preferred that the group of geometric parameters comprises a first geometric parameter that is the shoulder angle, a second geometric parameter that is the total height and a third geometric parameter that is the heel radius; wherein preferably the first geometric parameter has with respect to all containers of the plurality of containers a mean value of between 10 and 50 mm and/or a standard deviation of at least 2% of the mean value, the second geometric parameter has with respect to all containers of the plurality of containers a mean value of between 10 and 100 mm and/or a standard deviation of at least 2% of the mean value, and/or the third geometric parameter has with respect to all containers of the plurality of containers a mean value of between 1 and 5 mm and/or a standard deviation of at least 2% of the mean value.

Thus, in one embodiment it might alternatively or in addition be preferred that the group of geometric parameters comprises a first geometric parameter that is the neck outer diameter, a second geometric parameter that is the total height and a third geometric parameter that is the heel radius; wherein preferably the first geometric parameter has with respect to all containers of the plurality of containers a mean value of between 5 and 50 mm and/or a standard deviation of at least 2% of the mean value, the second geometric parameter has with respect to all containers of the plurality of containers a mean value of between 10 and 100 mm and/or a standard deviation of at least 2% of the mean value, and/or the third geometric parameter has with respect to all containers of the plurality of containers a mean value of between 1 and 5 mm and/or a standard deviation of at least 2% of the mean value.

Thus, in one embodiment it might alternatively or in addition be preferred that the group of geometric parameters comprises a first geometric parameter that is the collar outer diameter, a second geometric parameter that is the bottom print and a third geometric parameter that is the heel radius; wherein preferably the first geometric parameter has with respect to all containers of the plurality of containers a mean value of between 5 and 50 mm and/or a standard deviation of at least 2% of the mean value, the second geometric parameter has with respect to all containers of the plurality of containers a mean value of between 10 and 40 mm and/or a standard deviation of at least 2% of the mean value, and/or the third geometric parameter has with respect to all containers of the plurality of containers a mean value of between 1 and 5 mm and/or a standard deviation of at least 2% of the mean value.

Thus, in one embodiment it might alternatively or in addition be preferred that the group of geometric parameters comprises a first geometric parameter that is the bottom print, a second geometric parameter that is the neck outer diameter and a third geometric parameter that is the heel radius; wherein preferably the first geometric parameter has with respect to all containers of the plurality of containers a mean value of between 10 and 40 mm and/or a standard deviation of at least 2% of the mean value, the second geometric parameter has with respect to all containers of the plurality of containers a mean value of between 5 and 50 mm and/or a standard deviation of at least 2% of the mean value, and/or the third geometric parameter has with respect to all containers of the plurality of containers a mean value of between 1 and 5 mm and/or a standard deviation of at least 2% of the mean value.

Thus, in one embodiment it might alternatively or in addition be preferred that the group of geometric parameters comprises a first geometric parameter that is the total height and a second geometric parameter that is the neck outer diameter; wherein preferably the first geometric parameter has with respect to all containers of the plurality of containers a mean value of between 10 and 100 mm and/or a standard deviation of at least 2% of the mean value, and/or the second geometric parameter has with respect to all containers of the plurality of containers a mean value of between 5 and 50 mm and/or a standard deviation of at least 2% of the mean value.

Thus, in one embodiment it might alternatively or in addition be preferred that the group of geometric parameters comprises a first geometric parameter that is the total height and a second geometric parameter that is the heel radius; wherein preferably the first geometric parameter has with respect to all containers of the plurality of containers a mean value of between 10 and 100 mm and/or a standard deviation of at least 2% of the mean value, and/or the second geometric parameter has with respect to all containers of the plurality of containers a mean value of between 1 and 5 mm and/or a standard deviation of at least 2% of the mean value.

Thus, in one embodiment it might alternatively or in addition be preferred that the group of geometric parameters comprises a first geometric parameter that is the total height and a second geometric parameter that is the shoulder angle; wherein preferably the first geometric parameter has with respect to all containers of the plurality of containers a mean value of between 10 and 100 mm and/or a standard deviation of at least 2% of the mean value, and/or the second geometric parameter has with respect to all containers of the plurality of containers a mean value of between 10 and 50 mm and/or a standard deviation of at least 2% of the mean value.

Thus, in one embodiment it might alternatively or in addition be preferred that the group of geometric parameters comprises a first geometric parameter that is the bottom print and a second geometric parameter that is the heel radius; wherein preferably the first geometric parameter has with respect to all containers of the plurality of containers a mean value of between 10 and 40 mm and/or a standard deviation of at least 2% of the mean value, and/or the second geometric parameter has with respect to all containers of the plurality of containers a mean value of between 1 and 5 mm and/or a standard deviation of at least 2% of the mean value.

Thus, in one embodiment it might alternatively or in addition be preferred that the group of geometric parameters comprises a first geometric parameter that is the shoulder angle and a second geometric parameter that is the collar outer diameter; wherein preferably the first geometric parameter has with respect to all containers of the plurality of containers a mean value of between 10 and 50 mm and/or a standard deviation of at least 2% of the mean value, and/or the second geometric parameter has with respect to all containers of the plurality of containers a mean value of between 5 and 50 mm and/or a standard deviation of at least 2% of the mean value.

Thus, in one embodiment it might alternatively or in addition be preferred that the group of geometric parameters comprises a first geometric parameter that is the neck outer diameter and a second geometric parameter that is the collar outer diameter; wherein preferably the first geometric parameter has with respect to all containers of the plurality of containers a mean value of between 5 and 50 mm and/or a standard deviation of at least 2% of the mean value, and/or the second geometric parameter has with respect to all containers of the plurality of containers a mean value of between 5 and 50 mm and/or a standard deviation of at least 2% of the mean value.

Thus, in one embodiment it might alternatively or in addition be preferred that the group of geometric parameters comprises a first geometric parameter that is the total height and a second geometric parameter that is the collar outer diameter; wherein preferably the first geometric parameter has with respect to all containers of the plurality of containers a mean value of between 10 and 100 mm and/or a standard deviation of at least 2% of the mean value, and/or the second geometric parameter has with respect to all containers of the plurality of containers a mean value of between 5 and 50 mm and/or a standard deviation of at least 2% of the mean value.

Thus, in one embodiment it might alternatively or in addition be preferred that the group of geometric parameters comprises a first geometric parameter that is the neck outer diameter and a second geometric parameter that is the total height; wherein preferably the first geometric parameter has with respect to all containers of the plurality of containers a mean value of between 5 and 50 mm and/or a standard deviation of at least 2% of the mean value, and/or the second geometric parameter has with respect to all containers of the plurality of containers a mean value of between 10 and 100 mm and/or a standard deviation of at least 2% of the mean value.

Thus, in one embodiment it might alternatively or in addition be preferred that the group of geometric parameters comprises a first geometric parameter that is the shoulder angle; wherein preferably the first geometric parameter has with respect to all containers of the plurality of containers a mean value of between 10 and 50 mm and/or a standard deviation of at least 2% of the mean value.

Thus, in one embodiment it might alternatively or in addition be preferred that the group of geometric parameters comprises a first geometric parameter that is the collar outer diameter; wherein preferably the first geometric parameter has with respect to all containers of the plurality of containers a mean value of between 5 and 50 mm and/or a standard deviation of at least 2% of the mean value.

Thus, in one embodiment it might alternatively or in addition be preferred that the group of geometric parameters comprises a first geometric parameter that is the heel radius; wherein preferably the first geometric parameter has with respect to all containers of the plurality of containers a mean value of between 1 and 5 mm and/or a standard deviation of at least 2% of the mean value.

Thus, in one embodiment it might alternatively or in addition be preferred that the group of geometric parameters comprises a first geometric parameter that is the neck outer diameter; wherein preferably the first geometric parameter has with respect to all containers of the plurality of containers a mean value of between 5 and 50 mm and/or a standard deviation of at least 2% of the mean value.

Thus, in one embodiment it might alternatively or in addition be preferred that the group of geometric parameters comprises a first geometric parameter that is the total height; wherein preferably the first geometric parameter has with respect to all containers of the plurality of containers a mean value of between 10 and 100 mm and/or a standard deviation of at least 2% of the mean value.

Thus, in one embodiment it might alternatively or in addition be preferred that the group of geometric parameters comprises a first geometric parameter that is the bottom print; wherein preferably the first geometric parameter has with respect to all containers of the plurality of containers a mean value of between 10 and 40 mm and/or a standard deviation of at least 2% of the mean value.

Thus, in one embodiment it might alternatively or in addition be preferred that the group of geometric parameters comprises a first geometric parameter that is the total height, a second geometric parameter that is the bottom thickness and a third geometric parameter that is the heel radius; wherein preferably the first geometric parameter has with respect to all containers of the plurality of containers a mean value of between 10 and 100 mm and/or a standard deviation of at least 2% of the mean value, the second geometric parameter has with respect to all containers of the plurality of containers a mean value of between 0.3 and 1 mm and/or a standard deviation of at least 2% of the mean value, and/or the third geometric parameter has with respect to all containers of the plurality of containers a mean value of between 1 and 5 mm and/or a standard deviation of at least 2% of the mean value.

Thus, in one embodiment it might alternatively or in addition be preferred that the group of geometric parameters comprises a first geometric parameter that is the body height, a second geometric parameter that is the bottom thickness and a third geometric parameter that is the heel radius; wherein preferably the first geometric parameter has with respect to all containers of the plurality of containers a mean value of between 10 and 70 mm and/or a standard deviation of at least 2% of the mean value, the second geometric parameter has with respect to all containers of the plurality of containers a mean value of between 0.3 and 1 mm and/or a standard deviation of at least 2% of the mean value, and/or the third geometric parameter has with respect to all containers of the plurality of containers a mean value of between 1 and 5 mm and/or a standard deviation of at least 2% of the mean value.

Thus, in one embodiment it might alternatively or in addition be preferred that the group of geometric parameters comprises a first geometric parameter that is the total height, a second geometric parameter that is the body outer diameter and a third geometric parameter that is the neck outer diameter; wherein preferably the first geometric parameter has with respect to all containers of the plurality of containers a mean value of between 10 and 100 mm and/or a standard deviation of at least 2% of the mean value, the second geometric parameter has with respect to all containers of the plurality of containers a mean value of between 5 and 50 mm and/or a standard deviation of at least 2% of the mean value, and/or the third geometric parameter has with respect to all containers of the plurality of containers a mean value of between 5 and 50 mm and/or a standard deviation of at least 2% of the mean value.

Thus, in one embodiment it might alternatively or in addition be preferred that the group of geometric parameters comprises a first geometric parameter that is the total height, a second geometric parameter that is the bottom print and a third geometric parameter that is the body height; wherein preferably the first geometric parameter has with respect to all containers of the plurality of containers a mean value of between 10 and 100 mm and/or a standard deviation of at least 2% of the mean value, the second geometric parameter has with respect to all containers of the plurality of containers a mean value of between 10 and 40 mm and/or a standard deviation of at least 2% of the mean value, and/or the third geometric parameter has with respect to all containers of the plurality of containers a mean value of between 10 and 70 mm and/or a standard deviation of at least 2% of the mean value.

The problem is solved by the invention according to a second aspect in that a pharmaceutical container, especially as comprised by the plurality of containers according to the first aspect of the invention, wherein at least one geometric parameter is or can be defined for that container, and each of all defined geometric parameter has a certain value for that container; wherein preferably for a group of geometric parameters, which are selected from all defined geometric parameters, each geometric parameter of that group, when evaluated for a plurality of such containers, has a standard deviation which is greater than or equal to a lower threshold value specific for the respective geometric parameter; wherein preferably each lower threshold value is at least 1% of the mean value of the respective geometric parameter, wherein the mean value is or can be evaluated for the plurality of such containers is proposed.

It is, thus, the surprising finding that the features of a single container represented by geometric parameters might be used for the purpose of subsequent identification of that container among others.

In addition, reference can be made to the advantages and statements provided above with respect to the first aspect of the invention, which apply here, mutatis mutandis, too.

It especially has further been surprisingly found that for a respective group of geometric parameters statistical data such as a standard deviation or a mean value might be obtained for each geometric parameter when a plurality of such containers is evaluated. This allows a further improved handling, particularly identifying, of the containers.

In one embodiment it might be alternatively or in addition preferred that the lower threshold value is at least 3%, at least 5%, at least 10%, at least 50%, at least 100%, at least 300%, at least 500%, at least 1%, at least 3%, at least 5%, at least 10%, at least 15% or at least 20%, respectively, of the mean value of the respective geometric parameter.

In one embodiment it might be alternatively or in addition preferred that for the group of geometric parameters, which are selected from all defined geometric parameters, each geometric parameter of that group has a standard deviation which is smaller than or equal to an upper threshold value specific for the respective geometric parameter; wherein preferably each upper threshold value is at most 50%, at most 40%, at most 30%, at most 20%, at most 10%, at most 5% or at most 3%, at most 2% or at most 1% of, respectively, the mean value of the respective geometric parameter.

In preferred embodiments the pharmaceutical container might alternatively or in addition be designed in form of a vial or a cartridge.

The problem is solved by the invention according to a third aspect in that a method for producing a plurality of pharmaceutical containers, especially a plurality of containers according to the first aspect of the invention, comprising the steps of: forming a plurality of containers for which at least one geometric parameter is or can be defined and each of all defined geometric parameters has a certain value for each container of the plurality of containers; wherein each of all defined geometric parameters has with respect to all containers of the plurality of containers a mean value and a standard deviation; wherein forming the plurality of containers comprises the step of: forming for each container of the plurality of containers the geometric features corresponding to a group of geometric parameters, which are selected from all defined geometric parameters such that each geometric parameter of that group has a standard deviation which is greater than or equal to a lower threshold value specific for the respective geometric parameter; wherein each lower threshold value is at least 1% of the mean value of the respective geometric parameter is proposed.

The invention is, thus, based on the surprising finding that the standard deviation of the geometric parameters can be exploited in the manufacturing process of the respective containers. This allows that the produced containers are appropriate for use under the inventive concept with respect to registration and identification of individual containers among each other.

The choice of the geometric parameters, especially the standard deviation of the parameters across a plurality of containers, can be easily accomplished for example by respective adaptions of the fabrication parameters applied during the process when the containers are hot molded. Of course, it is always the ambition that the final products are as uniform as possible in order to meet high quality standards. However, it has been surprisingly found that it is sufficient if the lower threshold values set for the standard deviations of the respective geometric parameters are small, so that a high quality promise can still be fulfilled while at the same time providing containers which can be used in methods as disclosed by the present invention.

In one embodiment it might be alternatively or in addition preferred that the lower threshold value is at least 3%, at least 5%, at least 10%, at least 50%, at least 100%, at least 300%, at least 500%, at least 1%, at least 3%, at least 5%, at least 10%, at least 15% or at least 20%, respectively, of the mean value of the respective geometric parameter.

In one embodiment it might be alternatively or in addition preferred that for the group of geometric parameters, which are selected from all defined geometric parameters, each geometric parameter of that group has a standard deviation which is smaller than or equal to an upper threshold value specific for the respective geometric parameter; wherein preferably each upper threshold value is at most 50%, at most 40%, at most 30%, at most 20%, at most 10%, at most 5% or at most 3%, at most 2% of at most 1%, respectively, of the mean value of the respective geometric parameter.

The problem is solved by the invention according to a fourth aspect in that a method for registration of at least one pharmaceutical container, especially at least one container of a plurality of containers according to the first aspect of the invention, at least one container according to the second aspect of the invention and/or at least one container produced by the method of the third aspect of the invention, comprising the steps of: determining, for at least one group of geometric parameters of the container under registration, for each geometric parameter of the group the value it has for the container under registration; and storing the determined values the container under registration has for each geometric parameter of the group, preferably as unique identifier for that container and/or in at least one database is proposed.

The invention is, thus, based on the surprising finding that a registration of a container can be accomplished by simply capturing the values of one or more geometric parameters which in combination provide a unique identifier for that container. This is an easy and efficient way for example to include a container in the inventory list and making the container available for subsequent identification.

This is a beneficial approach particularly for containers having a standard deviation for the respective geometric parameters in accordance with the present invention.

It is particularly acknowledged that employing a database allows organizing and handling a large number of different containers in an efficient way. For example, the serial number of each record in the database may be used as unique identifier for each container. This might be alternatively understood as meaning that the set of geometric parameters defined for the particular group represents at least implicitly (e.g., via the serial number) the unique identifier.

In this respect it has been found advantageous to use such geometric parameters for the purpose of registration and consequently for the purpose of identification which can be captured easily and with high reliability and which can also be made subject to a sufficiently large variation so that their standard deviations can be obtained with an appropriate lower threshold value in the production process of the containers.

The problem is solved by the invention according to a fifth aspect in that a method for identification of at least one pharmaceutical container, especially at least one container of a plurality of containers according to the first aspect of the invention, at least one container according to the second aspect of the invention, at least one container produced by the method according to the third aspect of the invention and/or at least one container which has been registered according to the method of the fourth aspect of the invention, comprising the steps of: determining, for at least one group of geometric parameters of the container under identification, for each geometric parameter of the group the value it has for the container under identification; and receiving, based on the determined values the container under identification has for each geometric parameter of the group, at least one unique identifier for the container under identification, preferably from at least one database is proposed.

The invention is, thus, based on the surprising finding that the values of a group of a specific set of geometric parameters of a container allows that the container can be identified in an easy and reliable manner. This is because the combination of the values is unique if the variation across a plurality of containers is chosen appropriately.

In other words, an identification of a container can be accomplished by simply capturing the values of geometric parameters as defined in a group of parameters. This is an easy and efficient way to track containers or to recall data associated with the container.

This is a beneficial approach particularly for containers having a standard deviation for the respective geometric parameters in accordance with the present invention.

It is particularly acknowledged that employing a database allows organizing and handling a large number of different containers in an efficient way. For example, the serial number of each record in the database may be used as unique identifier for each container. This might be alternatively understood as meaning that the set of geometric parameters defined for the particular group represents at least implicitly (e.g., via the serial number) the unique identifier.

In this respect it has been found advantageous to use such geometric parameters for the purpose of identification (i.e., being elements of the group of geometric parameters) which can be captured easily and with high reliability and which can also be made subject to a sufficiently large variation so that their standard deviations can be obtained with an appropriate lower threshold value in the production process of the containers.

The problem is solved by the invention according to a sixth aspect in that a method for determining the operation state of at least one machine for producing pharmaceutical containers, especially containers according to the first or second aspect of the invention and/or the machine used for the method of the third aspect of the invention, comprising the steps of: producing a plurality of containers, the plurality preferably having more than 99 pieces, more preferably having more than 499 pieces, even more preferably having more than 999 pieces; determining, for at least one group of geometric parameters of the containers, for each geometric parameter of the group a mean value and a standard deviation with respect to all containers of the plurality of containers; determining, for each standard deviation of the geometric parameters of the group, if the standard deviation is greater than or equal to a first threshold value specific for the respective geometric parameter and if the standard deviation is less than or equal to a second threshold value specific for the respective geometric parameter; wherein each first threshold value is between 1% and 100% of the mean value of the respective geometric parameter and each second threshold value is between 2% and 200% of the mean value of the respective geometric parameter; and assigning the operation state of the machine to a first state if each standard deviation of the geometric parameters of the group is greater than or equal to the specific first threshold value and less than or equal to the specific second threshold value, otherwise assigning the operation state of the machine to a second state is proposed.

The invention is, thus, based on the surprising finding that a mal-operation of a production machine can be reliably determined nearly in real time based on the geometric parameters of a batch of containers produced by that machine.

It has been particularly found that using the geometric parameters (or a group of selected ones thereof) allows that the operation state can be obtained in an easy manner and above all without the need of accessing the machine itself and/or interrupting the operation of the machine. Instead, a comfortable and easy evaluation of the geometric parameters of the containers provides the respective information.

This is a highly advantageous situation since it allows a cheap, fast, continuous and reliable state inspection.

It is particularly noted that the first state is assigned as long as the standard deviation of each observed geometric parameter is between the first and second threshold value.

It is furthermore particularly advantageous that this evaluation can be accomplished without the need of any additional knowledge of the history of the process. The operation state can be determined completely "offline" since all data required for the respective evaluation can be obtained from the batch of containers under investigation and subsequently evaluated without the need of any further information of the process or machine.

Hence, this process is quite robust and allows an efficient handling and on-the-fly verification of the machine's operation state in a production environment.

In one embodiment it might be alternatively or in addition preferred that the first threshold value is 1%, 3%, 5%, 10%, 15%, 20%, 30%, 40%, 50%, 60%, 70%, 80%, 90% or 100%, respectively, of the mean value of the respective geometric parameter.

In one embodiment it might be alternatively or in addition preferred that the second threshold value is 2%, 3%, 5%, 10%, 15%, 20%, 30%, 40%, 50%, 60%, 70%, 80%, 90%, 100%, 125%, 150%, 175%, 200%, 225% or 250%, respectively, of the mean value of the respective geometric parameter.

In one embodiment it might be alternatively or in addition preferred that the first and second threshold values are: 1% and 20% or 1% and 50%, respectively, of the mean value of the respective geometric parameter.

In one embodiment, it might alternatively or in addition be preferred that the operation of the machine is faultless if the first state has been assigned to the operation state.

In one embodiment, it might alternatively or in addition be preferred that the operation of the machine is not faultless if the second state has been assigned to the operation state.

In one embodiment, it might alternatively or in addition be preferred that, if at least one standard deviation of the geometric parameters of the group is greater than the specific second threshold value or at least one standard deviation of the geometric parameters of the group is less than the specific first threshold value the operation state of the machine is assigned to a first second state, wherein preferably the standard deviations of the other geometric parameters of the group are greater than or equal to the specific first threshold value and less than or equal to the specific second threshold value.

In one embodiment, it might alternatively or in addition be preferred that, if at least one standard deviation of the geometric parameters of the group is greater than the specific second threshold value and at least one other standard deviation of the geometric parameters of the group is less than the specific first threshold value the operation state of the machine is assigned to a second second state.

If a second state is specified in more detail, such as in a first second and second second state, it is possible to differentiate different scenarios indicating a mal-function of the machine more easily which in turn allows a more specific reaction, hence, a more efficient troubleshooting. It has in this respect surprisingly been found that situations where standard deviations tend in the same direction (hence might trigger a first second state) might indicate other types of mal-functions than situations in which standard deviations tend in opposite directions (hence might trigger a second second state).

The problem is solved by the invention according to a seventh aspect in that a method for determining the authenticity of a plurality of pharmaceutical containers, especially a plurality of containers according to the first aspect of the invention, comprising the steps of: determining, for at least one group of geometric parameters of the containers, for each geometric parameter of the group a mean value and a standard deviation with respect to all containers of the plurality of containers; determining, for each standard deviation of the geometric parameters of the group, if the standard deviation is greater than or equal to a lower threshold value specific for the respective geometric parameter; wherein each lower threshold value is at least 1% of the mean value of the respective geometric parameter; and assigning the plurality of containers to a first group of containers if each standard deviation of the geometric parameters is greater than or equal to the specific lower threshold value, otherwise assigning the plurality of containers to a second group of containers is proposed.

The invention is, thus, based on the surprising finding that the authenticity of a batch of containers as a whole can be reliably determined nearly in real time based on the geometric parameters of the respective batch of containers.

It has been particularly found that using the geometric parameters (or a group of selected ones thereof) allows that the authenticity can be verified by means of a comfortable and easy evaluation of the geometric parameters of the containers.

This is a highly advantageous situation since it allows a cheap, fast, continuous and reliable evaluation.

It is particularly noted that when the batch of containers is assigned to a first group of containers it is classified as being authentic. This means, that the plurality of containers evaluated fulfill the requirements to be used in the present invention with respect to registration and identification, and as an indicator of the operation state of a production machine.

It is furthermore particularly advantageous that this evaluation can be accomplished without the need of any additional knowledge of the history of the process. The authenticity can be determined completely "offline" since all data required for the respective evaluation can be obtained from the batch of containers under investigation and subsequently evaluated without the need of any further information of the process or machine.

Hence, this process is quite robust and allows an efficient handling and on-the-fly verification of the containers in a production environment.

In one embodiment it might be alternatively or in addition preferred that the lower threshold value is at least 1%, at least 3%, at least 5%, at least 10%, at least 15% or at least 20%, respectively, of the mean value of the respective geometric parameter.

In one embodiment it might be alternatively or in addition preferred that for the group of geometric parameters, which are selected from all defined geometric parameters, each geometric parameter of that group has a standard deviation which is smaller than or equal to upper threshold value specific for the respective geometric parameter; wherein preferably each upper threshold value is at most 50%, at most 40%, at most 30%, at most 20%, at most 10%, at most 5% or at most 3% of the mean value of the respective geometric parameter.

General Aspects of a Pharmaceutical Container

In general, a pharmaceutical container, especially a vial or a cartridge, and as preferably used within the scope of the present invention, comprises a plurality of parts. Preferably, the following parts are comprised by a pharmaceutical container such as a vial:

Each container might have a tube with a first end and a further end, wherein the tube is characterized by a center axis and comprises, in a direction from the top to the bottom, preferably one or more of the parts: a top region that is located at the first end of the tube; a collar region comprising at least one collar that preferably follows the top region; a neck region comprising at least one neck that preferably follows the collar region; a shoulder region comprising at least one shoulder that preferably follows the neck region; a body region comprising at least one body that preferably follows the shoulder region; a heel region comprising at least one heel that preferably follows the body region, and that preferably extends to the further end of the tube; and a bottom region comprising at least one bottom that preferably follows the heel region and/or the body region and that closes the tube at the further end.

Also preferably, the following parts are comprised by a pharmaceutical container in form of a cartridge. Each container might have a tube with a first end and a further end, wherein the tube is characterized by a center axis and comprises, in a direction from the top to the bottom (i.e., the further end, if no bottom is defined for the respective container), preferably one or more of the parts: a top region that is located at the first end of the tube; a collar region comprising at least one collar that preferably follows the top region; a neck region comprising at least one neck that preferably follows the collar region; a shoulder region comprising at least one shoulder that preferably follows the neck region; a body region comprising at least one body that preferably follows the shoulder region; a heel region comprising at least one heel that preferably follows the body region, and that preferably extends to the further end of the tube; and preferably, the outer diameter of the top region is dt, the outer diameter of the neck region is dn with dn<dt, the outer diameter of the body region is db with db>dt, and/or the thickness of the material (e.g., glass or polymer) in the body region is lb.

Preferably, the top region comprises at least one top outer surface, which might also represent at least one part of at least one sealing surface.

Preferably, the collar comprises one or more different subparts. For example, the collar may comprise at least one first inclined outer surface having a normal vector pointing in a direction upwards, at least one vertical outer surface having a normal vector pointing in a direction perpendicular to the center axis of the container, and/or at least one second inclined outer surface having a normal vector pointing in a direction downwards.

With respect to a container or parts thereof, in preferred embodiments of the present invention alternatively or in addition the term "upwards" might be defined as being a direction having a direction vector which has a projection on the center axis of the container pointing in a direction from the container's bottom (or further end, if no bottom is defined for the respective container) to top (or first end).

Preferably, the vertical outer surface extends along a direction parallel to the center axis of the vial, especially in at least one cross-sectional plane comprising the entire center axis.

With respect to a container or parts thereof, in preferred embodiments of the present invention alternatively or in addition the term "downwards" might be defined as being a direction having a direction vector which has a projection on the center axis of the container pointing in a direction from the container's top (or first end) to bottom (or further end, if no bottom is defined for the respective container).

Preferably, the first inclined surface connects the vertical outer surface with the top outer surface. Preferably, the second inclined surface connects the vertical outer surface with the part following the collar, such as the neck.

Of course, the vertical outer surface may also be replaced by some arbitrarily formed outer surface, which then might have at least one normal vector which does not point in a direction perpendicular to the center axis of the container.

It is acknowledged that it is not required for the present invention that a pharmaceutical container, especially in form of a vial or cartridge, necessarily comprises all of the mentioned parts.

Preferably, the mentioned parts do not have to be arranged strictly one after the other from top to bottom as enumerated in the above-mentioned list. In preferred embodiments, there are one or more other parts between at least two parts in the above-mentioned list.

BRIEF DESCRIPTION OF THE FIGURES

Various aspects of this invention will become apparent to those skilled in the art from the following detailed description of preferred embodiments, when read in light of the accompanying schematic drawings, wherein:

FIGS. 6b-6d each shows a cross-sectional view of an upper region of a similar vial to that shown in FIG. 6a.

FIG. 7b shows a cross-sectional view of a similar vial than that shown in FIG. 7a.

FIG. 8b shows a cross-sectional view of the upper region of a similar vial to that shown in FIG. 8a.

FIG. 9b shows a cross-sectional view of the upper region of a similar vial than that shown in FIG. 9a.

FIG. 12b shows a cross-sectional view of the upper region of a similar vial than that shown in FIG. 12a.

FIG. 13b shows a cross-sectional view of a similar vial than that shown in FIG. 13a.

FIG. 15b shows a cross-sectional view of the upper region of a similar vial than that shown in FIG. 15a.

FIG. 16b shows a cross-sectional view of the upper region of a similar vial than that shown in FIG. 16a.

FIG. 18b shows a cross-sectional view of the upper region of a similar vial than that shown in FIG. 18a.

FIG. 20b shows a cross-sectional view of the upper region of a similar vial than that shown in FIG. 20a.

FIG. 21b shows a cross-sectional view of some side region of a similar vial than that shown in FIG. 21a.

FIG. 22b shows a cross-sectional view of the lower region of a similar vial than that shown in FIG. 22a.

FIG. 23b shows a cross-sectional view of some upper region of a similar vial than that shown in FIG. 23a.

FIG. 24b shows a cross-sectional view of an area of the collar of a similar vial than that shown in FIG. 24a.

FIG. 25b shows a cross-sectional view of an area of the collar of a similar vial than that shown in FIG. 25a.

FIG. 26b shows a cross-sectional view of an area of the collar of a similar vial than that shown in FIG. 26a.

FIG. 29b shows a magnification of the upper region of the container of FIG. 29a;

FIG. 30b shows a magnification of the upper region of the container of FIG. 30a;

FIG. 31b shows a magnification of the upper region of the container of FIG. 31a.

DETAILED DESCRIPTION

Figure 1:
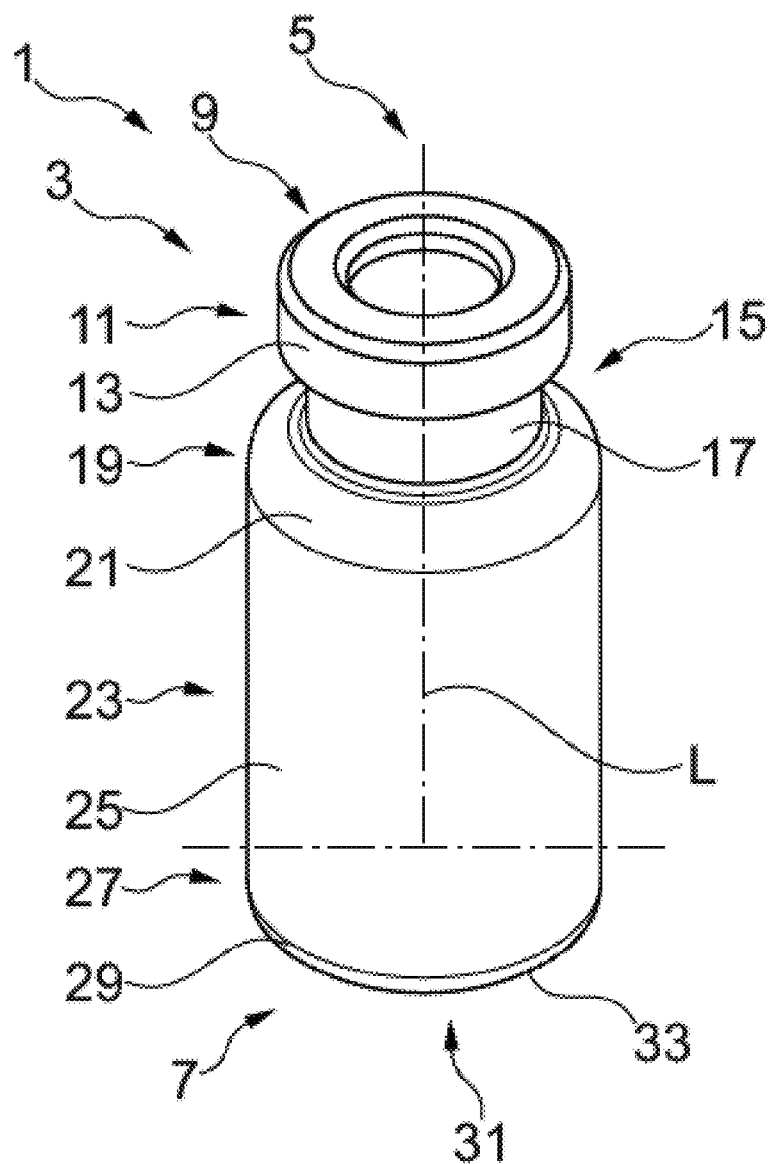
FIG. 1 shows a pharmaceutical container 1, which is designed in form of a vial, in a perspective view.

FIG. 1 shows a pharmaceutical container 1, which is designed in form of a vial, in a perspective view. The container 1 can be for example one container of a plurality of containers according to the invention.

The container 1 has a tube 3 with a first end 5 and a further end 7, wherein the tube 3 is characterized by a center axis L and comprises, in a direction from the top (i.e., first end 5) to the bottom (i.e., further end 7) the parts: a top region 9 that is located at the first end 5 of the tube 3; a collar region 11 comprising a collar 13 that follows the top region 9; a neck region 15 comprising a neck 17 that follows the collar region 11; a shoulder region 19 comprising a shoulder 21 that follows the neck region 15; a body region 23 comprising a body 25 that follows the shoulder region 19; a heel region 27 comprising a heel 29 that follows the body region 23 and that extends to the further end 7 of the tube 3; and a bottom region 31 comprising a bottom 33 that follows the heel region 27 and that closes the tube at the further end 7.

Exemplary Geometric Parameters

In the description above, references have been made to geometric parameters which are employed in the different aspects of the present invention. For a container, such as a vial, especially such as the vial shown in FIG. 1 (also see respective description in this respect), a plurality of geometric parameters can be defined which might be used in the field of the present invention. Below some common geometric parameters are described in further detail with reference to respective FIGS. 2 to 27. Similar features in the FIGS. 2 to 27 (and FIGS. 28 to 31b) are labeled throughout the figures with the same reference signs.

It is acknowledged that for the same geometric parameters throughout this application the same reference signs (abbreviations) are used, unless otherwise stated or evident from the context.

However, the list does not claim to be exhaustive and many other geometric parameters may be defined and used in conjunction with the present invention as well.

Bottom Perpendicularity

Figure 2:
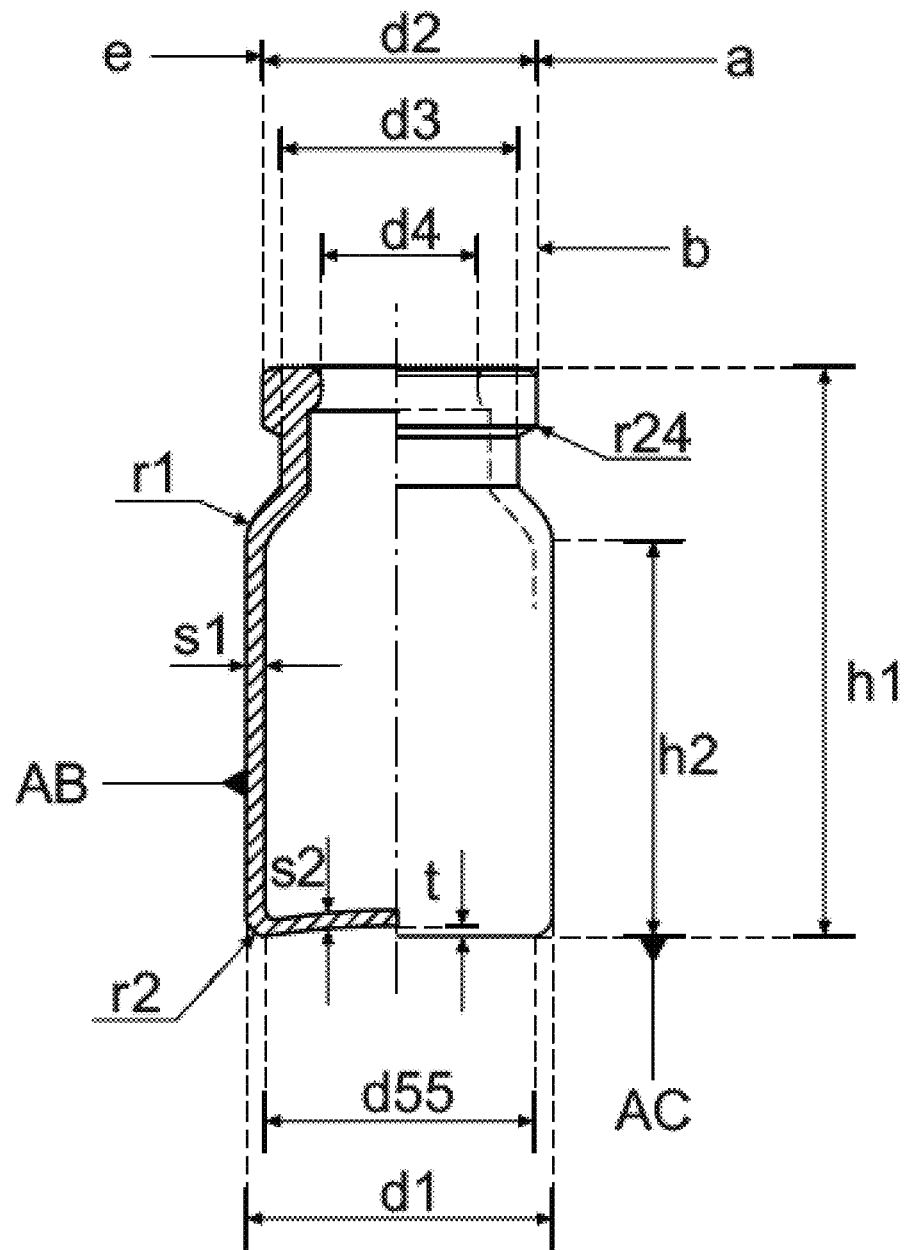
FIG. 2 shows a partially sectioned view of a vial as used in the present invention.

FIG. 2 shows a partially sectioned view of a vial as used in the present invention.

The bottom perpendicularity is indicated as a in FIG. 2.

This geometric parameter is the minimal value of all specific angles, wherein each of the specific angles refers to a different individual angle, wherein each individual angle is enclosed by on the one hand the center axis of the vial and on the other hand a different individual straight line corresponding to the respective individual angle, wherein each individual straight line touches the bottom surface of the vial in at least two points and lies within a different individual plane, wherein each individual plane comprises the entire center axis of the vial.

Preferably, touching a surface in a point means here being tangent to the surface in that point.

Lower Collar Angle

Figure 3A:
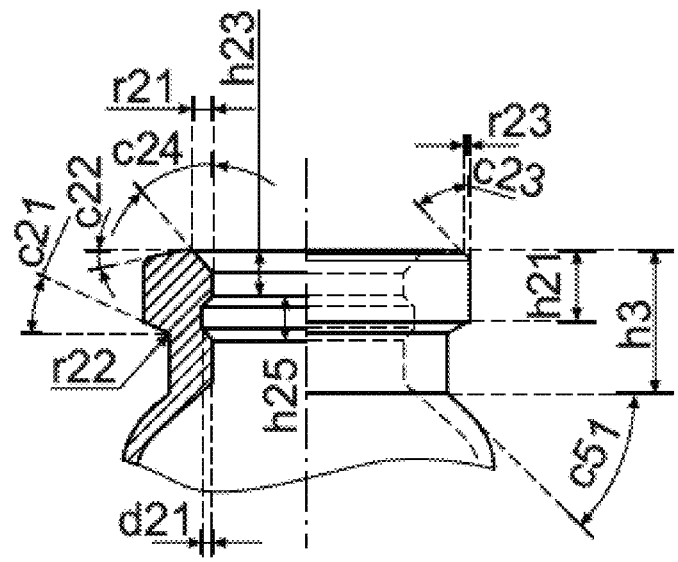
FIG. 3a shows a partially sectioned view of one area of a vial as used in the present invention.
Figure 3B:
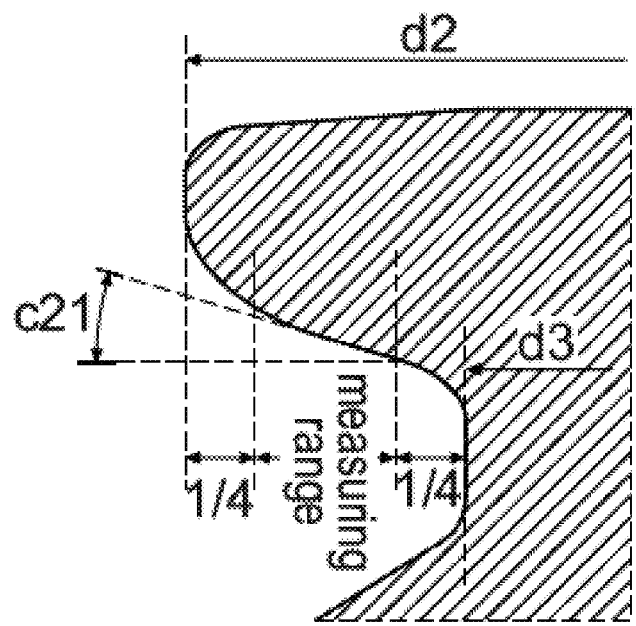
FIG. 3b shows a cross-sectional view of the upper region of a similar vial to that shown in FIG. 3a, wherein the cross-sectional view lies within a plane that comprises the entire center axis of the vial.

FIG. 3a shows a partially sectioned view of one area of a vial as used in the present invention. FIG. 3b shows a cross-sectional view of the upper region of a similar vial to that shown in FIG. 3a, wherein the cross-sectional view lies within a plane that comprises the entire center axis of the vial.

The lower collar angle is indicated as c21 in FIGS. 3a and 3b.

This geometric parameter is, preferably in at least one cross-sectional view of the vial, wherein the cross-sectional view lies within a plane that comprises the entire center axis of the vial, the angle between on the one hand a straight line and on the other hand a plane oriented perpendicular to the center axis of the vial; wherein the straight line is determined, preferably in the cross-sectional view, by the least squares method at a section of the collar's surface which has a normal vector pointing in a direction towards at least one plane which comprises the bottom of the vial.

Preferably, the section of the collar's surface is divided into four quarters and the middle two quarters are used for applying the fit in form of the least squares method, preferably in the cross-sectional view.

Upper Collar Angle

Figure 4:
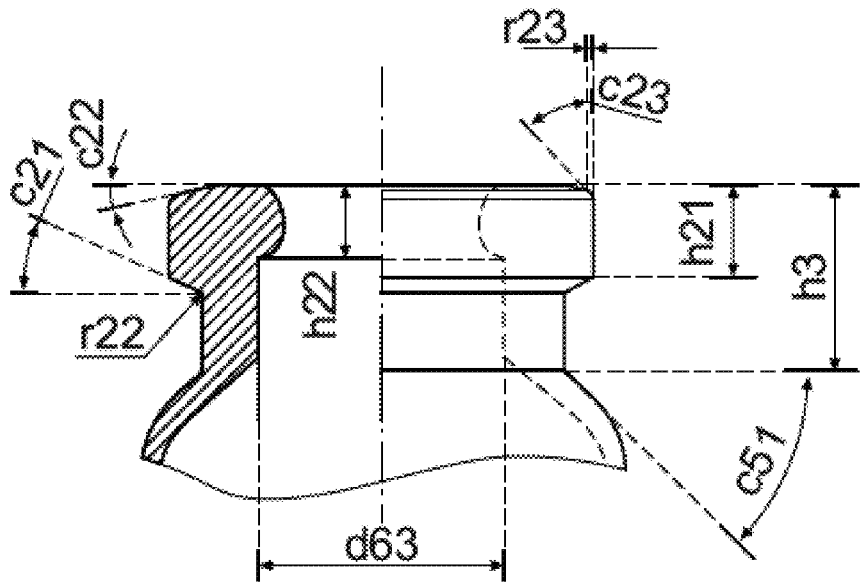
FIG. 4 shows a partially sectioned view of one area of a vial as used in the present invention.

FIG. 4 shows a partially sectioned view of one area of a vial as used in the present invention.

The upper collar angle is indicated as c22 in FIG. 4.

This geometric parameter is, preferably in at least one cross-sectional view of the vial, wherein the cross-sectional view lies within a plane that comprises the entire center axis of the vial, the angle between on the one hand a straight line and on the other hand a plane oriented perpendicular to the center axis of the vial; wherein the straight line is determined, preferably in the cross-sectional view, by at least one section of the collar's surface which is adjacent to the vial's top opening and which has a normal vector pointing in a direction towards the plane comprising the top of the vial.

In other words, the upper collar angle might also be called the seal surface angle and is the straight, sloping transition between the vial's mouth (i.e., vial's opening) and the collar outer diameter.

A common method for determining the upper collar angle preferably comprises one or more of the following steps: Placing the vial on the flat plate/v-block in an optical comparator; Moving the collar of the vial onto the screen and bring it into focus; Moving the horizontal line to be in line with the vial seal surface; Identifying where the seal surface angle begins and move the cross-hairs to that point; Rotating the screen with the dial until the horizontal axis touches the top of the seal surface to collar transition; Recording the angle in the established data collection system.

Collar Facet Angle

Figure 5:
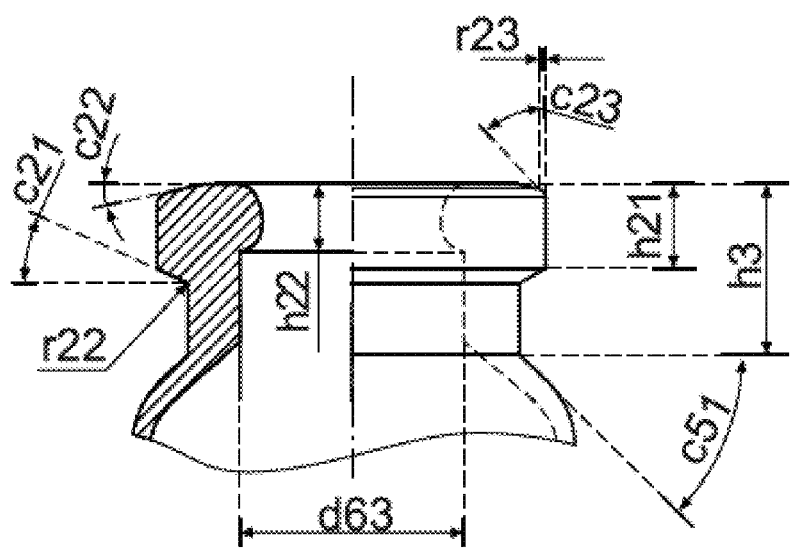
FIG. 5 shows a partially sectioned view of one area of a vial as used in the present invention.

FIG. 5 shows a partially sectioned view of one area of a vial as used in the present invention.

The collar facet angle is indicated as c23 in FIG. 5.

This geometric parameter is, preferably in at least one cross-sectional view of the vial, wherein the cross-sectional view lies within a plane that comprises the entire center axis of the vial, the angle between on the one hand a first straight line and on the other hand a second straight line oriented parallel to the center axis of the vial and crossing the outer circumference of the collar; wherein the first straight line is determined, preferably in the cross-sectional view, by at least one section of the collar's surface which is adjacent to the collar's surface having a normal vector pointing sideward and/or which section of the collar's surface further has a normal vector pointing in a direction towards the plane comprising the top of the vial.

Shoulder Angle

Figure 6A:
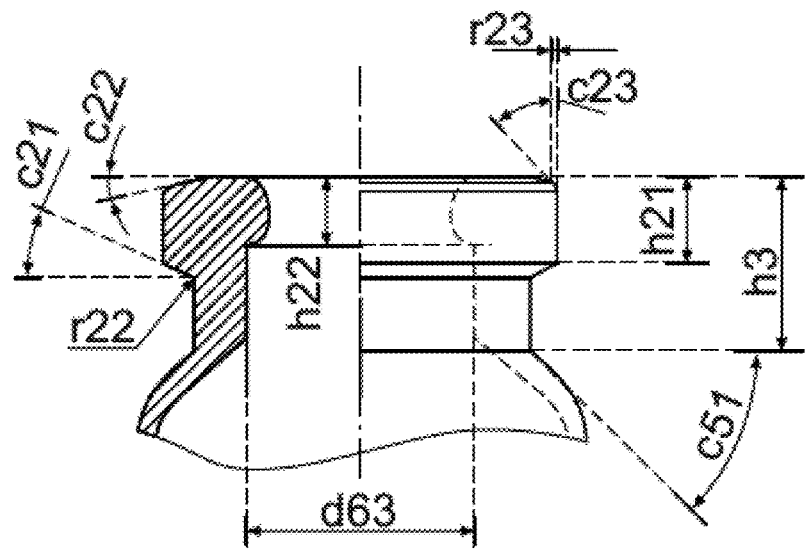
FIG. 6a shows a partially sectioned view of one area of a vial as used in the present invention.
Figure 6B:
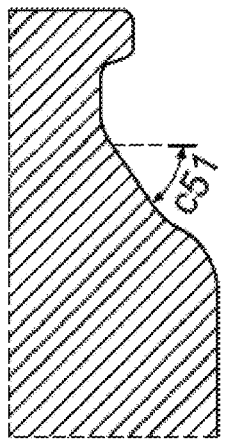
Figure 6C:
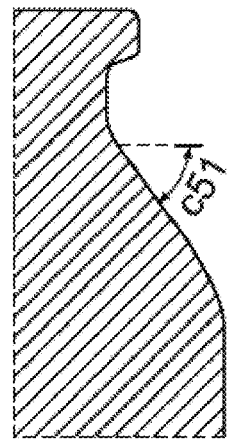
Figure 6D:
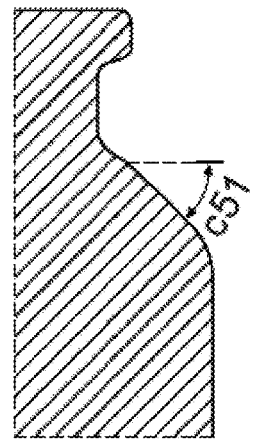

FIG. 6a shows a partially sectioned view of one area of a vial as used in the present invention. FIGS. 6b-6d each shows a cross-sectional view of an upper region of a similar vial to that shown in FIG. 6a, wherein each of the cross-sectional views in FIGS. 6b-6d lies within a plane that comprises the entire center axis of the respective vial.

The shoulder angle is indicated as c51 in FIGS. 6a-6d.

This geometric parameter is, preferably in at least one cross-sectional view of the vial, wherein the cross-sectional view lies within a plane that comprises the entire center axis of the vial, the angle between on the one hand a straight line and on the other hand a plane oriented perpendicular to the center axis of the vial.

Here the straight line is determined depending on the body's outer diameter d1 (see for example the reference sign d1 in FIG. 2). If d1 is smaller than 25 mm, then, preferably in the cross-sectional view, the longest straight line that falls in a non-pure-vertical manner indicates at least one section of the straight line. If d1 is larger than or equal to 25 mm, then, preferably in the cross-sectional view, a line drawn down the shoulder of the vial which connects the base of the neck-shoulder radius (see r51 e.g., in FIG. 10a) and the top of the shoulder radius (see r1 e.g., in FIG. 10a) indicates the straight line.

It is preferred that the straight line has a vertical distance of 1 mm, of 2 mm or even more from the bottom end of the neck of the vial, especially in the cross-sectional view.

FIGS. 6b and 6d shows an illustration of a part of a vial having d1<25 mm and FIG. 6c shows an illustration of a part of a vial having d1≥25 mm.

Preferably, vertical here indicates a direction parallel to the center axis of the vial.

Body Outer Diameter

Figure 7A:
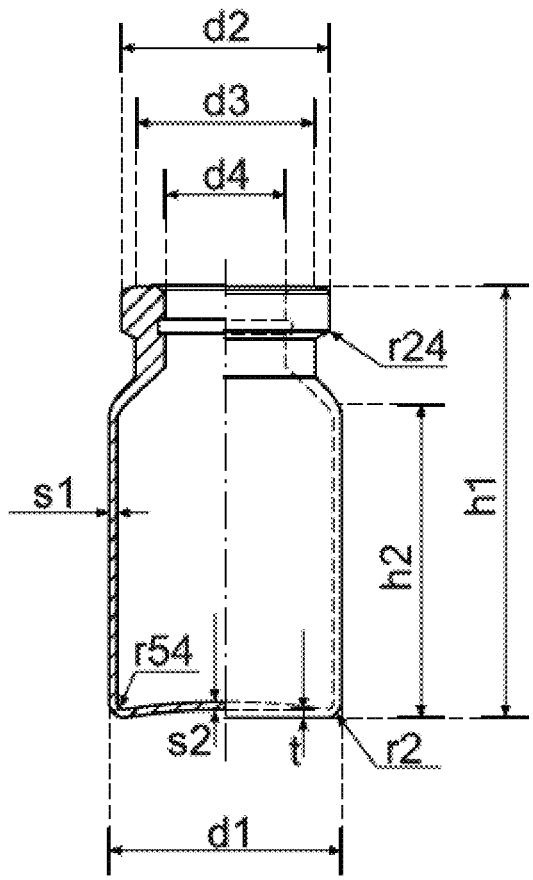
FIG. 7a shows a partially sectioned view of a vial as used in the present invention.
Figure 7B:
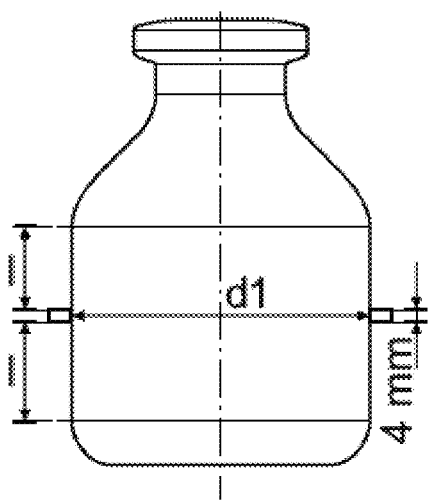

FIG. 7a shows a partially sectioned view of a vial as used in the present invention. FIG. 7b shows a cross-sectional view of a similar vial than that shown in FIG. 7a, wherein the cross-sectional view lies within a plane that comprises the entire center axis of the vial.

The body outer diameter is indicated as d1 in FIGS. 7a and 7b.

This geometric parameter is, preferably in at least one cross-sectional view of the vial, wherein the cross-sectional view lies within a plane that comprises the entire center axis of the vial, the outer diameter of the vial, especially the maximal outer diameter of the vial, preferably of the vial's body.

For example, the body outer diameter might be measured in the middle of the vial's body, preferably within an area of 4 mm, as illustrated in FIG. 7b. FIG. 7b represents a magnified representation of a cross-sectional view of a similar vial than that shown in FIG. 7a.

Collar Outer Diameter/Thread Outer Diameter

Figure 8A:
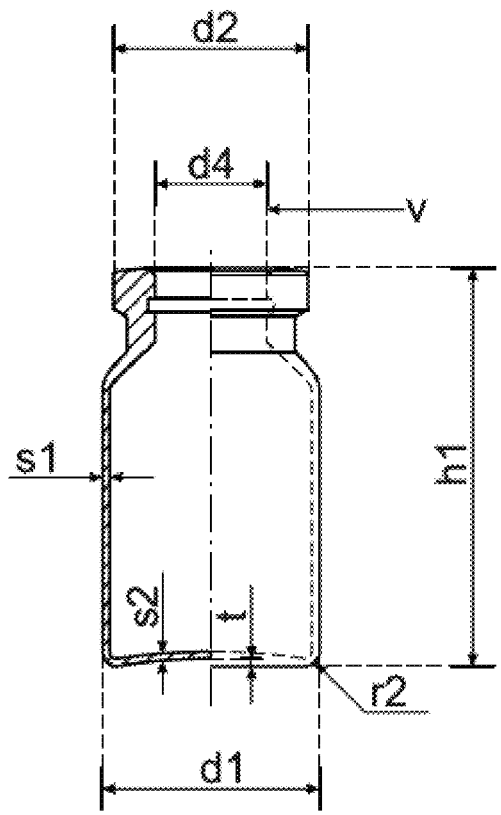
FIG. 8a shows a partially sectioned view of a vial as used in the present invention.
Figure 8B:
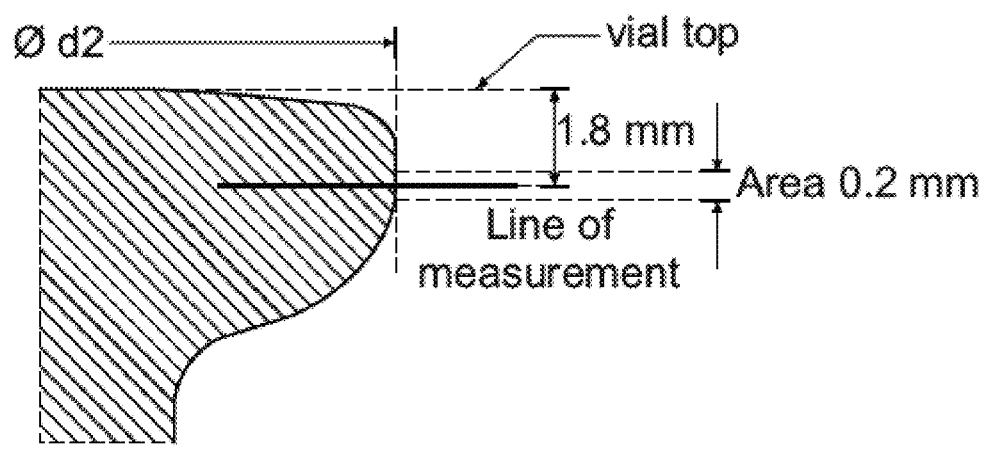

FIG. 8a shows a partially sectioned view of a vial as used in the present invention. FIG. 8b shows a cross-sectional view of the upper region of a similar vial to that shown in FIG. 8a, wherein the cross-sectional view lies within a plane that comprises the entire center axis of the vial.

The collar outer diameter/thread outer diameter is indicated as d2 in FIGS. 8a and 8b.

This geometric parameter is, preferably in at least one cross-sectional view of the vial, wherein the cross-sectional view lies within a plane that comprises the entire center axis of the vial, the outer diameter of the collar. In preferred embodiments this might be equal to the thread outer diameter, in case the vial has a threaded portion, especially a threaded portion located at the collar.

Preferably, the collar outer diameter/thread outer diameter is measured under consideration of the largest radial extend of the collar, as can be exemplarily taken from FIG. 8b.

Neck Outer Diameter

Figure 9A:
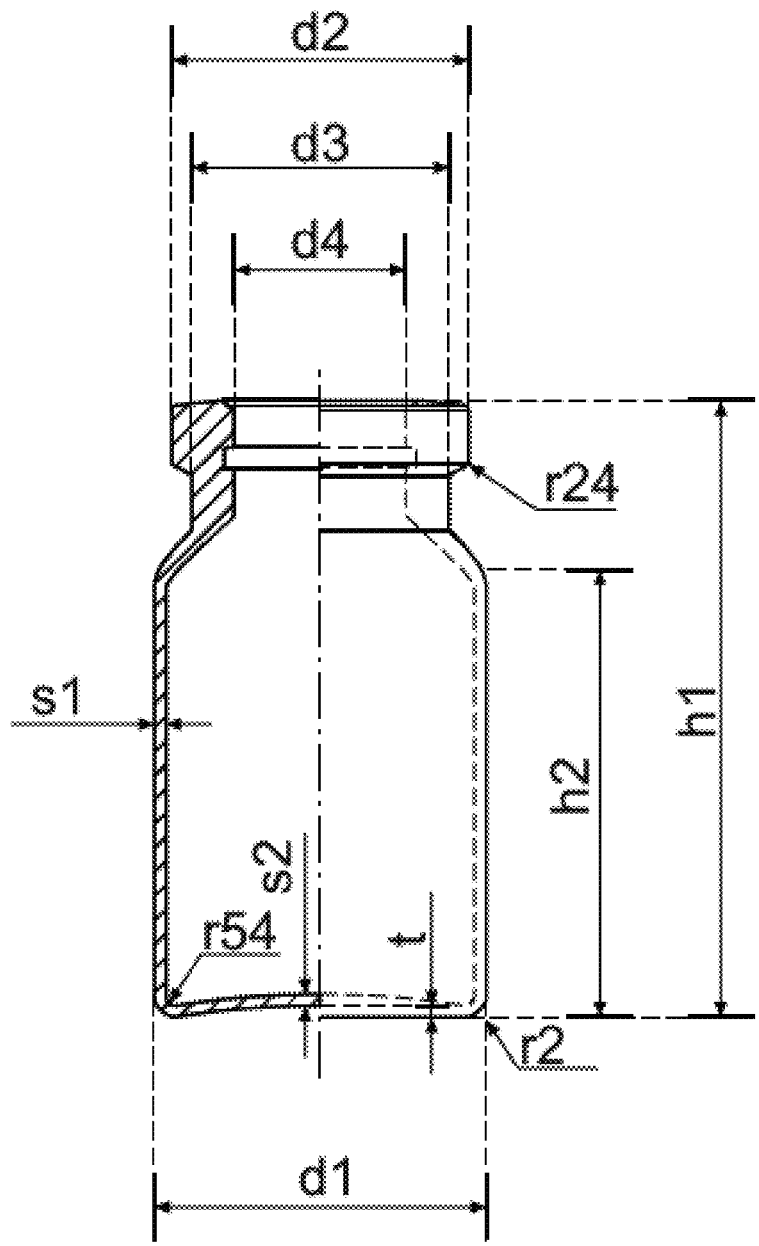
FIG. 9a shows a partially sectioned view of a vial as used in the present invention.
Figure 9B:
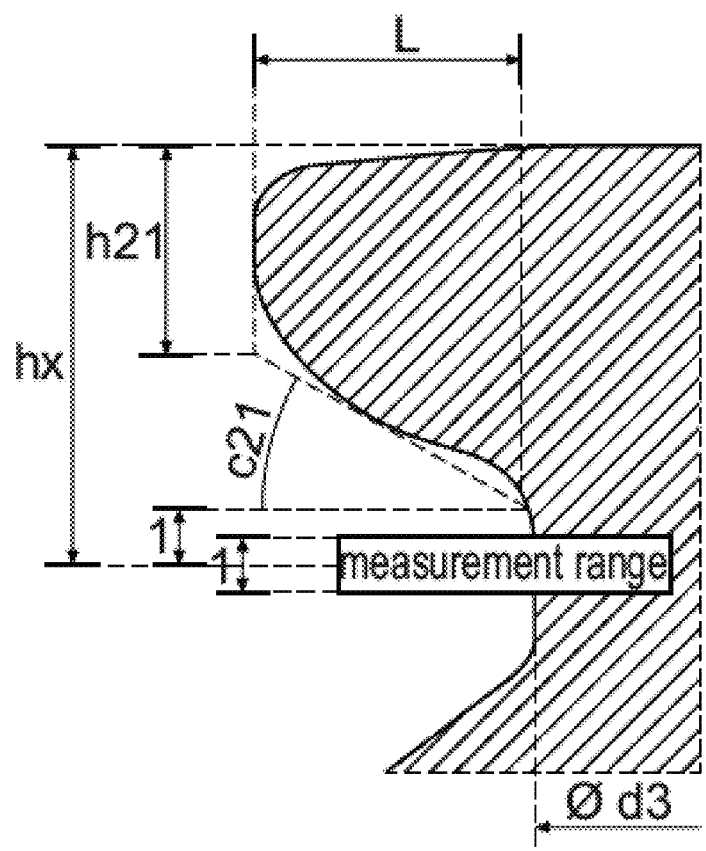

FIG. 9a shows a partially sectioned view of a vial as used in the present invention. FIG. 9b shows a cross-sectional view of the upper region of a similar vial than that shown in FIG. 9a, wherein the cross-sectional view lies within a plane that comprises the entire center axis of the vial.

The neck outer diameter is indicated as d3 in FIGS. 9a and 9b.

This geometric parameter is, preferably in at least one cross-sectional view of the vial, wherein the cross-sectional view lies within a plane that comprises the entire center axis of the vial, the outer diameter of the vial's neck; wherein preferably the neck outer diameter is measured at a point of the vial which point is a vertical distance of hx away from a horizontal plane comprising the vial's top, preferably in the cross-sectional view; wherein preferably hx has a value of between 4 and 5 mm, more preferably a value of 4.77 mm or 4.82 mm.

Preferably, the vertical distance is measured along a direction parallel to the center axis of the vial.

Preferably, the vial's neck follows the vial's collar in a direction from top to bottom.

A preferred method for measuring the neck outer diameter is explained with reference to FIG. 9b.

As can be particularly taken from FIG. 9b, the neck outer diameter d3 is measured at a point of the vial which point is a distance of hx away from the vial's top. The value of hx is alternatively or in addition determined based on the collar height (h21), the value of lower collar angle (c21) and the collar dimension L.

The collar height and the lower collar angle are all geometric parameters as described herein in detail.

For example for a 100 ml vial the value of hx might be 4.82 mm.

For example for a 2 ml vial the value of hx might be 4.77 mm.

Bottom Print

Figure 10A:
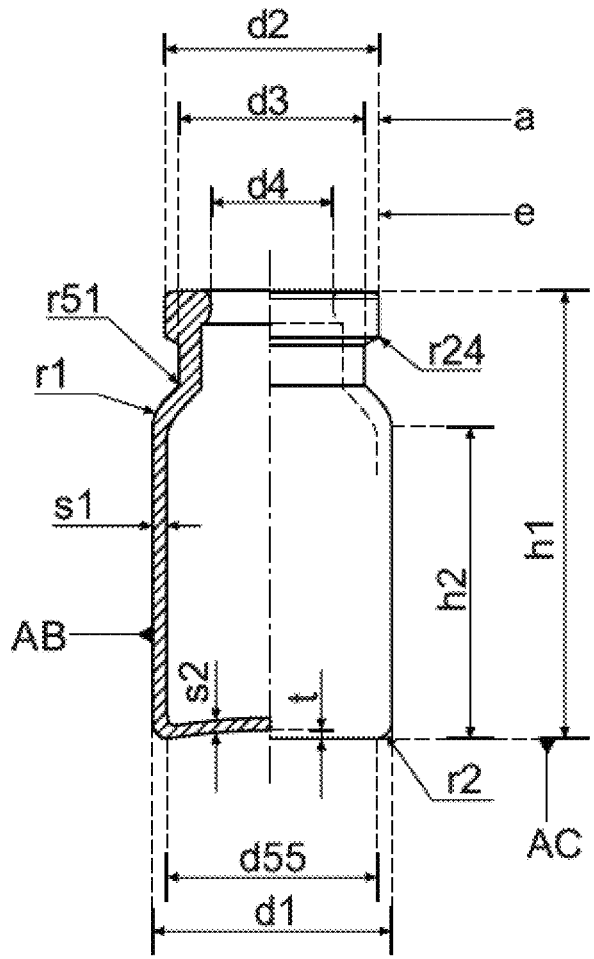
FIG. 10a shows a partially sectioned view of a vial as used in the present invention.
Figure 10B:
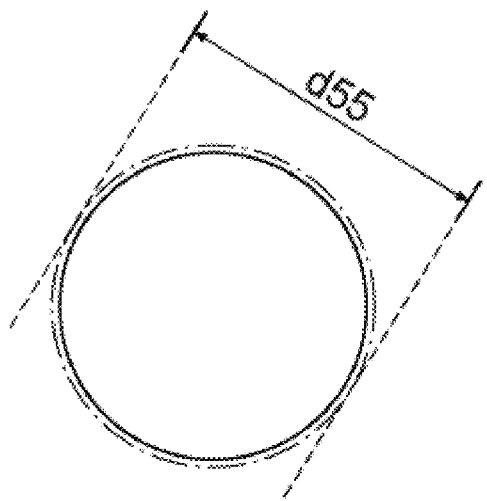
FIG. 10b shows the outer diameter of a vial footprint measured by creating an image of the contact surface.

FIG. 10a shows a partially sectioned view of a vial as used in the present invention.

The bottom print is indicated as d55 in FIG. 10a.

This geometric parameter is the outer diameter of the contact surface the bottom of the vial has with some flat underground. In other words, the bottom print is the footprint of the vial, As can be particularly taken from FIG. 10b, the outer diameter of the vial's footprint is measured by creating an image of the contact surface. For this purpose the vial bottom may be inked using a pad and the footprint image might be created by stamping the vial on a blank piece of paper on a flat surface.

Eccentricity

Figure 11:
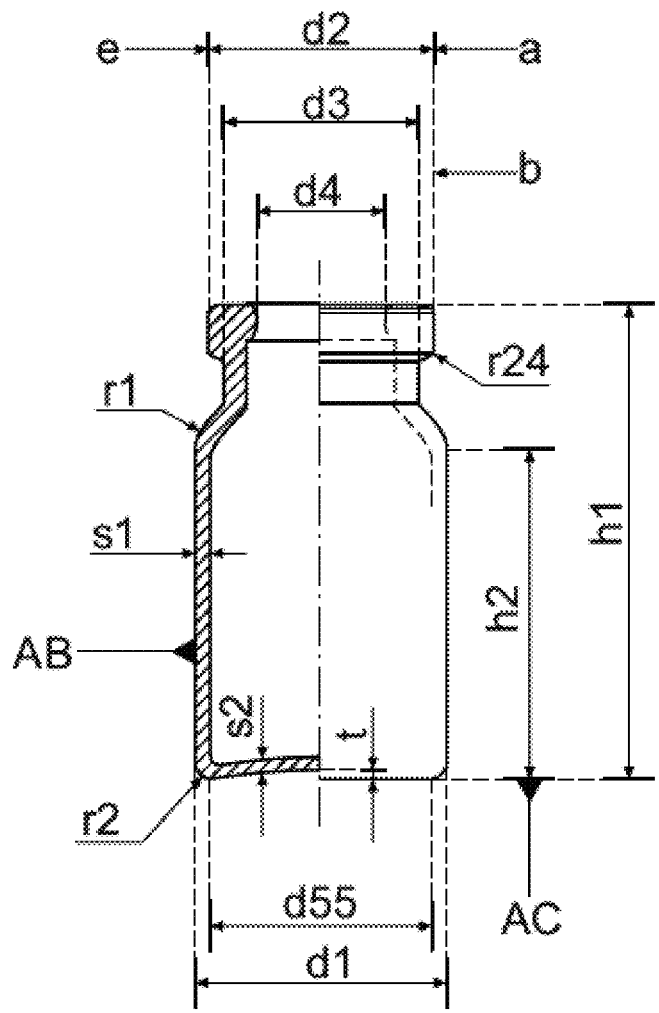
FIG. 11 shows a partially sectioned view of a vial as used in the present invention.

FIG. 11 shows a partially sectioned view of a vial as used in the present invention.

The eccentricity is indicated as e in FIG. 11.

This geometric parameter is the shortest distance between on the one hand the center axis of the collar and/or the threaded portion, especially having a diameter d2, and on the other hand the center axis of the body, especially having a diameter d1.

Circular Run Out Tolerance

Figure 12A:
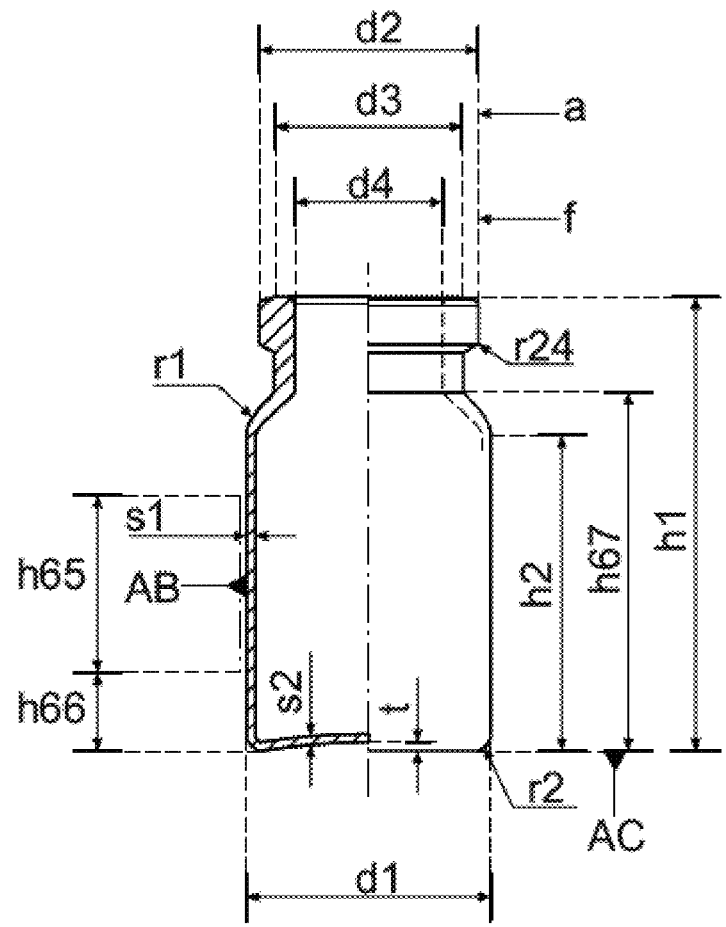
FIG. 12a shows a partially sectioned view of a vial as used in the present invention.
Figure 12B:
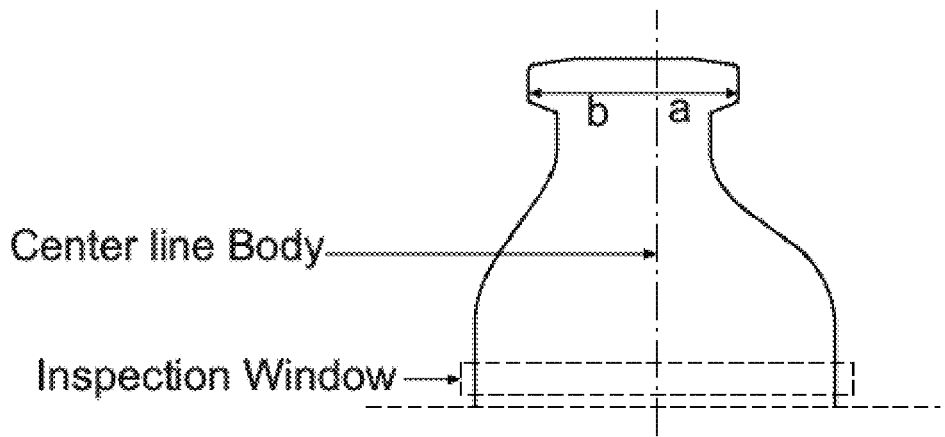

FIG. 12a shows a partially sectioned view of a vial as used in the present invention. FIG. 12b shows a cross-sectional view of the upper region of a similar vial than that shown in FIG. 12a, wherein the cross-sectional view lies within a plane that comprises the entire center axis of the vial.

The circular run out tolerance is indicated as f in FIG. 12a.

This geometric parameter is the difference between a maximum horizontal distance and a minimum horizontal distance; wherein for each cross-sectional view of the vial, which cross-sectional view lies within a plane that comprises the entire center axis of the vial, a first horizontal distance is defined in the cross-sectional view by the horizontal distance between the center axis of the vial and the left-hand collar outer diameter and a second horizontal distance is defined in the cross-sectional view by the horizontal distance between the center axis of the vial and the right-hand collar outer diameter; wherein the maximum value of all first and second distances of all cross-sectional views is the maximum horizontal distance and the minimum value of all first and second distances of all cross-sectional views is the minimum horizontal distance; wherein preferably the center axis of the vial is determined by projecting a line through the center points of the upper and lower body outer diameter measurement lines.

Preferably, the horizontal distances are measured along a direction perpendicular to the center axis of the vial.

In FIG. 12b the indication of the center axis of the vial and the first and second horizontal distances a and b for one cross-sectional view is shown.

Total Height

Figure 13A:
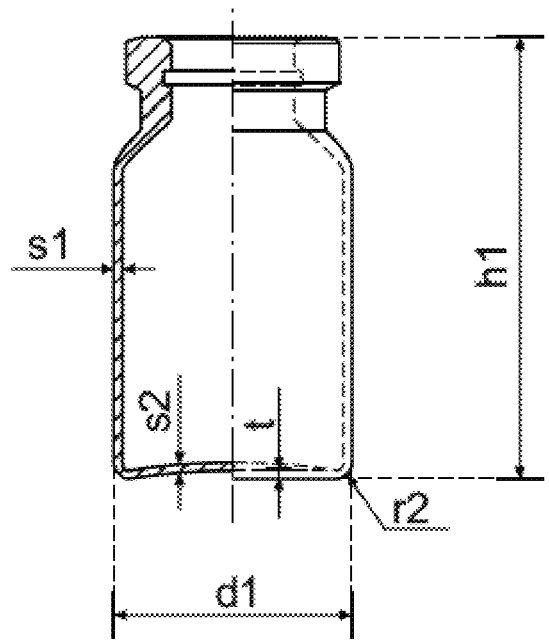
FIG. 13a shows a partially sectioned view of a vial as used in the present invention.
Figure 13B:
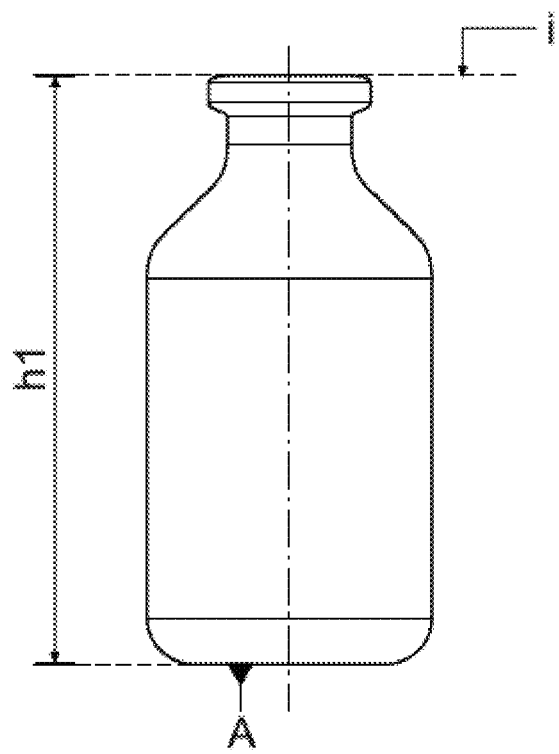

FIG. 13a shows a partially sectioned view of a vial as used in the present invention. FIG. 13b shows a cross-sectional view of a similar vial than that shown in FIG. 13a, wherein the cross-sectional view lies within a plane that comprises the entire center axis of the vial.

The total height is indicated as h1 in FIGS. 13a and 13b.

This geometric parameter is, preferably in at least one cross-sectional view of the vial, wherein the cross-sectional view lies within a plane that comprises the entire center axis of the vial, the vertical distance between two parallel planes, whereas one of the planes is defined by the bottom of the vial and the other plane is defined by the top of the vial.

Preferably, the vertical distance is measured along a direction parallel to the center axis of the vial.

In FIG. 13b an illustration of a vial with the two planes is shown.

Of course, preferably top is here at the first end and bottom is here at the further end, respectively, of the container.

Body Height

Figure 14:
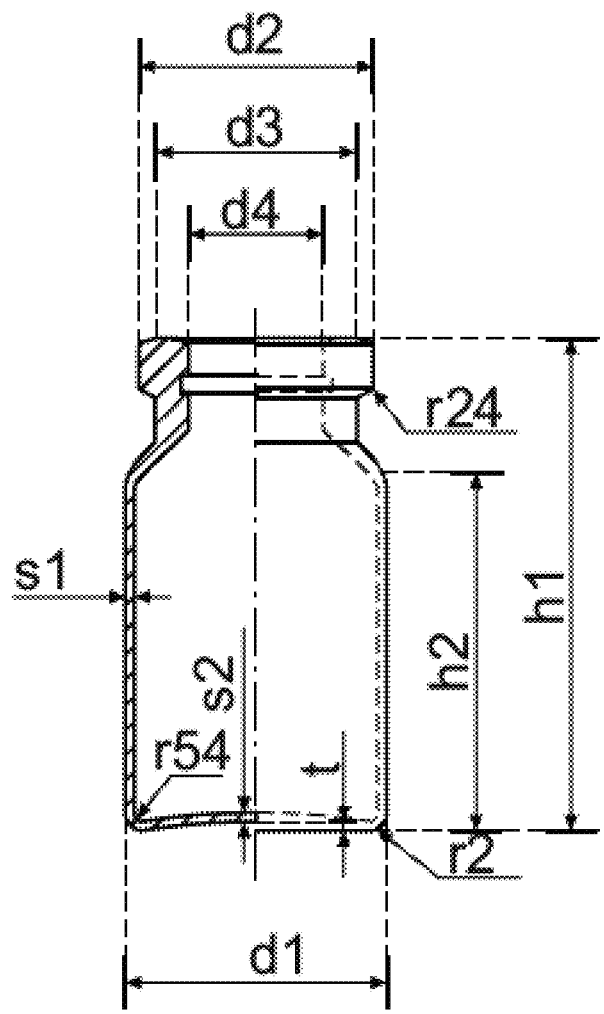
FIG. 14 shows a partially sectioned view of a vial as used in the present invention.

FIG. 14 shows a partially sectioned view of a vial as used in the present invention.

The body height is indicated as h2 in FIG. 14.

This geometric parameter is, preferably in at least one cross-sectional view of the vial, wherein the cross-sectional view lies within a plane that comprises the entire center axis of the vial, the vertical distance between the plane defined by the bottom of the vial and a specific point; wherein the specific point is obtained by aligning, preferably in the cross-sectional view, a straight line at the vial's, preferably the vial's body's, most outer vertical edge and identifying the point where the upwards extending straight line does finally no longer follow the vial's outer contour.

Preferably, the vertical distance is measured along a direction parallel to the center axis of the vial. Preferably, the vertical edge extends in a direction parallel to the center axis of the vial.

Collar Height

Figure 15A:
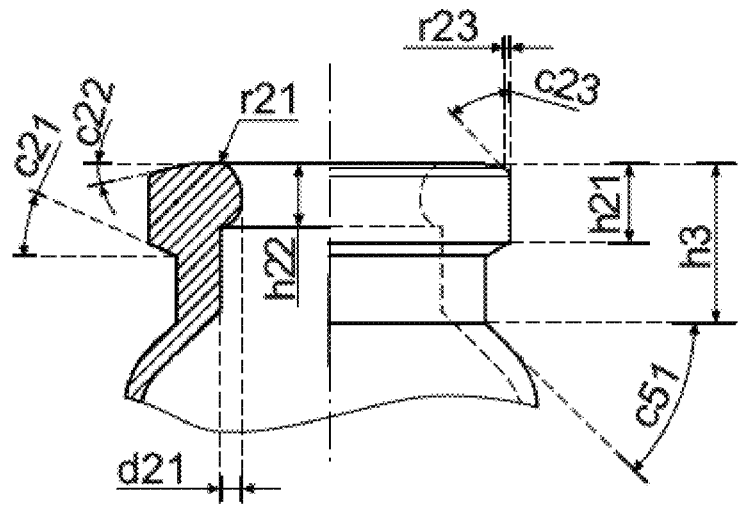
FIG. 15a shows a partially sectioned view of one area of a vial as used in the present invention.
Figure 15B:
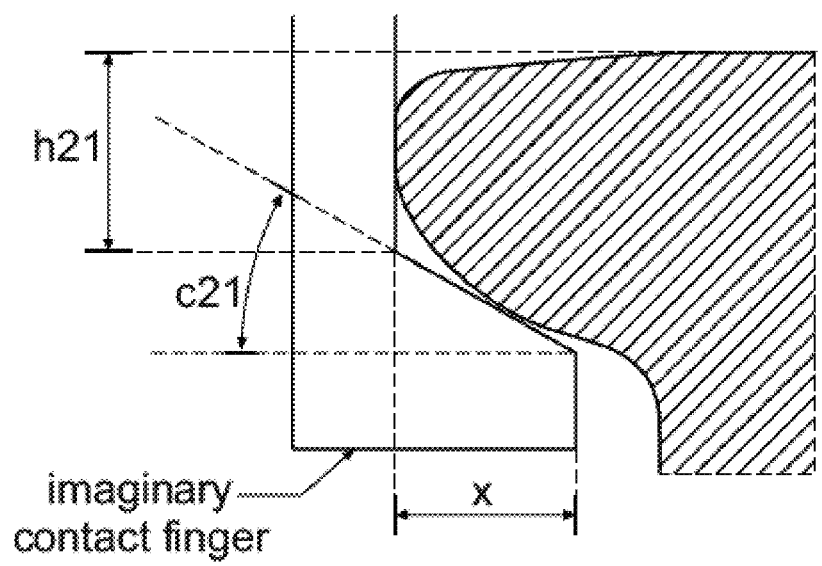

FIG. 15a shows a partially sectioned view of one area of a vial as used in the present invention. FIG. 15b shows a cross-sectional view of the upper region of a similar vial than that shown in FIG. 15a, wherein the cross-sectional view lies within a plane that comprises the entire center axis of the vial.

The collar height is indicated as h21 in FIGS. 15a and 15b.

This geometric parameter is, preferably in at least one cross-sectional view of the vial, wherein the cross-sectional view lies within a plane that comprises the entire center axis of the vial, the vertical distance between the plane defined by the top of the vial and a specific point; wherein the specific point is obtained as an intersection point of on the one hand a vertical straight line which, preferably in the cross-sectional view, touches the most outer circumference point of the vial's collar and on the other hand another straight line; wherein the another straight line is the straight line used for determining the lower collar angle.

Preferably, the vertical distance is measured along a direction parallel to the center axis of the vial. Preferably, the vertical straight line extends in a direction parallel to the center axis of the vial.

Neck Height

Figure 16A:
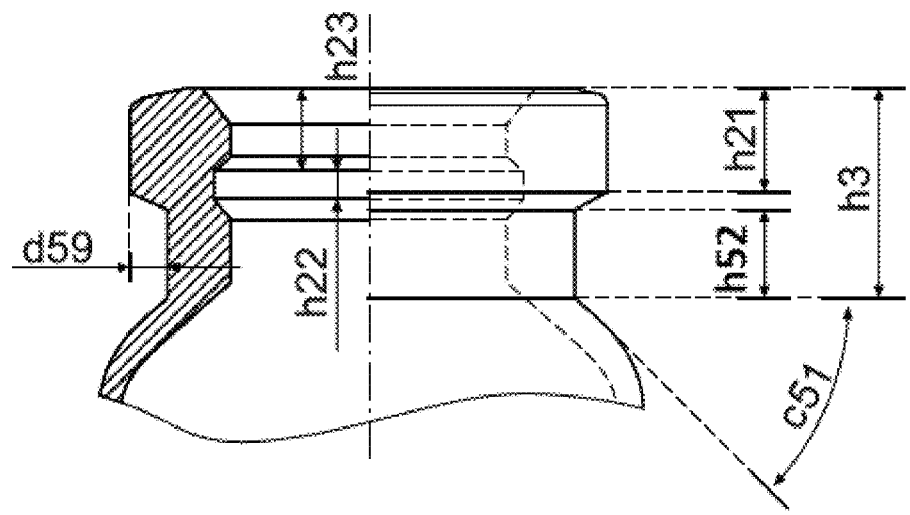
FIG. 16a shows a partially sectioned view of one area of a vial as used in the present invention.
Figure 16B:
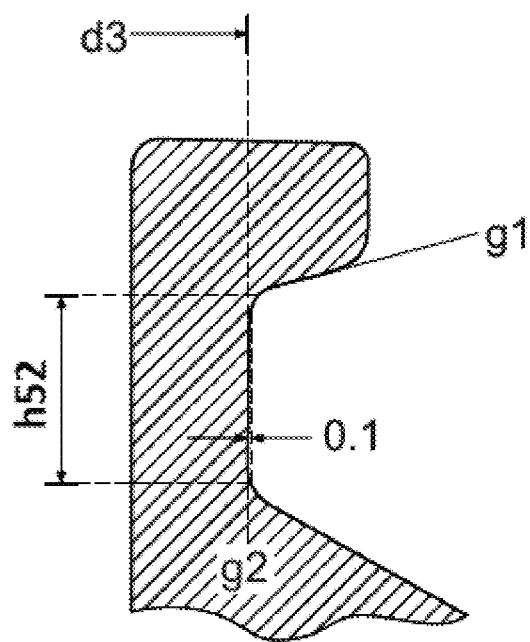

FIG. 16a shows a partially sectioned view of one area of a vial as used in the present invention. FIG. 16b shows a cross-sectional view of the upper region of a similar vial than that shown in FIG. 16a, wherein the cross-sectional view lies within a plane that comprises the entire center axis of the vial.

The neck height is indicated as h52 in FIGS. 16a and 16b.

This geometric parameter is, preferably in at least one cross-sectional view of the vial, wherein the cross-sectional view lies within a plane that comprises the entire center axis of the vial, the vertical distance between a first and a second point, wherein the first point is the intersection point of the straight line used for determining the lower collar angle and a vertical line which, preferably in the cross-sectional view, crosses the most outer circumferential point of the vial's neck, and wherein the second point is the intersection point of the straight line used for determining the shoulder angle and the aforementioned vertical line.

Preferably, the vertical distance is measured along a direction parallel to the center axis of the vial. Preferably, the vertical line extends in a direction parallel to the center axis of the vial.

Total Collar Height (Aka "Collar Height with C21")

Figure 17:
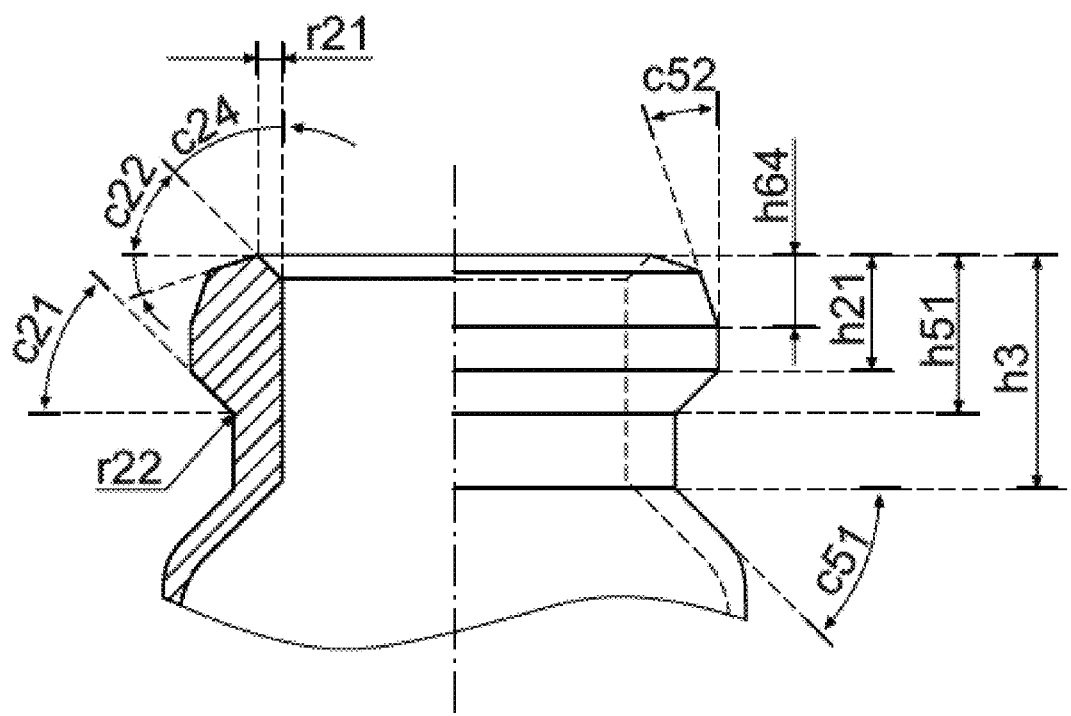
FIG. 17 shows a partially sectioned view of one area of a vial as used in the present invention.

FIG. 17 shows a partially sectioned view of one area of a vial as used in the present invention.

The total collar height is indicated as h51 in FIG. 17.

This geometric parameter is, preferably in at least one cross-sectional view of the vial, wherein the cross-sectional view lies within a plane that comprises the entire center axis of the vial, the vertical distance between a horizontal plane comprising the top of the vial and a specific point; wherein the specific point is the intersection point of the straight line used for determining the lower collar angle and a vertical line which, preferably in the cross-sectional view, crosses the most outer circumferential point of the vial's neck.

Preferably, the vertical distance is measured along a direction parallel to the center axis of the vial. Preferably, the vertical line extends in a direction parallel to the center axis of the vial.

Total Collar Height Plus Neck Height

Figure 18A:
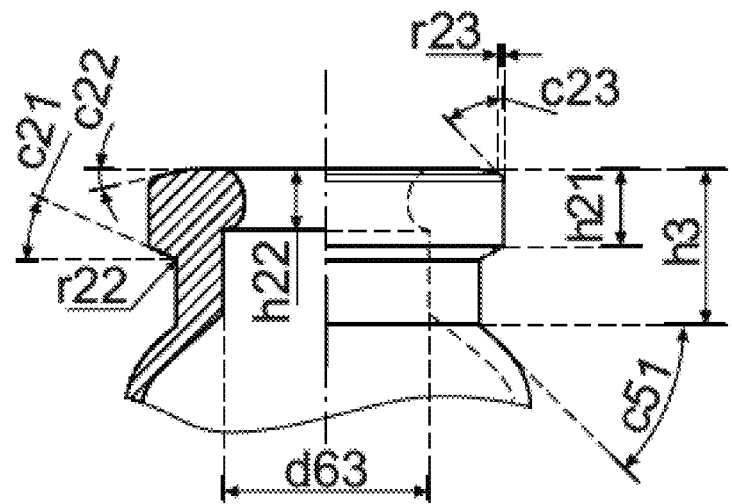
FIG. 18a shows a partially sectioned view of one area of a vial as used in the present invention.
Figure 18B:
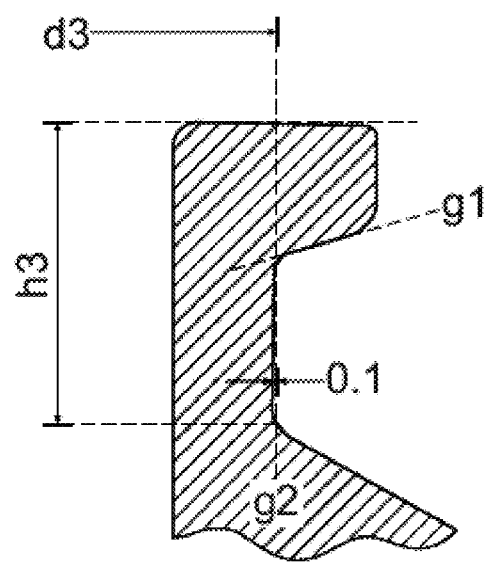

FIG. 18a shows a partially sectioned view of one area of a vial as used in the present invention. FIG. 18b shows a cross-sectional view of the upper region of a similar vial than that shown in FIG. 18a, wherein the cross-sectional view lies within a plane that comprises the entire center axis of the vial.

The collar height plus neck height is indicated as h3 in FIGS. 18a and 18b.

This geometric parameter is the sum of the total collar height and the neck height as, respectively, described herein. In other words, it is the sum of the values of the geometric parameters h51 and h52.

Body Height with Shoulder

Figure 19:
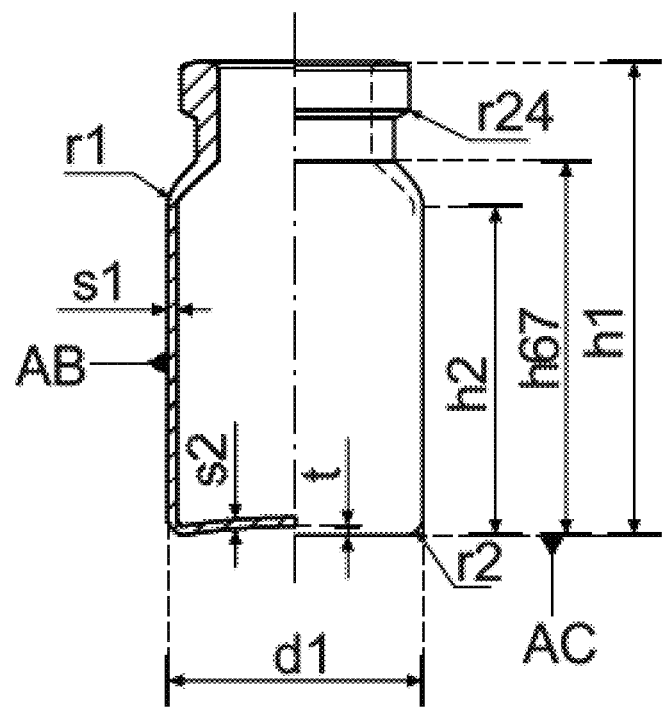
FIG. 19 shows a partially sectioned view of a vial as used in the present invention.

FIG. 19 shows a partially sectioned view of a vial as used in the present invention.

The body height with shoulder is indicated as h67 in FIG. 19.

This geometric parameter is the difference between the total height and the total collar height plus neck height as, respectively, described herein. In other words, it is the difference of the values of the geometric parameters h1 and h3.

Sealing Surface Perpendicularity

Figure 20A:
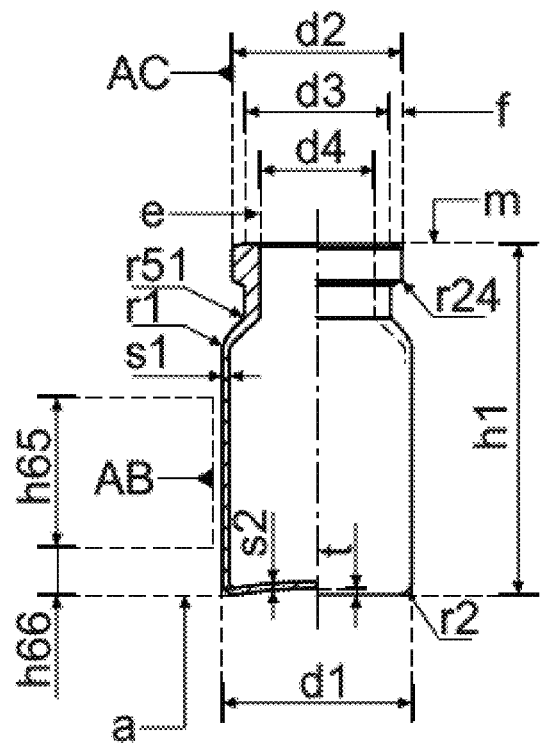
FIG. 20a shows a partially sectioned view of a vial as used in the present invention.
Figure 20B:
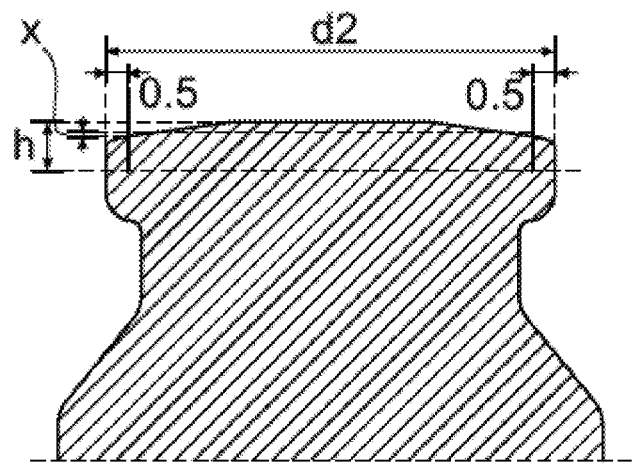

FIG. 20a shows a partially sectioned view of a vial as used in the present invention. FIG. 20b shows a cross-sectional view of the upper region of a similar vial than that shown in FIG. 20a, wherein the cross-sectional view lies within a plane that comprises the entire center axis of the vial.

The sealing surface perpendicularity is indicated as m in FIG. 20a.

This geometric parameter is, preferably in at least one cross-sectional view of the vial, wherein the cross-sectional view lies within a plane that comprises the entire center axis of the vial, the difference between a first height and a second height; wherein a plane perpendicular to the center axis of the vial can be defined which comprises the top of the vial, preferably in the cross-sectional view; wherein a first vertical line parallel to the center axis of the vial can be defined, preferably in the cross-sectional view, which has an offset towards the center axis of the vial of 0.5 mm measured from the left-hand most outer circumferential point of the collar and/or thread; wherein a second vertical line parallel to the center axis of the vial can be defined, preferably in the cross-sectional view, which has an offset towards the center axis of the vial of 0.5 mm measured from the right-hand most outer circumferential point of the collar and/or thread; wherein the first height is the vertical distance between the plane and the intersection point of the first vertical line and the collar's top surface, preferably in the cross-sectional view; wherein the second height is the vertical distance between the plane and the intersection point of the second vertical line and the collar's top surface, preferably in the cross-sectional view.

Preferably the difference of the first and second height is determined for all cross-sectional views of the vial, wherein the cross-sectional view lies within a plane that comprises the entire center axis of the vial, and the maximal difference is chosen as the value of the geometric parameter.

Preferably, the vertical distances are measured along a direction parallel to the center axis of the vial. Preferably, the vertical lines extends in a direction parallel to the center axis of the vial.

In other words (see FIG. 20b for reference): A light-dark transition is looked for at a distance of 0.5 mm from the rolled rim d2 on both sides from the top downwards a height of h. The height difference of the two points that are found gives a dimension x. The maximum of x gives the "flatness of the sealing surface", i.e., the sealing surface perpendicularity.

In FIG. 20a preferably the parameter h66=2*r2.

Shoulder Radius

Figure 21A:
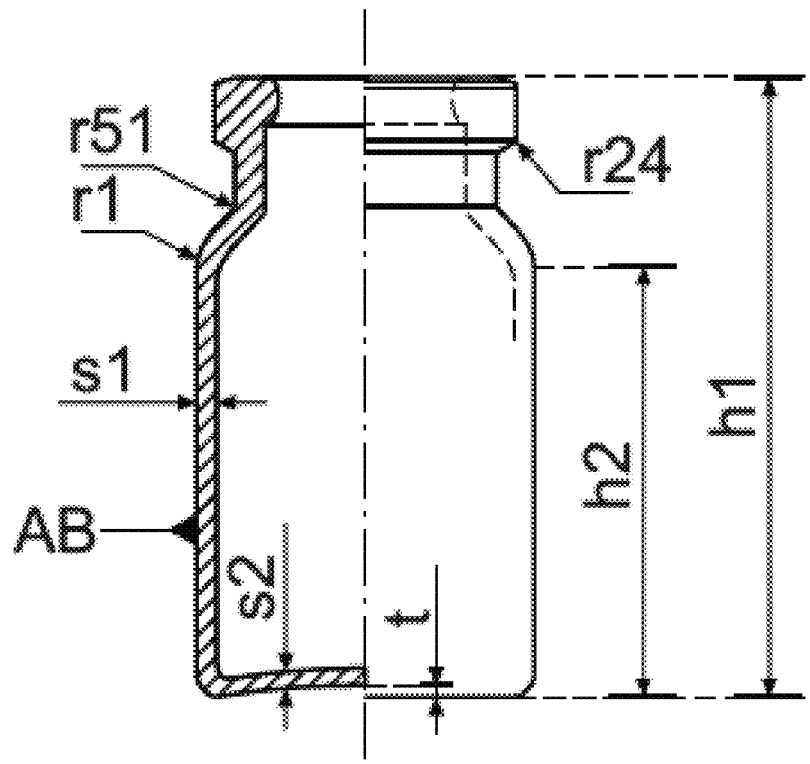
FIG. 21a shows a partially sectioned view of a vial as used in the present invention.
Figure 21B:
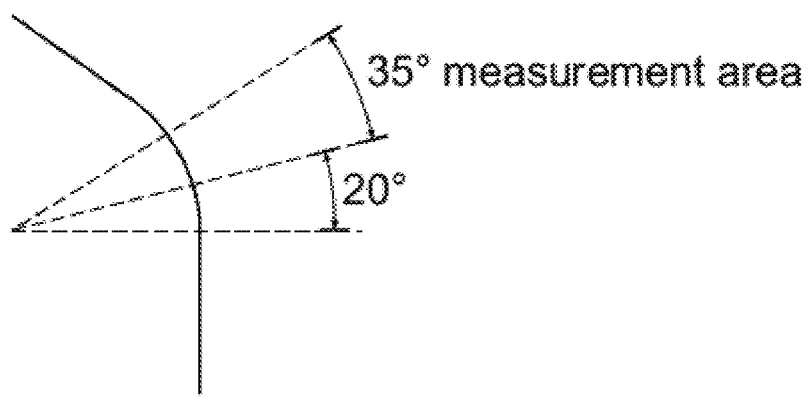

FIG. 21a shows a partially sectioned view of a vial as used in the present invention. FIG. 21b shows a cross-sectional view of some side region of a similar vial than that shown in FIG. 21a, wherein the cross-sectional view lies within a plane that comprises the entire center axis of the vial.

The shoulder radius is indicated as r1 in FIG. 21a.

This geometric parameter is, preferably in at least one cross-sectional view of the vial, wherein the cross-sectional view lies within a plane that comprises the entire center axis of the vial, the radius of the circle which crosses and/or comprises at least two intersection points of the vial's contour; wherein preferably the intersection points are located in the vial's shoulder region; wherein, preferably in the cross-sectional view, a plane perpendicular to the center axis of the vial and crossing the specific point used for determining the body height can be defined; wherein, preferably in the cross-sectional view, the first intersection point of the at least two ones is defined by the intersection between the vial's contour and a straight line enclosing an angle of 20 degrees with the plane; wherein, preferably in the cross-sectional view, the second intersection point of the at least two ones is defined by the intersection between the vial's contour and a straight line enclosing an angle of 55 degrees with the plane; wherein the two straight lines and the plane perpendicular to the center axis of the vial have a common intersection point which has a distance to the specific point of one quarter of the body outer diameter d1 of the vial.

In other words (see for reference FIG. 21b): The shoulder radius is measured by using an overlay with a 20° and 55° line projected across the shoulder of the vial. A best fit circle is identified on the edge of the vial between the lines.

Heel Radius

Figure 22A:
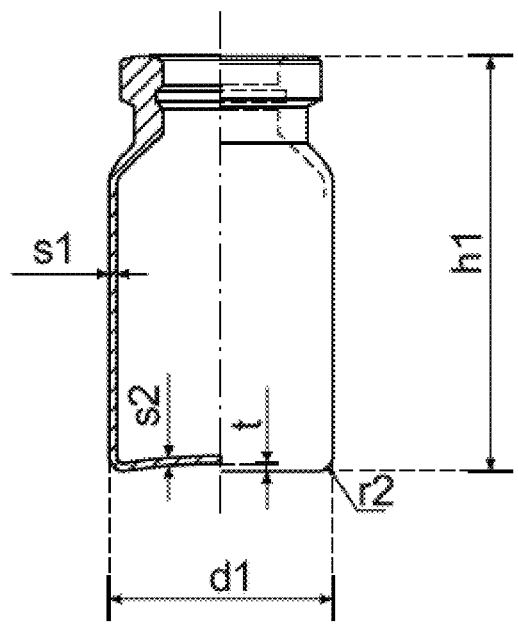
FIG. 22a shows a partially sectioned view of a vial as used in the present invention.
Figure 22B:
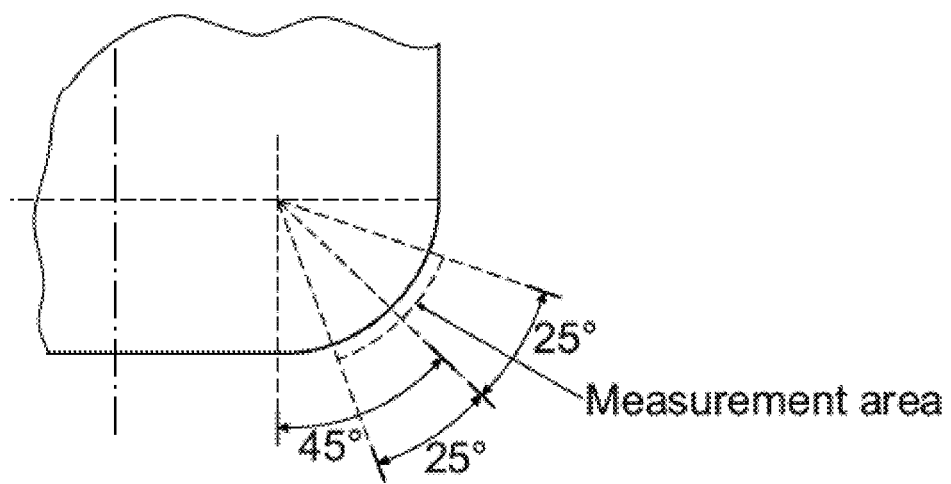

FIG. 22a shows a partially sectioned view of a vial as used in the present invention. FIG. 22b shows a cross-sectional view of the lower region of a similar vial than that shown in FIG. 22a, wherein the cross-sectional view lies within a plane that comprises the entire center axis of the vial.

The heel radius is indicated as r2 in FIG. 22a.

This geometric parameter is, preferably in at least one cross-sectional view of the vial, wherein the cross-sectional view lies within a plane that comprises the entire center axis of the vial, the radius of the circle which crosses and/or comprises at least two intersection points of the vial's contour; wherein preferably the two intersection points are located in the vial's heel region; wherein a first specific point can be obtained by aligning, preferably in the cross-sectional view, a first straight line perpendicular to the center axis of the vial so that it touches the vial's outer bottom and identifying the point where the sideward extending straight line does finally no longer follow the vial's contour; wherein a second specific point can be obtained by aligning, preferably in the cross-sectional view, a second straight line parallel to the center axis of the vial so that it touches the vial's body and identifying the point where the downward extending straight line does finally no longer follow the vial's contour; wherein a third straight line can be defined, preferably in the cross-sectional view, crossing the intersection point of the first and second straight line; wherein, preferably in the cross-sectional view, the first intersection point of the at least two ones is defined by the intersection between the vial's contour and the third straight line enclosing an angle of 20 degrees with the second straight line; wherein, preferably in the cross-sectional view, the second intersection point of the at least two ones is defined by the intersection between the vial's contour and the third straight line enclosing an angle of 70 degrees with the second straight line.

Preferably, the first specific point, the second specific point, the first intersection point and the second intersection point are located at the same half, especially right half or left half, of the vial, preferably in the cross-sectional view.

In other words (see for reference FIG. 22b): An overlay is created with a 45 degrees angled line projected across the heel of the vial (as shown in the Figure). A best fit circle on both sides is created using the range ±25 degrees from the intersection of the 45 degrees angled line to the edge of the vial.

Collar and Neck Radius

Figure 23A:
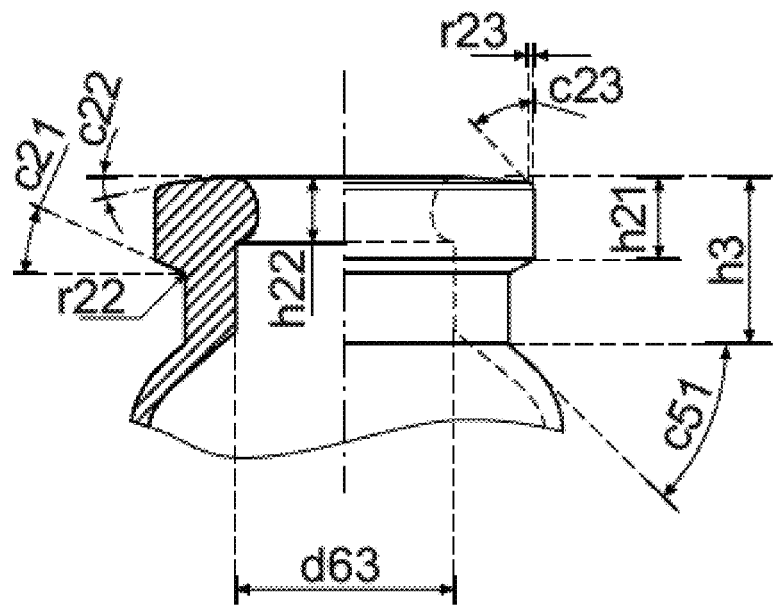
FIG. 23a shows a partially sectioned view of one area of a vial as used in the present invention.
Figure 23B:
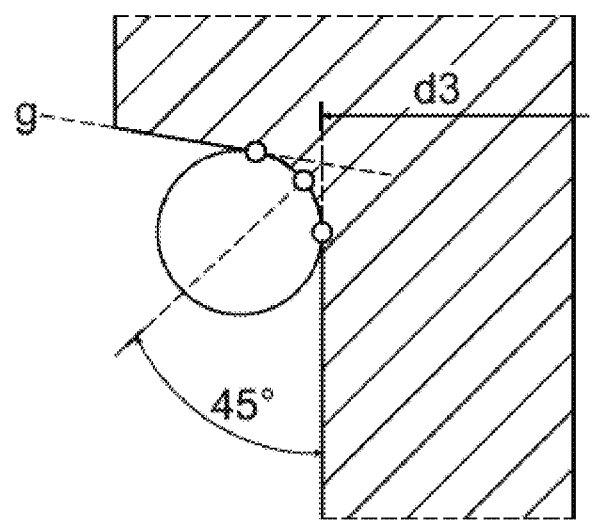

FIG. 23a shows a partially sectioned view of one area of a vial as used in the present invention. FIG. 23b shows a cross-sectional view of some upper region of a similar vial than that shown in FIG. 23a, wherein the cross-sectional view lies within a plane that comprises the entire center axis of the vial.

The collar and neck radius is indicated as r22 in FIG. 23a.

This geometric parameter is, preferably in at least one cross-sectional view of the vial, wherein the cross-sectional view lies within a plane that comprises the entire center axis of the vial, the radius of the circle which has a first straight line and a second straight line as tangents; wherein, preferably in the cross-sectional view, the first straight line is parallel to the center axis of the vial and crosses the outer point of the vial's neck, which preferably constitutes the neck's outer diameter (d3); wherein, preferably in the cross-sectional view, the second straight line is the another straight line used for determining the collar height.

Figure 24A:
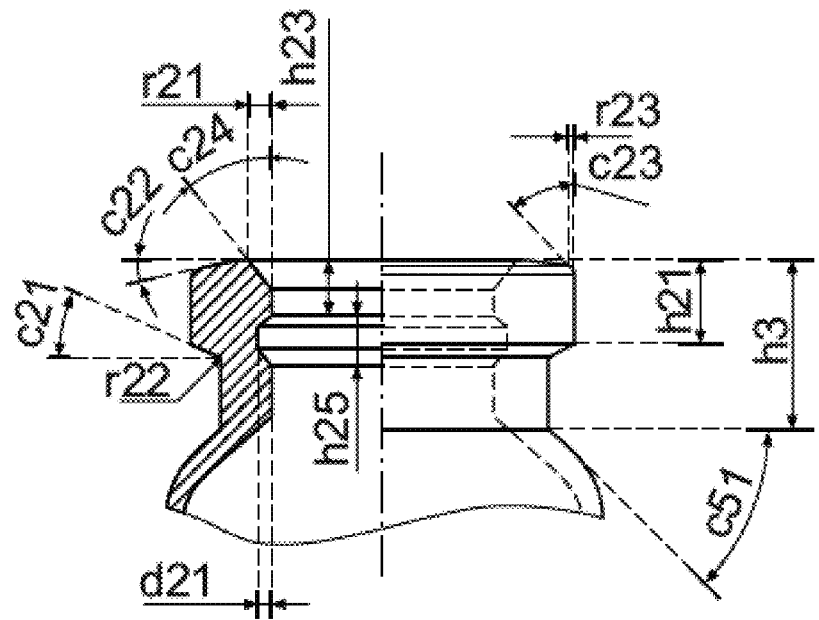
FIG. 24a shows a partially sectioned view of one area of a vial as used in the present invention.
Figure 24B:
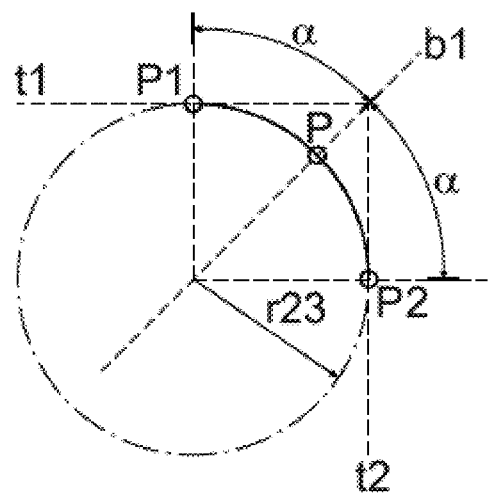

In other words (see for reference FIG. 23b) it can be alternatively or in addition described as: A light-dark transition is looked for from the intersection point in a vector that is less than 45 degrees. A circle is drawn through that point for which the two straight lines are tangents Collar Facet Radius FIG. 24a shows a partially sectioned view of one area of a vial as used in the present invention. FIG. 24b shows a cross-sectional view of an area of the collar of a similar vial than that shown in FIG. 24a, wherein the cross-sectional view lies within a plane that comprises the entire center axis of the vial.

The collar facet radius is indicated as r23 in FIG. 24a.

This geometric parameter is, preferably in at least one cross-sectional view of the vial, wherein the cross-sectional view lies within a plane that comprises the entire center axis of the vial, the radius of a circle crossing at least three points; wherein, preferably in the cross-sectional view, the first point of the at least three ones is the point where a first tangent touches the circle; wherein, preferably in the cross-sectional view, the first tangent is the straight line used for determining the upper collar angle; wherein, preferably in the cross-sectional view, the second point of the at least three ones is the point where a second tangent touches the circle; wherein, preferably in the cross-sectional view, the second tangent is parallel to the center axis of the vial and crosses the outer point of the vial's collar, which preferably constitutes the collar's outer diameter (d2), wherein, preferably in the cross-sectional view, a first straight line, which is perpendicular to the first tangent and which crosses the first point can be defined; wherein, preferably in the cross-sectional view, a second straight line, which is perpendicular to the second tangent and which crosses the second point can be defined; wherein, preferably in the cross-sectional view, a bisectrix of the angle enclosed by the first and second straight line can be defined; wherein, preferably in the cross-sectional view, the third point is the intersection point of the bisectrix and the contour of the vial's collar.

In FIG. 24b the angle enclosed by the first and second straight line is 2*alpha. The first point is P1, the second point is P2 and the third point is P. The bisectrix is labeled as b1 and the first and second tangents as, respectively, t1 and t2.

Lower Collar Radius

Figure 25A:
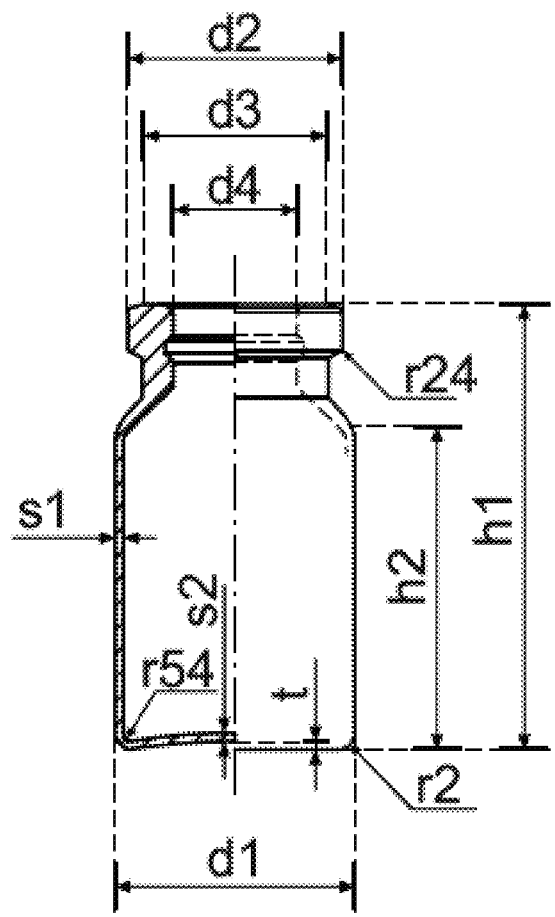
FIG. 25a shows a partially sectioned view of one area of a vial as used in the present invention.
Figure 25B:
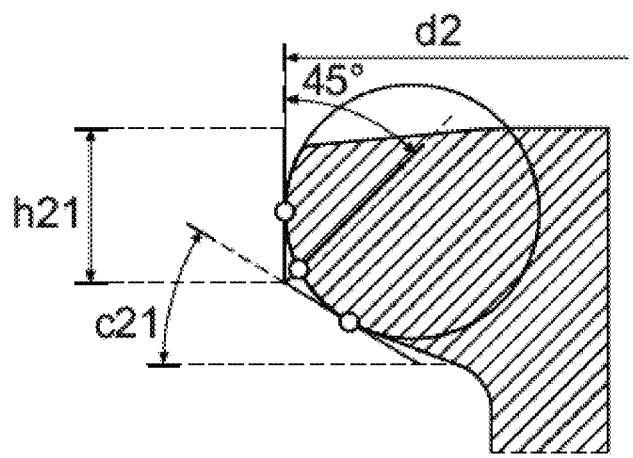

FIG. 25a shows a partially sectioned view of one area of a vial as used in the present invention. FIG. 25b shows a cross-sectional view of an area of the collar of a similar vial than that shown in FIG. 25a, wherein the cross-sectional view lies within a plane that comprises the entire center axis of the vial.

The lower collar radius is indicated as r24 in FIG. 25a.

This geometric parameter is, preferably in at least one cross-sectional view of the vial, wherein the cross-sectional view lies within a plane that comprises the entire center axis of the vial, the radius of a circle crossing at least three points; wherein, preferably in the cross-sectional view, the first point of the at least three ones is the point where a first tangent touches the circle; wherein, preferably in the cross-sectional view, the first tangent is the straight line used for determining the lower collar angle; wherein, preferably in the cross-sectional view, the second point of the at least three ones is the point where a second tangent touches the circle; wherein, preferably in the cross-sectional view, the second tangent is parallel to the center axis of the vial and crosses the outer point of the vial's collar, which preferably constitutes the collar's outer diameter (d2); wherein, preferably in the cross-sectional view, a straight line can be defined which starts at a specific intersection point being the intersection point of the first and second tangent and extends upwards towards the vial, which straight line encloses an angle of 45 degrees with the second tangent; wherein, preferably in the cross-sectional view, the third point is an intersection point of the straight line and the contour of the vial's collar, the intersection point being the closest one to the specific intersection point.

In other words (see for reference FIG. 25b): The lower collar radius is determined using a projected line, the edge of the vial and two tangent points. A circle is drawn using the tangents and the vial edge whose radius is the lower collar angle. The projected line is 45 degrees from vertical and starts at the collar height (h21) on the line defined in the collar outer diameter (d2) measurement. The edge of the vial seen on this projected line is used, along with the edge defined in the collar outer diameter (d2) and the lower collar angle (c21) to define the three points, which are used to create the circle.

Preferably, vertical indicates a direction parallel to the center axis of the vial.

Radius at Bottom of Neck

Figure 26A:
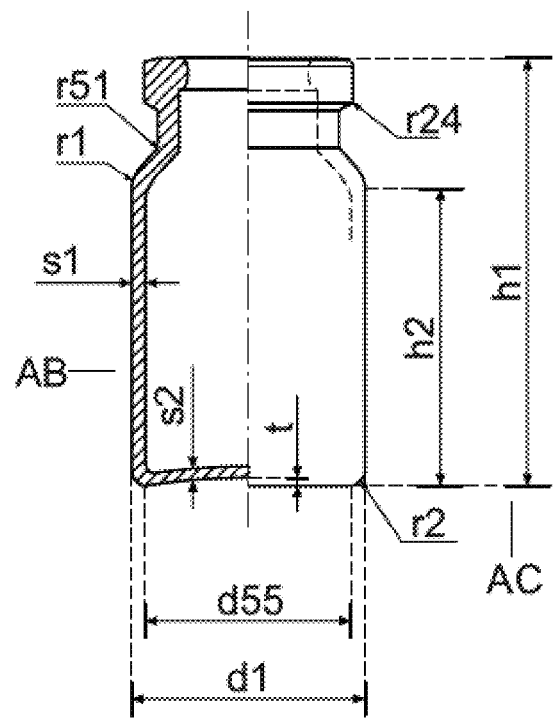
FIG. 26a shows a partially sectioned view of a vial as used in the present invention.
Figure 26B:
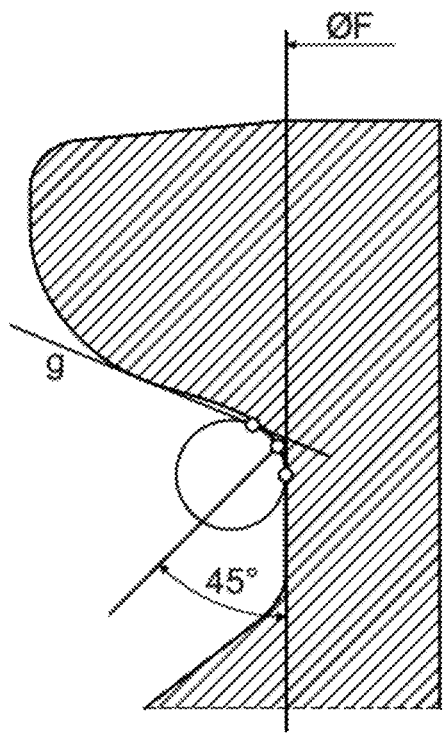

FIG. 26a shows a partially sectioned view of a vial as used in the present invention. FIG. 26b shows a cross-sectional view of an area of the collar of a similar vial than that shown in FIG. 26a, wherein the cross-sectional view lies within a plane that comprises the entire center axis of the vial.

The radius at the bottom of the neck is indicated as r51 in FIG. 26a.

This geometric parameter is, preferably in at least one cross-sectional view of the vial, wherein the cross-sectional view lies within a plane that comprises the entire center axis of the vial, the radius of a circle crossing at least three points; wherein, preferably in the cross-sectional view, the first point of the at least three ones is the point where a first tangent touches the circle; wherein, preferably in the cross-sectional view, the first tangent is the straight line used for determining the lower collar angle; wherein, preferably in the cross-sectional view, the second point of the at least three ones is the point where a second tangent touches the circle; wherein, preferably in the cross-sectional view, the second tangent is parallel to the center axis of the vial and crosses the outer point of the vial's neck, which preferably constitutes the neck's outer diameter (d3); wherein, preferably in the cross-sectional view, a straight line can be defined which starts at a specific intersection point being the intersection point of the first and second tangent and extends downwards away from the vial, which straight line encloses an angle of 45 degrees with the second tangent; wherein, preferably in the cross-sectional view, the third point is an intersection point of the straight line and the contour of the vial, the intersection point being the closest one to the specific intersection point.

Ovality

Figure 27:
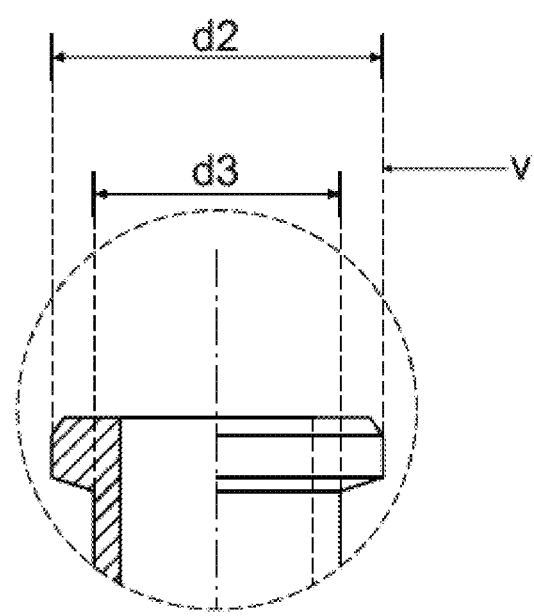
FIG. 27 shows a partially sectioned view of one part of a vial as used in the present.

FIG. 27 shows a partially sectioned view of one part of a vial as used in the present The ovality is indicated as v in FIG. 27.

This geometric parameter is the difference between the largest and the smallest value of the collar outer diameter, wherein preferably the largest and smallest values are determined based on all cross-sectional views of the vial, which views lie within planes that comprise the entire center axis of the vial.

Wall Thickness

This geometric parameter is the thickness of the wall of the container. The thickness is measured as the distance between the outer and inner surfaces of the wall.

If the thickness of the wall varies across the container or across one or more parts thereof, the thickness of each part might be stated. E.g., a wall thickness for the parts: collar, neck, body and heel. Alternatively, a mean value for the thickness either for the complete container or for each part might be stated.

The wall thickness for the body is indicated as s1 e.g., in FIG. 8a.

Bottom Thickness

This geometric parameter is the thickness of the bottom of the container. The thickness is measured as the distance between the outer and inner surfaces of the bottom.

The bottom thickness is indicated as s2 e.g., in FIG. 9a.

Bottom Inner Radius

The bottom inner radius is indicated as r54 e.g., in FIG. 7a.

Neck Inner Diameter

FIG. 8a shows a partially sectioned view of a vial as used in the present invention.

The neck inner diameter is indicated as d4 in FIG. 8a.

This geometric parameter is, preferably in at least one cross-sectional view of the vial comprising the entire center axis of the vial, the inner diameter of the collar.

Bottom Depth

This geometric parameter is the maximal vertical distance between a plane comprising the bottom contact surface of the vial and the points of the bottom outer surface of the vial, especially for a vial having a concave bottom outer surface.

Here, preferably the vertical distance is measured along a direction parallel to the center axis of the vial.

The bottom depth is indicated as t e.g., in FIG. 26a.

Acknowledgments

It is acknowledged that a geometric parameter can be valid geometric parameter also for such containers (e.g., vials or cartridges), which lacks one or more parts with respect to which the respective geometric parameter is defined. For such containers the respective geometric parameter can be used by assigning a value of either zero or NULL to the geometric parameter.

In general, the NULL value indicates the absence of any (especially useful) assignment of a number such as a floating or an integer number. However, the NULL value may be a valid value for a geometric parameter in the sense of the present invention.

For example, a pharmaceutical container, especially a vial, having no neck, the geometric parameter describing the height of the neck may have a value of zero for that type of container. And for example, a pharmaceutical container, especially a vial, the geometric parameter describing the collar facet angle may be NULL in case that the collar has no surface having a normal vector pointing in a direction towards the plane comprising the top of the vial. Likewise a cartridge might have a NULL value for example for the bottom depth.

In the following preferred mean values and standard deviations (and combinations thereof) for different geometric parameters are provided. Preferably, the number of containers here is between 10 and 1000, preferably between 50 and 300, most preferably between 50 and 200, especially 50, 100, 150 or 200.

In one embodiment it is alternatively or in addition preferred that the geometric parameter collar and neck radius (r22) has a mean value of between 0.1 and 1.0 mm, preferably of between 0.2 and 0.7 mm, of between 0.3 and 0.8 mm, of between 0.4 and 0.6 mm or of 0.454 mm, and/or a standard deviation of at least 2% of the mean value.

In one embodiment it is alternatively or in addition preferred that the geometric parameter shoulder angle (c51) has a mean value of between 10 and 50 degrees, more preferably of between 10 and 20 degrees, of between 15 and 25 degrees, of between 20 and 30 degrees, of between 25 and 35 degrees, of between 30 and 40 degrees, of between 35 and 45 degrees, of between 40 and 50 degrees or of 30.00 degrees, and/or a standard deviation of at least 2% of the mean value.

In one embodiment it is alternatively or in addition preferred that the geometric parameter neck outer diameter (d3) has a mean value of between 5 and 50 mm, preferably of between 5 and 15 mm, of between 10 and 20 mm, of between 15 and 25 mm, of between 20 and 30 mm, of between 25 and 35 mm, of between 30 and 40 mm, of between 35 and 45 mm, of between 40 and 50 mm or of 16.00 mm, and/or a standard deviation of at least 2% of the mean value.

In one embodiment it is alternatively or in addition preferred that the geometric parameter lower collar angle (c21) has a mean value of between 5 and 50 degrees, more preferably of between 10 and 20 degrees, of between 15 and 25 degrees, of between 20 and 30 degrees, of between 25 and 35 degrees, of between 30 and 40 degrees, of between 35 and 45 degrees, of between 40 and 50 degrees or of 30.00 degrees, and/or a standard deviation of at least 2% of the mean value.

In one embodiment it is alternatively or in addition preferred that the geometric parameter total height (h1) has a mean value of between 10 and 100 mm, preferably of between 10 and 20 mm, of between 15 and 25 mm, of between 20 and 30 mm, of between 25 and 35 mm, of between 30 and 40 mm, of between 35 and 45 mm, of between 40 and 50 mm, of between 45 and 55 mm, of between 50 and 60 mm, of between 55 and 65 mm, of between 60 and 70 mm, of between 65 and 75 mm, of between 70 and 80 mm, of between 75 and 85 mm, of between 80 and 90 mm, of between 85 and 95 mm, of between 90 and 100 mm or of 46.80 mm, and/or a standard deviation of at least 2% of the mean value.

In one embodiment it is alternatively or in addition preferred that the geometric parameter total collar height plus neck height (h3) has a mean value of between 2 and 20 mm, preferably of between 2 and 7 mm, of between 5 and 10 mm, of between 7 and 12 mm, of between 10 and 14 mm, of between 12 and 17 mm, of between 15 and 18 mm, of between 17 and 20 mm or of 9.00 mm, and/or a standard deviation of at least 2% of the mean value.

In one embodiment it is alternatively or in addition preferred that the geometric parameter bottom depth (t) has a mean value of between 0.1 and 2 mm, preferably of between 0.1 and 1.0 mm, of between 0.3 and 0.6 mm, of between 0.5 and 0.8 mm, of between 0.7 and 1 mm or of 0.40 mm, and/or a standard deviation of at least 2% of the mean value.

In one embodiment it is alternatively or in addition preferred that the geometric parameter body outer diameter (d1) has a mean value of between 5 and 50 mm, preferably of between 5 and 15 mm, of between 10 and 20 mm, of between 15 and 25 mm, of between 20 and 30 mm, of between 25 and 35 mm, of between 30 and 40 mm, of between 35 and 45 mm, of between 40 and 50 mm or of 23.00 mm, and/or a standard deviation of at least 2% of the mean value.

In one embodiment it is alternatively or in addition preferred that the geometric parameter shoulder radius (r1) has a mean value of between 1.5 and 10 mm, preferably of between 1.5 and 3 mm, of between 2 and 4 mm, of between 3 and 5 mm, of between 4 and 6 mm, of between 5 and 7 mm, of between 6 and 8 mm, of between 7 and 9 mm, of between 8 and 19 mm or of 3.60 mm, and/or a standard deviation of at least 2% of the mean value.

In one embodiment it is alternatively or in addition preferred that the geometric parameter collar outer diameter/thread outer diameter (d2) has a mean value of between 5 and 50 mm, preferably of between 5 and 15 mm, of between 10 and 20 mm, of between 15 and 25 mm, of between 20 and 30 mm, of between 25 and 35 mm, of between 30 and 40 mm, of between 35 and 45 mm, of between 40 and 50 mm or of 19.95 mm, and/or a standard deviation of at least 2% of the mean value.

It is also acknowledged that although the geometric parameters introduced hereinabove are described with respect to vials, they might nevertheless be also valid geometric parameters for other pharmaceutical containers.

Figure 28:
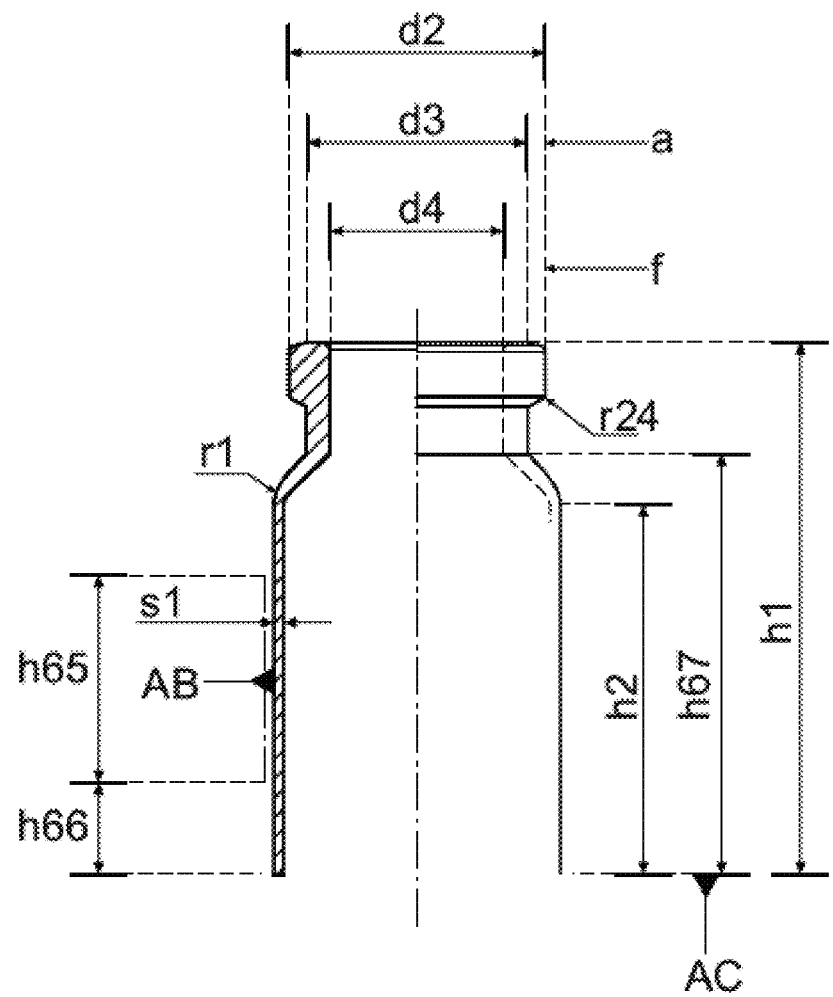
FIG. 28 illustrates a cartridge with some of the geometric parameters of the present invention.

For example, cartridges are similar in construction as vials. In a way a cartridge is a vial lacking its bottom area. Or in other words, a cartridge can be regarded as a vial the bottom end of which has been removed. As a consequence, all geometric parameters described above which do not describe a feature in the bottom area of a vial apply mutatis mutandis also to cartridges. In FIG. 28 a cartridge is illustrated with some of the geometric parameters introduced above indicated.

Especially it is noted that the geometric parameters defined above for vials and which use the bottom (of the vial) for their definition might also apply mutatis mutandis for the corresponding geometric parameter of a cartridge, since the lower end of the cartridge might then be used instead of the bottom.

Further Glass Properties

The coefficient of linear thermal expansion (CTE) is a measure of characterizing the expansion behavior of a glass when it experiences certain temperature variation. CTE may be the average linear thermal expansion coefficient in a temperature range of from 20° C. to 300° C. as defined in DIN ISO 7991:1987. The lower the CTE, the less expansion with temperature variation. Therefore, in the temperature range of from 20° C. to 300° C. the glass of the wall of the pharmaceutical container of the present invention preferably has a CTE of less than 12 ppm/K, more preferably less than 10.0 ppm/K, more preferably less than 9.0 ppm/K, more preferably less than 8.0 ppm/K, more preferably less than 7 ppm/K, more preferably less than 6.5 ppm/K. However, the CTE should also not be very low. Preferably, in the temperature range of from 20° C. to 300° C. the CTE of the glasses of the present invention is more than 3 ppm/K, more preferably more than 4 ppm/K, more preferably more than 5 ppm/K, more preferably more than 6 ppm/K. In order for the glasses to be well suitable for chemical toughening, the glasses may contain relatively high amounts of alkali metal ions, preferably sodium ions. However, thereby the average linear thermal expansion coefficient CTE in the temperature range between 20° C. and 300° C. is increased. Preferably, the glass of the wall of the pharmaceutical container of the invention has a CTE higher than $7*10^{-6}/°$ C., more preferably higher than $8*10^{-6}/°$ C., more preferably higher than $9*10^{-6}/°$ C. However, a high CTE also complicates production of the glasses by direct hot-forming. Therefore, the glasses preferably have a CTE lower than $13*10^{-6}/°$ C.

The transition temperature of the glass used for the wall of the pharmaceutical container may be higher than 300° C., higher than 500° C., higher than 520° C., higher than 530° C., higher than 550° C., or even higher than 600° C. The transition temperature of the wall of the pharmaceutical container may be lower than 900° C., lower than 800° C., lower than 700° C., lower than 650° C., or lower than 630°

C. Generally, a low transition temperature usually includes lower energy costs for melting the glass and for processing. Also, the glass will usually have a lower fictive temperature if the transition temperature is low. Hence, the glass will be less prone to irreversible thermal shrinkage during optional chemical toughening, if the transition temperature is higher.

The pharmaceutical container should be manufactured with a high purity and it should feature a good resistance, especially against alkaline solutions. The resistance against alkaline solutions is important for the use of pharmaceutical containers. Alkaline solutions are often used as cleaning agents for pharmaceutical containers. Preferably, the pharmaceutical container has an alkaline resistance according to DIN ISO 695:1994 of class A3, of A2, or even of A1. Alkaline resistance means resistance to attack by aqueous alkaline solutions at 50° C. High chemical stability and/or a high alkaline resistance will lead to strongly reduced precipitation or leakage of substances out of the pharmaceutical container for example when the pharmaceutical container is in contact with fluids such as juice, tea or dishwasher water. Leakage of substances out of the pharmaceutical container will change the chemical composition of the surface of the glass from which substances have leaked. This might lead negative effects on the appearance and should therefore be avoided.

The average surface roughness ($R_a$) is a measure of the texture of a surface. It is quantified by the vertical deviations of a real surface from its ideal form. Commonly amplitude parameters characterize the surface based on the vertical deviations of the roughness profile from the mean line. $R_a$ is arithmetic average of the absolute values of these vertical deviations. The roughness can be measured with atomic force microscopy. The inner surface and/or outer surface of the pharmaceutical container preferably has an average surface roughness Ra of less than 30 nm, of less than 10 nm, of less than 5 nm, of less than 2 nm, of less than 1 nm. In some embodiments, the surface roughness Ra is less than 0.5 nm. A smaller inner and/or outer surface roughness reduces the amount residual fluid. Residual fluid within the pharmaceutical container can give rise to growth of microorganisms which could harm the health of animals or humans. Furthermore, a smaller outer surface roughness gives a more pleasant feeling when holding the pharmaceutical container in the hand. The mentioned roughness values can be obtained by fire-polishing the glass.

Glass Compositions

The glass used for the wall of the pharmaceutical container is not limited to a specific glass composition. The glass may be selected from the group consisting of soda-lime glass, borosilicate glass, alkaline-resistant glass and aluminosilicate glass. Optionally, a borosilicate glass is used.

The glass of the pharmaceutical container preferably comprises the following components in the indicated amounts (in wt. %):

| Component | Content (wt. %) |
|---|---|
| $SiO_2$ | 40 to 85 |
| $Al_2O_3$ | 0 to 25 |
| $Na_2O$ | 0 to 18 |
| $K_2O$ | 0 to 15 |
| MgO | 0 to 10 |
| $B_2O_3$ | 0 to 22 |
| $Li_2O$ | 0 to 10 |
| ZnO | 0 to 5 |
| CaO | 0 to 16 |

-continued

| Component | Content (wt. %) |
|---|---|
| BaO | 0 to 12 |
| $ZrO_2$ | 0 to 5 |
| $CeO_2$ | 0 to 0.5 |
| $SnO_2$ | 0 to 3 |
| $P_2O_5$ | 0 to 15 |
| $Fe_2O_3$ | 0 to 1.5 |
| $TiO_2$ | 0 to 10 |
| SrO | 0 to 1 |
| F | 0 to 1 |
| Cl | 0 to 1 |

$SiO_2$ is a relevant network former that can be used in the glass used for this of the invention. Therefore, the glasses may comprise $SiO_2$ in an amount of at least 60 wt. %. More preferably, the glass comprises $SiO_2$ in an amount of at least 62 wt. %, at least 65 wt. %, at least 68 wt. %, more than 70 wt. %, or even more than 75 wt. %. However, the content of $SiO_2$ in the glass should also not be extremely high because otherwise the meltability may be compromised. The amount of $SiO_2$ in the glass may be limited to at most 85 wt. %, or at most 82 wt. %. In embodiments, the content of $SiO_2$ in the glass is from 60 to 85 wt. %, or from >65 to 75 wt. %.

$B_2O_3$ may be used in order to enhance the network by increasing the bridge-oxide in the glass via the form of $[BO_4]$ tetrahedra. It also helps to improve the damage resistance of the glass. However, $B_2O_3$ should not be used in high amounts in the glass since it can decrease the ion-exchange performance. Furthermore, addition of $B_2O_3$ can significantly reduce the Young's modulus. The glass may comprise $B_2O_3$ in an amount of from 0 to 20 wt. %, preferably from 0 to 15 wt. %, preferably from 0.1 to 13 wt. %. In embodiments, the glass preferably comprises at least 5 wt. %, more preferably at least 7 wt. %, or at least 10 wt. % of $B_2O_3$.

$P_2O_5$ may be used in the glass of the invention in order to help lowering the melting viscosity by forming $[PO_4]$ tetrahedra, which can significantly lower the melting point without sacrificing anti-crystallization features. Limited amounts of $P_2O_5$ do not increase geometry variation very much, but can significantly improve the glass melting, forming performance, and ion-exchanging (chemical toughening) performance. However, if high amounts of $P_2O_5$ are used, geometry expansion upon chemical toughening may be increased significantly. Therefore, the glasses may comprise $P_2O_5$ in an amount of from 0 to 4 wt. %, or from 0 to 2 wt. %. In some embodiments, the glass is free of $P_2O_5$.

It is believed that $Al_2O_3$ can easily form tetrahedra coordination when the alkaline oxide ratio content is equal or higher than that of $Al_2O_3$. $[AlO_4]$ tetrahedra coordination can help building up more compact network together with $[SiO_4]$ tetrahedra, which can result in a low geometry variation of the glass. $[AlO_4]$ tetrahedra can also dramatically enhance the ion-exchange process during chemical toughening. Therefore, $Al_2O_3$ is preferably contained in the glasses in an amount of at least 0 wt. %, more preferably of more than 1 wt. %, more preferably of more than 4 wt. %. However, the amount of $Al_2O_3$ should also not be very high because otherwise the viscosity may be very high so that the meltability may be impaired. Therefore, the content of $Al_2O_3$ in the glasses is preferably at most 20 wt. %, at most 12 wt. %, or at most 10 wt. %. In preferred embodiments, the content of $Al_2O_3$ in the glasses is from 0 to 20 wt. %, from 1 to 12 wt. %, from 4 to 10 wt. %.

$TiO_2$ can also form $[TiO_4]$ and can thus help building up the network of the glass, and may also be beneficial for improving the acid resistance of the glass. However, the amount of $TiO_2$ in the glass should not be very high. $TiO_2$ present in high concentrations may function as a nucleating agent and may thus result in crystallization during manufacturing. Preferably, the content of $TiO_2$ in the glasses is from 0 to 10 wt. %, or up to 7 wt. %. In some embodiments, the glass comprises at least 0.5 wt. %, at least 2 wt. %, or at least 3 wt. % of $TiO_2$. In an embodiment, the glass is free of $TiO_2$.

$ZrO_2$ has the functions of lowering the CTE and improving the alkaline resistance of a glass. It may increase the melting viscosity, which can be suppressed by using $P_2O_5$. Like alkaline metals, $Zr^{4+}$ is also a network modifier. Furthermore, $ZrO_2$ is a significant contributor for increased Young's modulus. Preferably, the content of $ZrO_2$ in the glasses is from 0 to 5 wt. %, up to 2 wt. %. The glass may be free of $ZrO_2$. In some embodiments, the glass comprises at least 0.1 wt. %, or at least 0.2 wt. % $ZrO_2$.

Alkaline oxides $R_2O$ ($Li_2O+Na_2O+K_2O+Cs_2O$) may be used as network modifiers to supply sufficient oxygen anions to form the glass network. Preferably, the content of $R_2O$ in the glasses is more than 4 wt. %, or more than 12 wt. %. However, the content of $R_2O$ in the glass should not be very high because otherwise chemical stability and chemical toughenability may be impaired. Preferably, the glasses comprise $R_2O$ in an amount of at most 30 wt. %, at most 25 wt. %, or at most 20 wt. %. Other embodiments are free of alkaline oxides, or at least free of $Na_2O$, $K_2O$, $Cs_2O$ and/or $Li_2O$ $Li_2O$ can help improving the Young's modulus and lowering CTE of the glass. $Li_2O$ also influences the ion-exchange greatly. It was surprisingly found that Li-containing glass has a smaller geometry variation. Therefore, the content of $Li_2O$ in the glasses may be set to at least 0 wt. %, or more than 5 wt. %, or even more than 10 wt. %. However, the content of $Li_2O$ should not be very high because otherwise chemical stability and chemical toughenability may be impaired. Preferably, the content of $Li_2O$ in the glasses is at most 24 wt. %, less than 15 wt. %, or even 0 wt. %.

$Na_2O$ may be used as a network modifier. However, the content of $Na_2O$ should not be very high because otherwise chemical stability and chemical toughenability may be impaired. Preferably, the content of $Na_2O$ in the glasses is from 0 to 15 wt. %, preferably from 2 to 15 wt. %. In preferred embodiments, the content of $Na_2O$ in the glasses is at least 5 wt. %, at least 8 wt. %, or at least 10 wt. %.

$K_2O$ may be used as a network modifier. However, the content of $K_2O$ should not be very high because otherwise chemical stability and chemical toughenability may be impaired. Preferably, the content of $K_2O$ in the glasses is from 0 to 15 wt. %, or from >0.5 to 7 wt. %. The glass may be free of $K_2O$.

Preferably, the glasses comprise more $Na_2O$ than $K_2O$. Thus, preferably the molar ratio $Na_2O/(Na_2O+K_2O)$ is from >0.5 to 1.0, from >0.6 to 1.0, from >0.7 to 1.0, or from >0.8 to 1.0.

Preferably, the content of the sum of $Li_2O$ and $Na_2O$ in the glasses is more than 10 mol-%, or more than 15 mol-%. However, the content of the sum of $Li_2O$ and $Na_2O$ in the glasses should not be very high. Preferably, the content of the sum of $Li_2O$ and $Na_2O$ in the glasses is at most 25 mol-%, or at most 20 mol-%.

The glasses may also comprise alkaline earth metal oxides as well as ZnO which are collectively termed "RO" in the present specification. Alkaline earth metals and Zn may serve as network modifiers. Preferably, the glasses comprise RO in an amount of from 0 to 20 wt. %, preferably from 0 to 15 wt. %. In some embodiments, the glass preferably comprises at least 0.5 wt. %, more preferably at least 1 wt. %, more preferably at least 5 wt. % of RO. Preferred alkaline earth metal oxides are selected from the group consisting of MgO, CaO, SrO und BaO. More preferably, alkaline earth metals are selected from the group consisting of MgO und CaO. More preferably, the alkaline earth metal is MgO. Preferably, the glass comprises MgO in an amount of from 0 to 10 wt. %. In some embodiments, the glass comprises at least 0.5 wt. %, at least 1 wt. %, or at least 2 wt. % of MgO. Preferably, the glass comprises CaO in an amount of from 0 to 16 wt. %, preferably from 0 to 13 wt. %, preferably from 0 to 10 wt. %. In some embodiments, the glass comprises at least 0.5 wt. %, at least 1 wt. %, at least 5 wt. %, at least 10 wt. %, or at least 12 wt. % of CaO. Preferably, the glass comprises BaO in an amount of from 0 to 12 wt. %, preferably from 0 to 10 wt. %. In some embodiments, the glass comprises at least 0.5 wt. %, at least 2 wt. %, or at least 7 wt. % of BaO. The glass may be free of BaO, MgO and/or CaO.

Preferably, the glass comprises ZnO in an amount of from 0 to 5 wt. %. In some embodiments, the glass comprises at least 0.5 wt. %, at least 1 wt. %, or at least 2 wt. % of ZnO. In other embodiments, the glass is free of ZnO. Preferably, the content of the sum of MgO and ZnO in the glasses is from 0 to 10 wt. %. In some embodiments, the content of the sum of MgO and ZnO in the glasses at least 0.5 wt. %, more preferably at least 1 wt. %, more preferably at least 2 wt. %.

At the end, when forming a glass by mixing different types of the oxides, the integrated effect should be considered to achieve a glass with comparatively low expansion, which is supported by high densification of the glass network. It means, in addition to $[SiO_4]$ tetrahedral $[BO_4]$ tetrahedra, $[AlO_4]$ tetrahedra, or $[PO_4]$ tetrahedra are expected to help connect the $[SiO_4]$ more effectively rather than other type of polyhedrons. In other words, $[BO_3]$ triangle and $[AlO_6]$ octahedron, for instance, are not preferred. It means, sufficient oxygen anions are preferable to be offered by adding proper amounts of metal oxides, such as $R_2O$ and RO.

Preferably, the content of $SnO_2$ in the glasses is from 0 to 3 wt. %. More preferably, the glasses are free of $SnO_2$. Preferably, the content of $Sb_2O_3$ in the glasses is from 0 to 3 wt. %. More preferably, the glasses are free of $Sb_2O_3$. Preferably, the content of $CeO_2$ in the glasses is from 0 to 3 wt. %. High contents of $CeO_2$ are disadvantages because $CeO_2$ has a coloring effect. Therefore, more preferably, the glasses are free of $CeO_2$. Preferably, the content of $Fe_2O_3$ in the glasses is from 0 to 3 wt. %. More preferably, the glasses are free of $Fe_2O_3$.

The glass described herein is described as having a composition of different constituents. This means that the glass contains these constituents without excluding further constituents that are not mentioned. However, in preferred embodiments, the glass consists of the components mentioned in the present specification to an extent of at least 95%, more preferably at least 97%, most preferably at least 99%. In most preferred embodiments, the glass essentially consists of the components mentioned in the present specification.

Optionally, coloring oxides can be added, such as $Nd_2O_3$, $Fe_2O_3$, CoO, NiO, $V_2O_5$, $MnO_2$, CuO, $CeO_2$, $Cr_2O_3$.

0-2 wt. % of $As_2O_3$, $Sb_2O_3$, $SnO_2$, $SO_3$, Cl and/or F could be also added as refining agents. 0-5 wt. % of rare earth oxides could also be added to add optical or other functions to the glass wall.

The terms "X-free" and "free of component X", or "0% of X", respectively, as used herein, refer to a glass, which essentially does not comprise said component X, i.e., such component may be present in the glass at most as an impurity or contamination, however, is not added to the glass composition as an individual component. This means that the component X is not added in essential amounts. Non-essential amounts according to the present invention are amounts of less than 100 ppm, preferably less than 50 ppm and more preferably less than 10 ppm. Preferably, the glasses described herein do essentially not contain any components that are not mentioned in this description.

In embodiments, the glass used for the pharmaceutical container has the following composition in percent by weight:

| Component | Content (wt. %) |
|---|---|
| $SiO_2$ | 40 to 85 |
| $Al_2O_3$ | 0 to 25 |
| $Na_2O$ | 2 to 18 |
| $K_2O$ | 0 to 15 |
| MgO | 0 to 10 |
| $B_2O_3$ | 0 to 15 |
| $Li_2O$ | 0 to 10 |
| ZnO | 0 to 5 |
| CaO | 0 to 10 |
| BaO | 0 to 5 |
| $ZrO_2$ | 0 to 5 |
| $CeO_2$ | 0 to 0.5 |
| $SnO_2$ | 0 to 3 |
| $P_2O_5$ | 0 to 15 |
| $Fe_2O_3$ | 0 to 1.5 |
| $TiO_2$ | 0 to 10 |
| SrO | 0 to 1 |
| F | 0 to 1 |

In embodiments, the glass used for the pharmaceutical container has the following composition in percent by weight:

| Component | Content (wt. %) |
|---|---|
| $SiO_2$ | 55 to 65 |
| $Al_2O_3$ | 10 to 20 |
| $Na_2O$ | 0 to 3 |
| $K_2O$ | 0 to 3 |
| MgO | 0 to 5 |
| $B_2O_3$ | 0 to 6 |
| $Li_2O$ | 0 to 3 |
| ZnO | 0 to 3 |
| CaO | 7 to 15 |
| BaO | 5 to 10 |
| $ZrO_2$ | 0 to 3 |
| $CeO_2$ | 0 to 0.5 |
| $SnO_2$ | 0 to 3 |
| $P_2O_5$ | 0 to 3 |
| $Fe_2O_3$ | 0 to 1.5 |
| $TiO_2$ | 0 to 3 |
| SrO | 0 to 1 |
| F | 0 to 1 |
| Cl | 0 to 1 |

In embodiments, the glass used for the pharmaceutical container has the following composition in percent by weight:

| Component | Content (wt. %) |
|---|---|
| $SiO_2$ | 65 to 85 |
| $Al_2O_3$ | 0 to 7 |
| $Na_2O$ | 0.5 to 10 |
| $K_2O$ | 0 to 10 |
| MgO | 0 to 3 |
| $B_2O_3$ | 8 to 20 |
| $Li_2O$ | 0 to 3 |
| ZnO | 0 to 3 |
| CaO | 0 to 3 |
| BaO | 0 to 3 |
| $ZrO_2$ | 0 to 3 |
| $CeO_2$ | 0 to 0.5 |
| $SnO_2$ | 0 to 3 |
| $P_2O_5$ | 0 to 3 |
| $Fe_2O_3$ | 0 to 1.5 |
| $TiO_2$ | 0 to 3 |
| SrO | 0 to 1 |
| F | 0 to 1 |
| Cl | 0 to 1 |

In embodiments, the glass used for the pharmaceutical container has the following composition in percent by weight:

| Component | Content (wt. %) |
|---|---|
| $SiO_2$ | 60 to 80 |
| $Al_2O_3$ | 0 to 5 |
| $Na_2O$ | 10 to 18 |
| $K_2O$ | 0 to 5 |
| MgO | 0 to 5 |
| $B_2O_3$ | 0 to 5 |
| $Li_2O$ | 0 to 3 |
| ZnO | 0 to 3 |
| CaO | 2 to 10 |
| BaO | 0 to 5 |
| $ZrO_2$ | 0 to 3 |
| $CeO_2$ | 0 to 0.5 |
| $SnO_2$ | 0 to 3 |
| $P_2O_5$ | 0 to 3 |
| $Fe_2O_3$ | 0 to 1.5 |
| $TiO_2$ | 0 to 3 |
| SrO | 0 to 1 |
| F | 0 to 1 |
| Cl | 0 to 1 |

Optional additional treatment of the pharmaceutical container

For optional chemical toughening, the glass may be immersed in a salt bath. The salt bath may contain sodium and/or potassium salts. The salt for the salt bath may comprise Na, K or Cs nitrate, sulfate or chloride salts or a mixture of one or more thereof. Preferred salts are $NaNO_3$, $KNO_3$, NaCl, KCl, $K_2SO_4$, $Na_2SO_4$, $Na_2CO_3$, $K_2CO_3$, or combinations thereof. Additives like NaOH, KOH and other sodium or potassium salts may also be used for better controlling the speed of ion-exchange, compressive stress and DoL during chemical toughening. In an embodiment, the salt bath comprises $KNO_3$, $NaNO_3$, $CsNO_3$ or mixtures thereof.

The temperature during chemical toughening may range from 320° C. to 700° C., from 350° C. to 500° C., or from 380° C. to 450° C. If the toughening temperature is very low, the toughening rate will be low. Therefore, chemical toughening is preferably done at a temperature of more than 320° C., more preferably more than 350° C., more preferably more than 380° C., more preferably at a temperature of at least 400° C. However, the toughening temperature should not be very high because very high temperatures may result in strong compressive stress relaxation and low compressive stress. Preferably, chemical toughening is done at a temperature of less than 500° C., more preferably less than 450° C.

The time for chemical toughening may range from 5 min to 48 h, from 10 min to 20 h, from 30 min to 16 h, or from 60 min to 10 h. In preferred embodiments, the duration of chemical toughening is of from 0.5 to 16 h. Chemical toughening may either done in a single step or in multiple steps, in particular in two steps. If the duration of toughening is very low, the resulting DoL may be very low. If the duration of toughening is very high, the CS may be relaxed very strongly. The duration of each toughening step in a multistep toughening procedure is preferably between 0.05 and 15 hours, more preferably between 0.2 and 10 hours, more preferably between 0.5 and 6 hours, more preferably between 1 and 4 hours. The total duration of chemical toughening, in particular the sum of the durations of the two or more separate toughening steps, is preferably between 0.01 and 20 hours, more preferably between 0.2 and 20 hours, more preferably between 0.5 and 15 hours, more preferably between 1 and 10 hours, more preferably between 1.5 and 8.5 hours. Pharmaceutical container may be chemically toughened such that it has a DoL of at least 10 µm, or at least 20 µm. In some embodiments, the DoL may be up to 80 µm, up to 60 µm or up to 50 µm.

In some embodiments, the glass is chemically toughened with a mixture of $KNO_3$ and $NaNO_3$. In embodiments, the mixture comprises less than 50 mol % $NaNO_3$, less than 30 mol % $NaNO_3$, less than 20 mol % $NaNO_3$, less than 10 mol % $NaNO_3$, or less than 5 mol % $NaNO_3$. In some embodiments, the glass is chemically toughened with a mixture of $KNO_3$ and $CsNO_3$. In embodiments, the mixture comprises less than 50 mol % $CsNO_3$, less than 30 mol % $CsNO_3$, less than 20 mol % $CsNO_3$, less than 10 mol % $CsNO_3$, or less than 5 mol % $CsNO_3$. The balance may be $KNO_3$.

Chemical toughening with both $KNO_3$ and $NaNO_3$ may be done by using a mixture of $KNO_3$ and $NaNO_3$ or by performing separate toughening steps with essentially pure $NaNO_3$ and essentially pure $KNO_3$. Also in embodiments in which the glass is chemically toughened with mixtures of $KNO_3$ and $NaNO_3$, preferably two distinct consecutive toughening steps are performed. Preferably, the proportion of $KNO_3$ in the mixture used for the second toughening step is higher than the proportion of $KNO_3$ in the mixture used for the first toughening step. The chemical toughening can include multi steps in salt baths with alkaline metal ions of various concentrations to reach better toughening performance.

The toughening can be done by immersing the glass into a molten salt bath of the salts described above, or by covering the glass with a paste containing the ions described above, e.g., potassium ions and/or other alkaline metal ions, and heating to a high temperature for a certain time. The alkaline metal ions with larger ion radius in the salt bath or the paste exchange with alkaline metal ions with smaller radius in the glass article, and surface compressive stress is formed due to ion exchange.

A chemically toughened pharmaceutical container of the invention may be obtained by chemically toughening at least the wall of the pharmaceutical container of the present invention. The toughening process can be done by partially or completely immersing the pharmaceutical container, the glass tube, the glass wall, or any intermediate glass article into an above-described salt bath, or subjecting it to a salt paste. The monovalent ions in the salt bath have radii larger than alkali ions inside the glass. A compressive stress to the glass is built up after ion-exchange due to larger ions squeezing in the glass network. After the ion-exchange, the strength and flexibility of the glass is surprisingly and significantly improved. In addition, the compressive stress induced by chemical toughening may increase scratch resistance of the pharmaceutical container. Improved scratch resistance is particularly relevant for pharmaceutical containers because scratches affect both mechanical and chemical resistance of a glass surface as well as optical appearance.

After chemical toughening, the glass tubes are taken out of the salt bath, then cleaned with water and dried. Compressive stress layers are formed on the outer surface and/or inner surface of strengthened glass tubes. Correspondingly, a tensile stress is formed in the core part of the glass tubing wall.

Additionally, or as an alternative to chemical toughening the glass can be subjected to physical toughening. In some embodiments glass tubes are physically toughened. The glass tubes may be cut into short length, such as 100 to 400 mm. Then the two end sides of short glass tubes may be fire polished. When its wall thickness is bigger than 3 mm, short glass tubes may be physically toughened. Glass tubes may be placed into a furnace and heated above transformation temperature and kept for several minutes and then their surfaces are fast cooled with sprayed cooling air, causing compressive stress layers on both outer and inner surfaces.

Toughening

One or more types of toughening might be applied to the pharmaceutical container during the manufacturing process. For example a pharmaceutical container might be chemically toughened and/or physically toughened. Both types of toughening are explained in detail elsewhere in this application.

The threshold diffusivity D of the wall of the pharmaceutical container preferably is at least 1.5 µm²/hour, more preferably at least 4 µm²/hour. The chemical toughening performance of glass can be described by the threshold diffusivity D. The threshold diffusivity D can be calculated from the measured depth of layer (DoL) and the ion exchange time (IET) according to the relationship: DoL=~1.4 sqrt (4*D*IET). The threshold diffusivity may for example be measured when chemically toughening the glass at 410° C. in $KNO_3$ for 8 hours. The glass used for the pharmaceutical container may have excellent chemical toughening performance which allows for a very economic production. Thus, the glass may have a threshold diffusivity D of at least 1.5 µm²/hour. Preferably, the glass of the present invention has a threshold diffusivity D of at least 4 µm²/hour, at least 6 µm²/hour, at least 8 µm²/hour, at least 10 µm²/hour, at least 12 µm²/hour, at least 14 µm²/hour, at least 16 µm²/hour, at least 18 µm²/hour, at least 20 µm²/hour, at least 25 µm²/hour, at least 30 µm²/hour, at least 35 µm²/hour, or even at least 40 µm²/hour. In an embodiment, the threshold diffusivity is up to 60 µm²/hour or up to 50 µm²/hour.

In some embodiments chemical toughening is employed.

Cutting Mechanism

In preferred embodiments at least one out of three cutting mechanisms might be applied for manufacturing the pharmaceutical containers, i.e., to prepare the desired length of each pharmaceutical container from a longer glass element such as a glass tube line: 1. scratching, which means that at desired positions the longer glass element is scratched and broken in order to obtain the individual pharmaceutical containers. This technique might be also referred to as "score broken". 2. Sawing, which means that at the desired positions the longer glass element is sawed so that individual pharmaceutical containers are obtained. 3. Laser cutting, which means that the individual pharmaceutical containers are obtained in that a laser cuts the individual pieces from the longer glass element.

In preferred embodiments a laser cutting technique is employed.

Polishing

In preferred embodiments all or at least one or more parts of the pharmaceutical containers can be made subject to fire polishing. This means that the material is exposed to a flame or heat, for example during drawing of the glass tube or afterwards. This might result in a smoothening of the surface. Preferably at least the end sections of the pharmaceutical containers are fire polished. More preferably the entire pharmaceutical container is fire polished, at least its outer surface. Reference is also made to the discussion made with respect to surface roughness above.

Annealing

Annealing of pharmaceutical containers allows to relieve residual internal stresses introduced during manufacture.

Typically, the annealing process is applied after cutting and polishing, especially fire polishing of the end sections, respectively, of the pharmaceutical containers. For example, the temperature for annealing of pharmaceutical containers can be between 500 and 550 degrees C., for example 535 degrees C., which is preferably about 20 to 30 degree C. above Tg (which is the transition temperature of glass). Keeping the pharmaceutical containers at this temperature for several hours can release local stresses during both drawing and cutting processes, which allows to improve the uniformity of the whole tubing. Indeed, the pharmaceutical containers might run through an annealing oven in bulks for annealing.

In preferred embodiments annealing is employed.

Figure 29A:
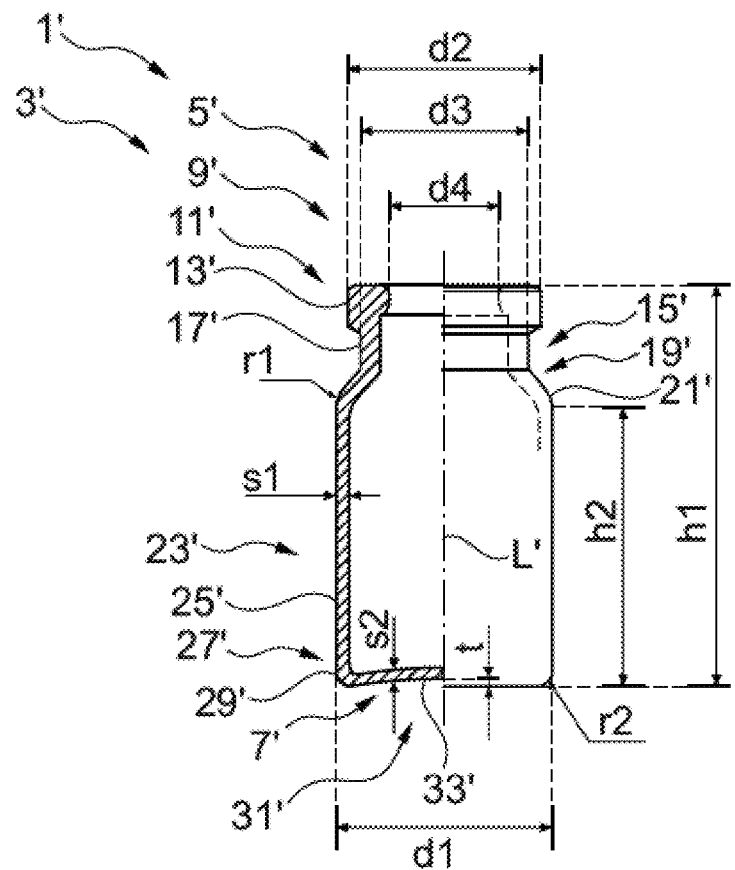
FIG. 29a shows a partially cut view of a container from a plurality of first containers according to the invention.

FIG. 29a shows a pharmaceutical container 1', which is designed in form of a vial. The container 1' is one container of a plurality of first containers (i.e., first exemplary containers) according to the invention. Indeed, container 1' is similar to container 1 described with respect to FIG. 1. Hence, for the same structural features the same reference numerals are used, however, single dashed.

The container 1' has a tube 3' with a first end 5' and a further end 7', wherein the tube is characterized by a center axis L' and comprises, in a direction from the top (i.e., first end 5') to the bottom (i.e., further end 7') the parts:

A top region 9' that is located at the first end 5' of the tube 3'; a collar region 11' comprising a collar 13' that follows the top region 9'; a neck region 15' comprising a neck 17' that follows the collar region 11'; a shoulder region 19' comprising a shoulder 21' that follows the neck region 15'; a body region 23' comprising a body 25' that follows the shoulder region 19'; a heel region 27' comprising a heel 29' that follows the body region 23' and that extends to the further end 7' of the tube 3'; and a bottom region 31' comprising a bottom 33 that follows the heel region 27' and that closes the glass tube at the further end 7'.

Figure 29B:
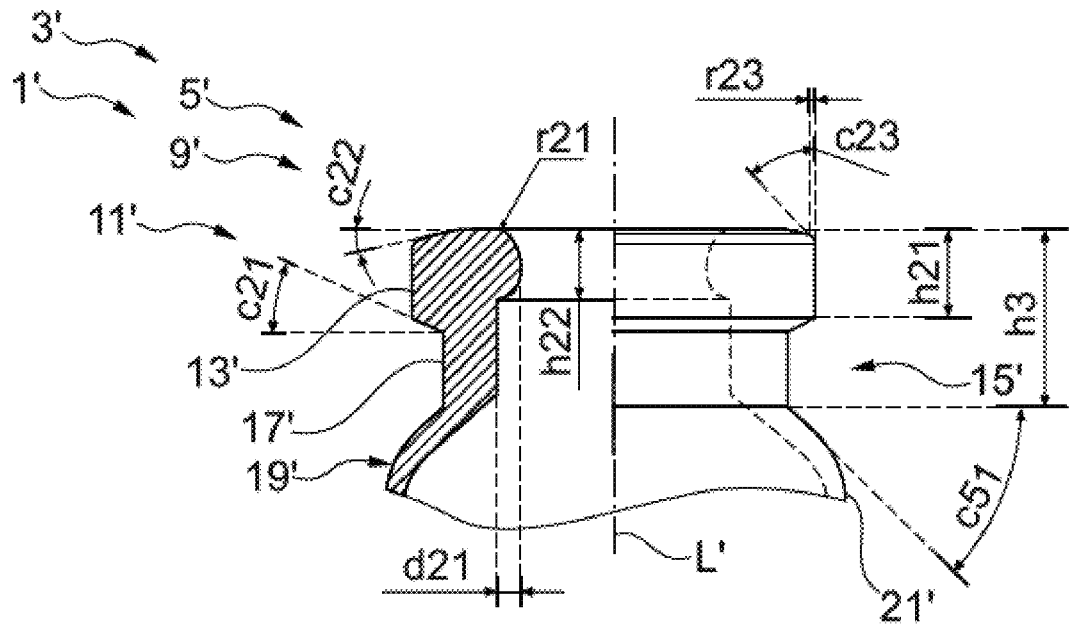

FIG. 29b shows a magnification of the upper region (comprising particularly the top region 9', the collar region 11' and the shoulder region 19') of the container 1' of FIG. 29a.

In FIG. 29a and FIG. 29b references for a plurality of geometric parameters as discussed hereinabove are indicated. For the container 1' as shown in FIGS. 29a and 29b, the following values for the mean value and the standard deviation for each of certain geometric parameters are obtained for a plurality of 150 containers of container 1':

| Geometric parameter | Mean value | Standard deviation |
| --- | --- | --- |
| d1 [mm] | 15.94 | 0.02 |
| d2 [mm] | 13.04 | 0.025 |
| d3 [mm] | 10.44 | 0.04 |
| d4 [mm] | 6.87 | 0.02 |
| h1 [mm] | 35.23 | 0.05 |
| h2 [mm] | 22.88 | 0.05 |
| h3 [mm] | 8.06 | 0.015 |
| h21 [mm] | 3.51 | 0.01 |
| c21 [°] | 11.81 | 0.02 |
| c22 [°] | 2.03 | 0.005 |
| c23 [°] | 45.43 | 0.1 |
| c51 [°] | 13.85 | 0.05 |
| s1 [mm] | 0.99 | 0.004 |
| s2 [mm] | 0.86 | 0.004 |
| r1 [mm] | 2.39 | 0.005 |
| r2 [mm] | 1.23 | 0.005 |
| r23 [mm] | 0.57 | 0.004 |
| t [mm] | 0.66 | 0.0028 |

Figure 30A:
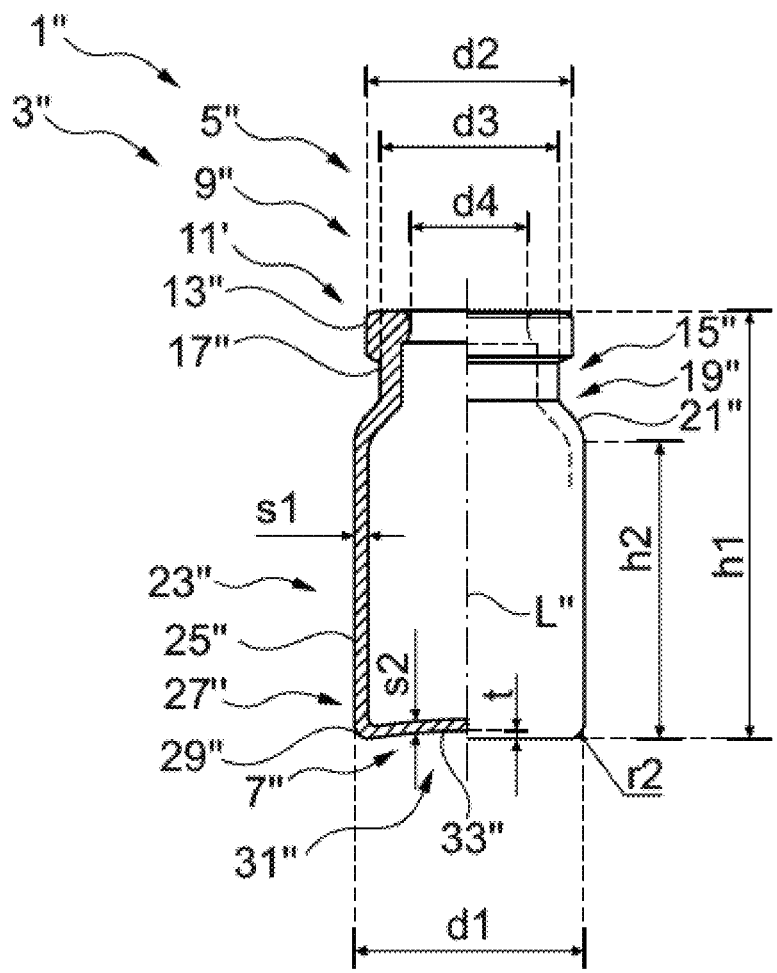
FIG. 30a shows a partially cut view of a container from a plurality of second containers according to the invention.

FIG. 30a shows a container 1", which is designed in form of a vial. The container 1" is one container of a plurality of second containers (i.e., second exemplary containers) according to the invention. For structural features of the container 1" which are similar or identical to the ones of the container 1' described with respect to FIGS. 29a and 29b the same reference numerals are used but double dashed.

Figure 30B:
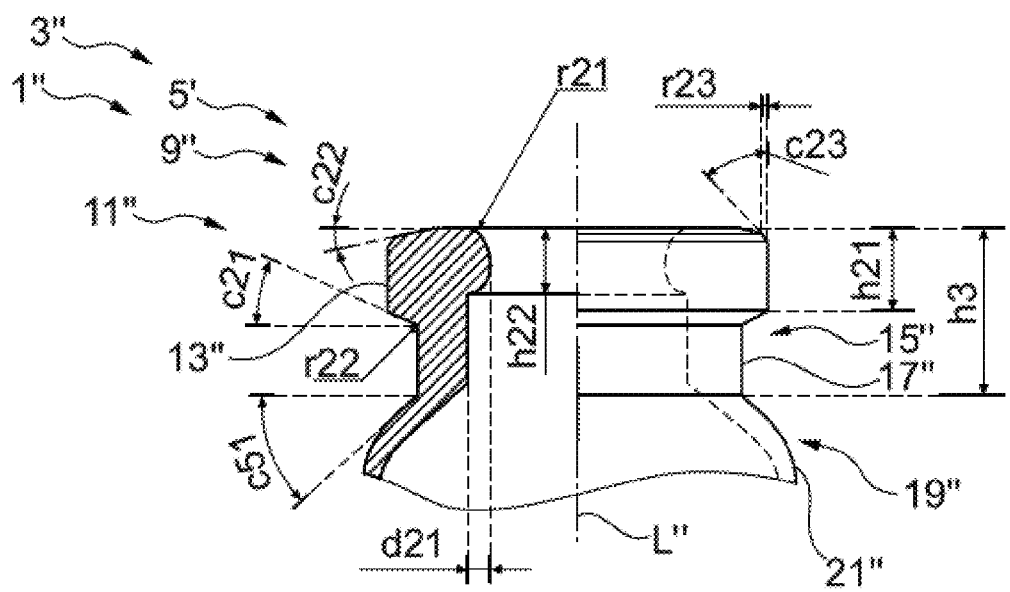

FIG. 30b shows a magnification of the upper region (comprising particularly the top region 9", the collar region 11", the shoulder region 19") of the container 1" of FIG. 30a.

Since container 1" is similar to container 1', only the differences between both containers need to be discussed here while for the remainder reference can be made to the discussion provided above with respect to container 1' with reference to FIGS. 29a and 29b.

For the container 1" as shown in FIGS. 29a and 29b, the following values for the mean value and the standard deviation for each of certain geometric parameters are obtained for a plurality of 150 containers of container 1":

| Geometric parameter | Mean value | Standard deviation |
| --- | --- | --- |
| d1 [mm] | 30.13 | 0.03 |
| d2 [mm] | 19.91 | 0.025 |
| d3 [mm] | 16.88 | 0.04 |
| d4 [mm] | 12.72 | 0.02 |
| h1 [mm] | 76.9 | 0.2 |
| h2 [mm] | 55.71 | 0.2 |
| h3 [mm] | 8.91 | 0.05 |
| h21 [mm] | 3.55 | 0.02 |
| c21 [°] | 31.76 | 0.05 |
| c22 [°] | 3.94 | 0.02 |
| c23 [°] | 44.23 | 0.1 |
| c51 [°] | 29.12 | 0.05 |
| s1 [mm] | 1.31 | 0.005 |
| s2 [mm] | 0.78 | 0.004 |
| r1 [mm] | 3.53 | 0.008 |
| r2 [mm] | 2.81 | 0.004 |
| r22 [mm] | 0.43 | 0.004 |
| r23 [mm] | 0.74 | 0.004 |
| t [mm] | 0.72 | 0.005 |

Figure 31A:
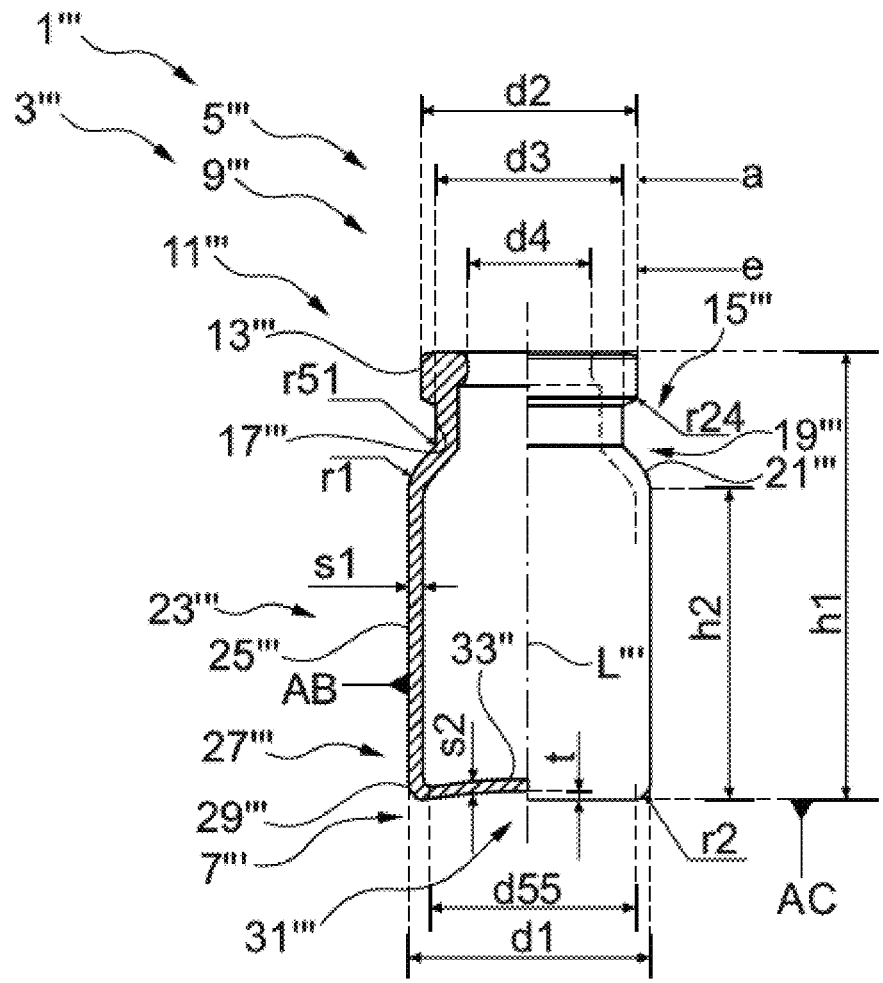
FIG. 31a shows a partially cut view of a container from a plurality of third containers according to the invention.

FIG. 31a shows a container 1''', which is designed in form of a vial. The container 1''' is one container of a plurality of third containers (i.e., third exemplary containers) according to the invention. For structural features of the container 1''' which are similar or identical to the ones of the container 1' described with respect to FIGS. 29a and 29b or container 1" described with respect to FIGS. 30a and 30b, the same reference numerals are used but double dashed.

Figure 31B:
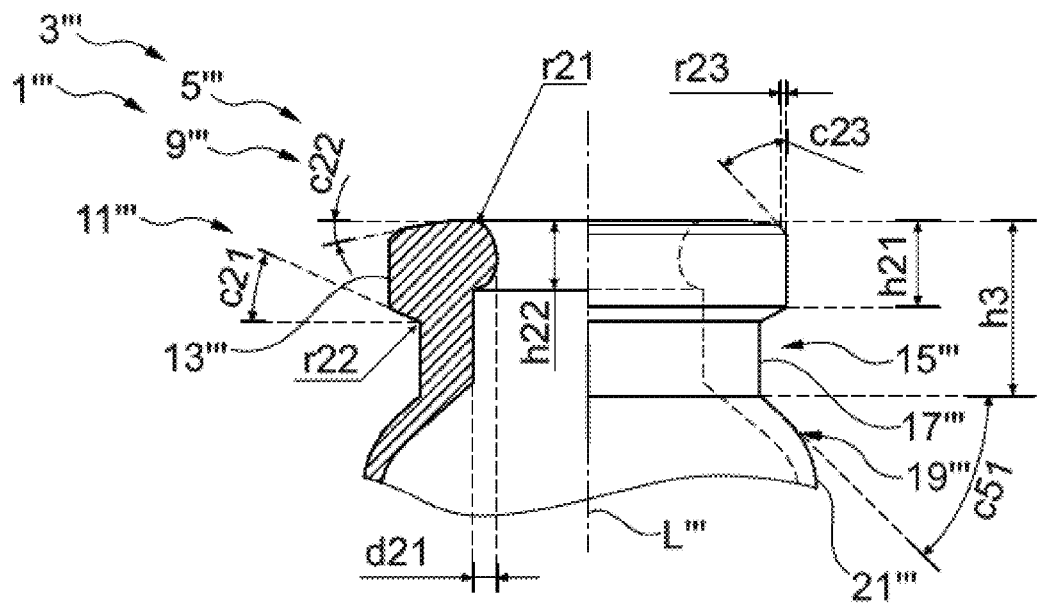

FIG. 31b shows a magnification of the upper region (comprising particularly the top region 9''', the collar region 11''', the shoulder region 19''') of the container 1''' of FIG. 31a.

Since container 1''' is similar to container 1' and container 1'', only the differences between the containers 1' and 1'' on the one hand and container 1''' on the other hand need to be discussed here while for the remainder reference can be made to the discussion provided above with respect to container 1' with reference to FIGS. 29a and 29b and with respect to container 1'' with reference to FIGS. 30a and 30b.

For the container 1''' as shown in FIGS. 31a and 31b, the following values for the mean value and the standard deviation for each of certain geometric parameters are obtained for a plurality of 150 containers of container 1''':

| Geometric parameter | Mean value | Standard deviation |
|---|---|---|
| d1 [mm] | 26.33 | 0.25 |
| d2 [mm] | 19.9 | 0.1 |
| d3 [mm] | 16.61 | 0.15 |
| d4 [mm] | 12.58 | 0.02 |
| d55 [mm] | 19.63 | 0.1 |
| h1 [mm] | 52.07 | 0.5 |
| h2 [mm] | 34.61 | 0.1 |
| h3 [mm] | 9.78 | 0.05 |
| h21 [mm] | 3.59 | 0.02 |
| c21 [°] | 8.52 | 0.05 |
| c22 [°] | 2.44 | 0.02 |
| c23 [°] | 49.08 | 0.1 |
| c51 [°] | 26.98 | 0.25 |
| s1 [mm] | 1.11 | 0.006 |
| s2 [mm] | 0.79 | 0.004 |
| r1 [mm] | 3.33 | 0.008 |
| r2 [mm] | 2.3 | 0.005 |
| r22 [mm] | 0.39 | 0.002 |
| r23 [mm] | 0.61 | 0.003 |
| r24 [mm] | 0.68 | 0.002 |
| r51 [mm] | 1.32 | 0.005 |
| t [mm] | 1.07 | 0.0028 |
| a [mm] | 0.95 | 0.0015 |
| e [mm] | 1.11 | 0.0023 |

The features disclosed in the description, the figures as well as the claims could be essential alone or in every combination for the realization of the invention in its different embodiments.

LIST OF REFERENCE NUMERALS 1, 1', 1'', 1''' Container
3, 3', 3'', 3''' Tube
5, 5', 5'', 5''' End
7, 7', 7'', 7''' End
9, 9', 9'', 9''' Region
11, 11', 11'', 11''' Region
13, 13', 13'', 13''' Collar
15, 15', 15'', 15''' Region
17, 17', 17'', 17''' Neck
19, 19', 19'', 19''' Region
21, 21', 21'', 21''' Shoulder
23, 23', 23'', 23''' Region
25, 25', 25'', 25''' Body
27, 27', 27'', 27''' Region
29, 29', 29'', 29''' Heel
31, 31', 31'', 31''' Region
33, 33', 33'', 33''' Bottom
L, L', L'', L''' Axis
a Bottom perpendicularity
c21 Angle
c22 Angle
c23 Angle
c51 Angle
d1 Distance
d2 Distance
d3 Distance
d4 Distance
d21 Distance
d55 Distance
e Eccentricity
f Circular run out tolerance
h1 Distance
h2 Distance
h3 Distance
h21 Distance
h22 Distance
h52 Distance
h51 Distance
h67 Distance
m Scaling surface perpendicularity
r1 Radius
r2 Radius
r21 Radius
r22 Radius
r23 Radius
r24 Radius
r51 Radius
s1 Thickness
s2 Thickness
t Bottom depth
v Ovality

What is claimed is:

1. A plurality of pharmaceutical containers, comprising:
a plurality of geometric parameters defined for each container of the plurality of containers,
each geometric parameter of the plurality of geometric parameters having a mean value and a standard deviation,
wherein for a group of the plurality of geometric parameters, each geometric parameter of the group has a standard deviation that is greater than or equal to a lower threshold value specific for the geometric parameter, and
wherein the lower threshold value is at least 1% of the mean value of the geometric parameter, and
wherein the plurality of geometric parameters are a unique identifier for each container in the plurality of pharmaceutical containers without any extra added or molded element on the plurality of containers.

2. The containers of claim 1, wherein each container is a tube with a first end and a further end, wherein the tube has a center axis and has, in a direction from a top to a bottom, a part selected from a group consisting of: a top region at the first end, a collar region comprising a collar, a collar region comprising a collar that follows the top region, a neck region comprising a neck, a neck region comprising a neck that follows the collar region, a shoulder region comprising a shoulder, a shoulder region comprising a shoulder that follows the neck region, a body region comprising a body, a body region comprising a body that follows the shoulder region, and any combinations thereof.

3. The containers of claim 2, wherein each container, in the direction from the top to the bottom, further comprises a part selected from a group consisting of: a heel region comprising a heel, a heel region comprising a heel that follows the body region, a heel region that follows the body region and extends to the further end of the tube, a bottom region comprising a bottom, a bottom region comprising a bottom that follows the heel region, a bottom region comprising a bottom that follows the body region, a bottom region comprising a bottom that closes the tube at the further end, and any combinations thereof.

4. The containers of claim 2, wherein the top region has an outer diameter ($d_t$), the neck region has an outer diameter ($d_n$), and wherein $d_n < d_t$.

5. The containers of claim 2, wherein the top region has an outer diameter ($d_t$), the body region has an outer diameter ($d_b$), and wherein $d_b > d_t$.

6. The containers of claim 1, wherein each geometric parameter is assigned to a class selected from a group consisting of: a geometric parameter of an overall container, a geometric parameter of a part of the tube, and any combinations thereof.

7. The containers of claim 1, wherein the group comprises a geometric parameter for an overall container and a geometric parameter for one or more parts of each container.

8. The containers of claim 7, wherein the geometric parameter for the overall container comprises a total height.

9. The containers of claim 8, wherein the one or more parts of each container comprises one to six parts.

10. The containers of claim 8, wherein the geometric parameter for the one or more parts comprises a parameter selected from a group consisting of: an outer diameter of a collar region, an outer diameter of a neck region, a shoulder angle of a shoulder region, a heel radius of a heel region, a bottom print of a bottom region, and any combinations thereof.

11. The containers of claim 1, wherein the group comprises a parameter selected from a group consisting of: bottom perpendicularity, lower collar angle, upper collar angle, collar facet angle, shoulder angle, body outer diameter, collar outer diameter, collar thread outer diameter, neck outer diameter, bottom print, eccentricity, circular run out tolerance, total height, body height, collar height, neck height, total collar height, total collar height plus neck height, body height with shoulder, sealing surface perpendicularity, shoulder radius, heel radius, collar and neck radius, collar facet radius, lower collar radius, radius at bottom of neck, ovality, wall thickness, bottom thickness, bottom inner radius, neck inner diameter, bottom depth, and any combinations thereof.

12. The containers of claim 1, wherein each container of the plurality of containers comprises a material selected from a group consisting of glass, silicate glass, alumosilicate glass, and borosilicate glass.

13. The containers of claim 1, wherein each container of the plurality of containers comprises a material selected from a group consisting of polymer, cycloolefin-copolymer (COC), and cyclic olefin polymer (COP).

14. The containers of claim 1, wherein the plurality of containers comprises a number of between 5 and 10000 containers.

15. The containers of claim 1, wherein the plurality of containers comprises a number of between 50 and 200 containers.

16. The containers of claim 1, wherein each container of the plurality of containers is a vial or a cartridge.

17. The containers of claim 1, wherein the group comprises a first geometric parameter that is a total height, a second geometric parameter that is a shoulder angle, and a third geometric parameter that is a heel radius.

18. The containers of claim 17, wherein the group comprises geometric parameters selected from a group consisting of the first geometric parameter with a mean value of between 10 and 100 mm, the first geometric parameter with a standard deviation of at least 2% of the mean value, the second geometric parameter with a mean value of between 10 and 50 degrees, the second geometric parameter with a standard deviation of at least 3% of the mean value, the third geometric parameter with a mean value of between 1 and 5 mm, the third geometric parameter with a standard deviation of at least 1% of the mean value, and any combinations thereof.

19. A method for producing a plurality of pharmaceutical containers, comprising:
    forming a plurality of containers each container having a plurality of geometric parameters that are a unique identifier for each container in the plurality of pharmaceutical containers without any extra added or molded element on the plurality of containers, each geometric parameter of the plurality of geometric parameters having a mean value and a standard deviation, wherein for a group of the plurality of geometric parameters, each geometric parameter of the group has a standard deviation that is greater than or equal to a lower threshold value specific for the geometric parameter, and wherein the lower threshold value is at least 1% of the mean value of the geometric parameter; and
    storing the geometric parameters as the unique identifier in at least one database.

* * * * *